United States Patent [19]
Keller et al.

[11] Patent Number: 5,424,622
[45] Date of Patent: Jun. 13, 1995

[54] DYNAMIC BRAKE ASSEMBLY

[75] Inventors: Kenneth Keller, Reseda; Kenneth Hopwood, San Pedro, both of Calif.

[73] Assignee: Baldor Electric Company, Inc., Fort Smith, Ark.

[21] Appl. No.: 158,752

[22] Filed: Nov. 29, 1993

[51] Int. Cl.[6] ............................................. H02P 3/12
[52] U.S. Cl. .................................. 318/375; 318/759; 318/364; 318/371
[58] Field of Search ................ 318/759, 375, 364, 371

[56] References Cited

U.S. PATENT DOCUMENTS

| | | |
|---|---|---|
| 4,093,900 | 6/1978 | Plunkett . |
| 4,278,921 | 7/1981 | Medding et al. . |
| 4,292,577 | 9/1981 | Cesarz et al. . |
| 4,568,864 | 2/1986 | Gisske . |
| 4,749,933 | 6/1988 | ben-Aaron . |
| 4,761,600 | 8/1988 | D'Atre et al. . |
| 4,767,970 | 8/1988 | Rodal . |
| 4,890,027 | 12/1989 | Bohner et al. . |
| 4,904,918 | 2/1990 | Bailey et al. . |
| 4,916,370 | 4/1990 | Rowan et al. .................. 318/759 |
| 5,003,241 | 3/1991 | Rowan et al. .................. 318/759 |

OTHER PUBLICATIONS

Nordic Series 98 Solid-state Electronic Motor Brake, Instruction Bulletin (Aug. 31, 1988).
Nordic Series 98 Solid-state Electronic Motor Brake, two-page data sheet (no date).
Motortronics, Inc., Reduced Voltage Motor Starter and Brake LBC3/LBS3 Series 3 to 1000 HP (no date).
TASC Drives Inc., Instruction Manual Braketron ® Dynamic Electronic Motor Brakes (02/90).
Ambitech Industries, Inc., Short-Stop ™ Models Price List, (no date).
Braketron ® Dynamic Electronic Motor Brakes, two-page brochure (no date).
Digibrake ™ Model B60, MC Technologies, Inc., brochure, (no date).
Ambitech Industries, Inc., Instructions for Short-Stop ™ Electronic Motor Brake 1982.
Ambitech Industries, Inc., Options for Short-Stop ™ Electronic Motor Brake (no date).
AMC (Auto Motor Controller) Technologies, Inc., brochure, (no date).
Nordic, Solid-state Starters, Small Horsepower Starters (6 to 60 amp (no date).
Motorola Semiconductor Technical Data, Technical Summary 8-bit Microcontroller Unit (1990).
Motorola HC05 Technical Data (1990).
Article entitled "Reducing Wind-Down" by Walter Lukitsch, Timber Processing, Sep. 1990.

*Primary Examiner*—William M. Shoop, Jr.
*Assistant Examiner*—Karen Masih
*Attorney, Agent, or Firm*—Arnold, White & Durkee

[57] ABSTRACT

A method for dynamically braking a motor, the motor having a plurality of terminals and receiving an input alternating current voltage waveform, by detecting the zero crossing of the input alternating current voltage waveform and for a plurality of position of the input alternating current waveform: sampling a voltage waveform appearing at a terminal of the motor to develop a sampled value for the position, comparing the sampled value for the position to a reference value for the position and setting a flag if the reference value for the position matches the sampled value for the position, introducing a delay period and generating a gating pulse to fire a silicon controlled rectifier to provide a pulse of braking current to the alternating current motor and then halting the braking of the motor if the flags for each of the plurality of positions are set. Also an electronic dynamic brake assembly operable in a SLAVE mode, a PRE-STOP mode, a HOLDING mode and a MASTER mode.

16 Claims, 32 Drawing Sheets

| TIME SIGNALS ||
|---|---|
| PB7 | BC0 |
| 0 | 0 |
| 0 | 1 |
| 1 | 0 |
| 1 | 1 |

| MAXIMUM ROUGH TIME |
|---|
| 15 Seconds |
| 30 Seconds |
| 45 Seconds |
| 60 Seconds |

| MODE SIGNALS ||
|---|---|
| PC1 | PC2 |
| 0 | 0 |
| 0 | 1 |
| 1 | 0 |
| 1 | 1 |

| MODE |
|---|
| SLAVE |
| PRE-STOP |
| MASTER |
| HOLDING |

(CONTINUED TO 16B)

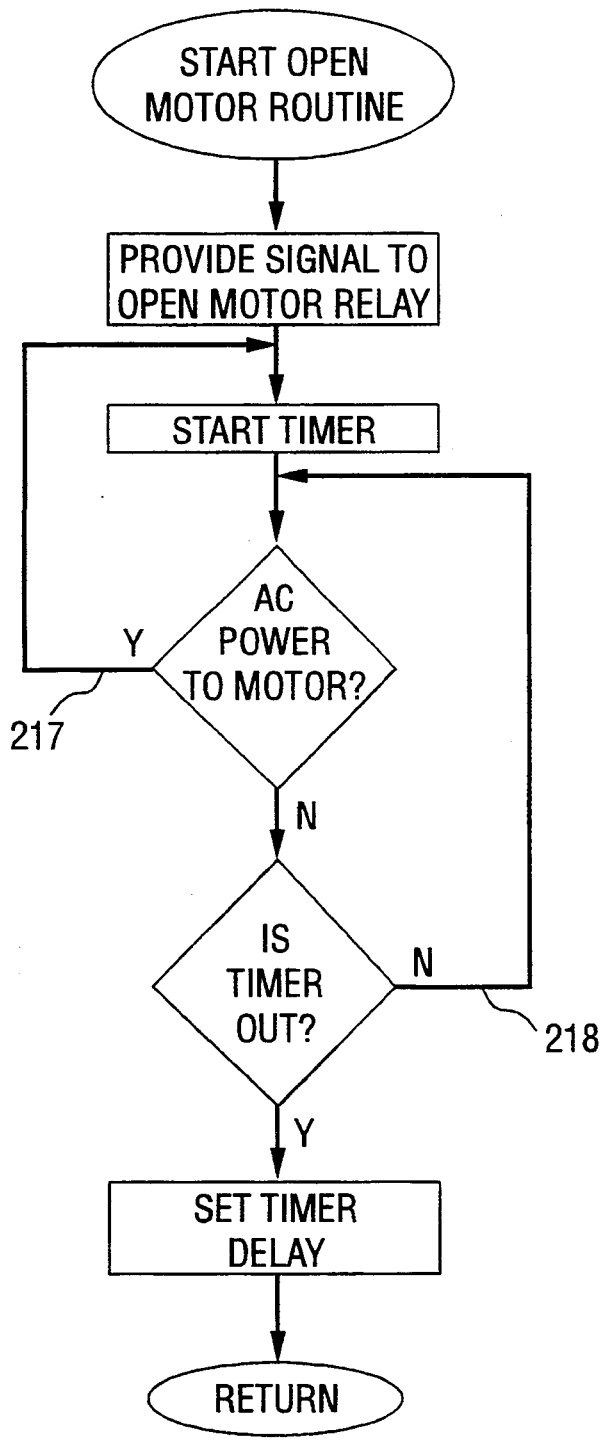
FIG. 16B
(CONTINUED FROM 16A)

(CONTINUED TO 17B)

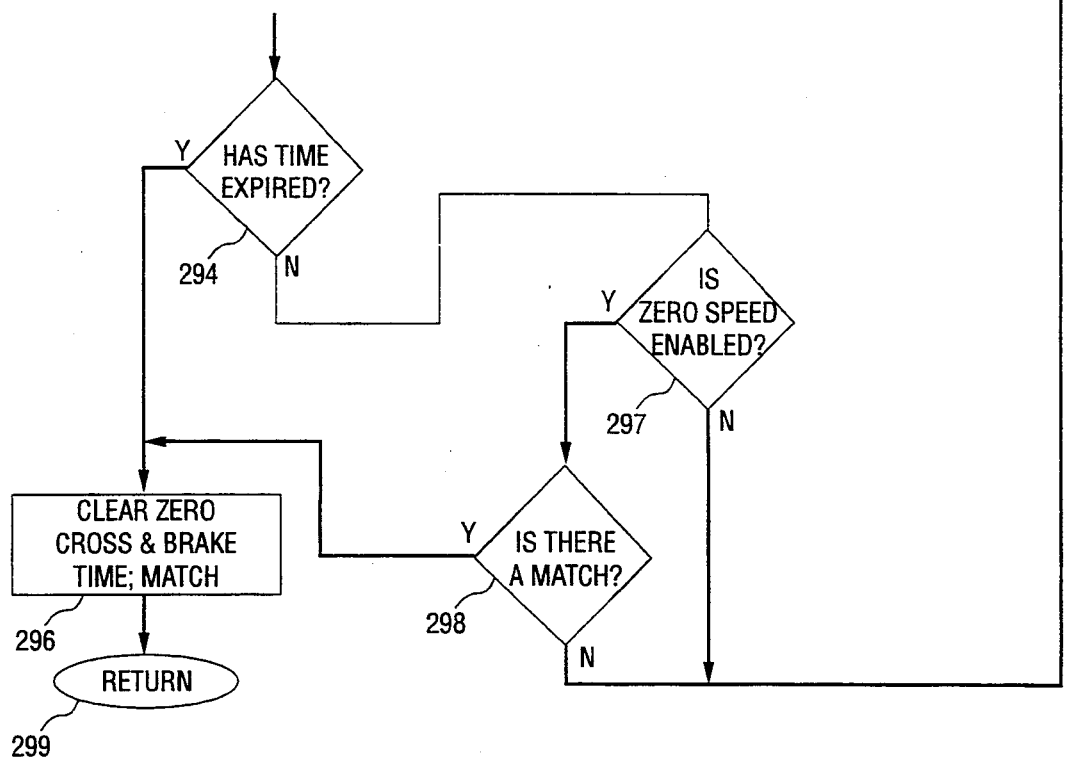
FIG. 17B
(CONTINUED FROM 17A)

(CONTINUED TO 19B)

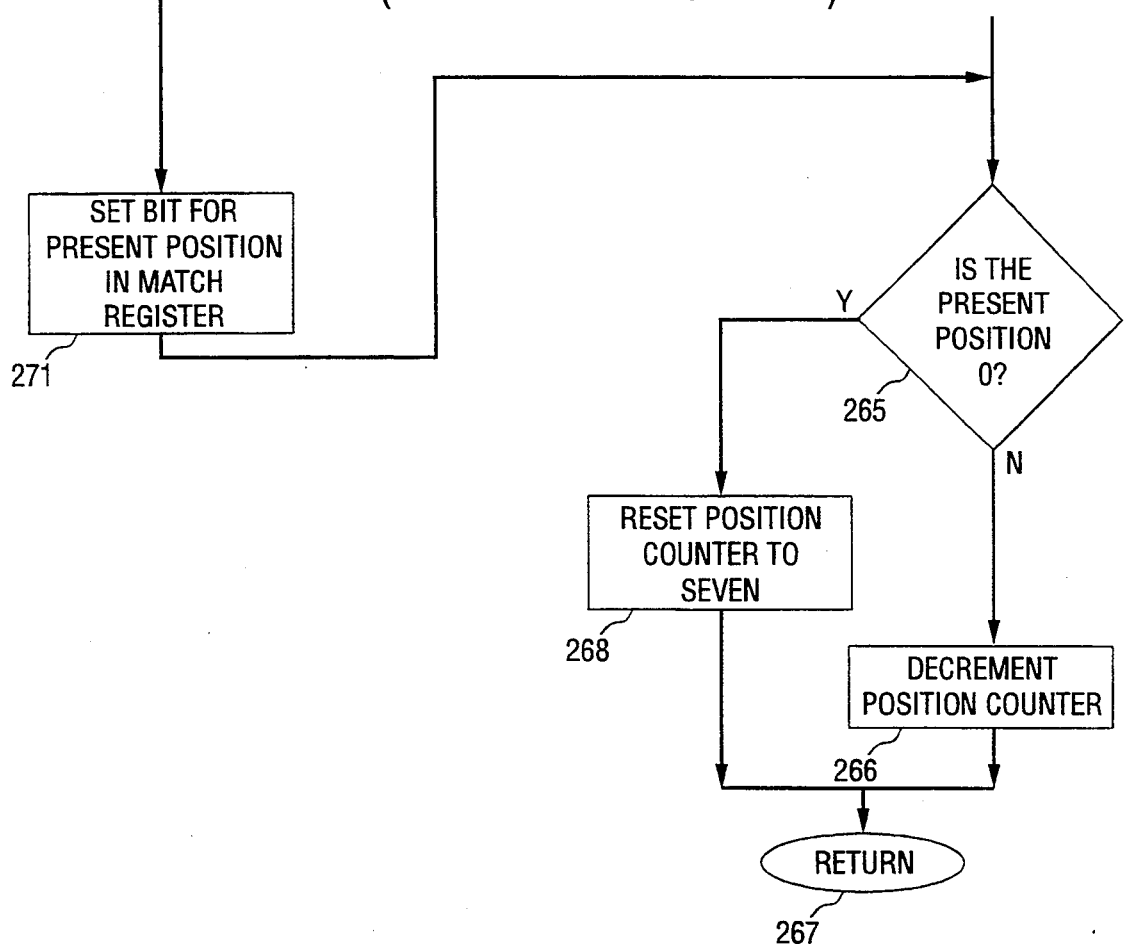

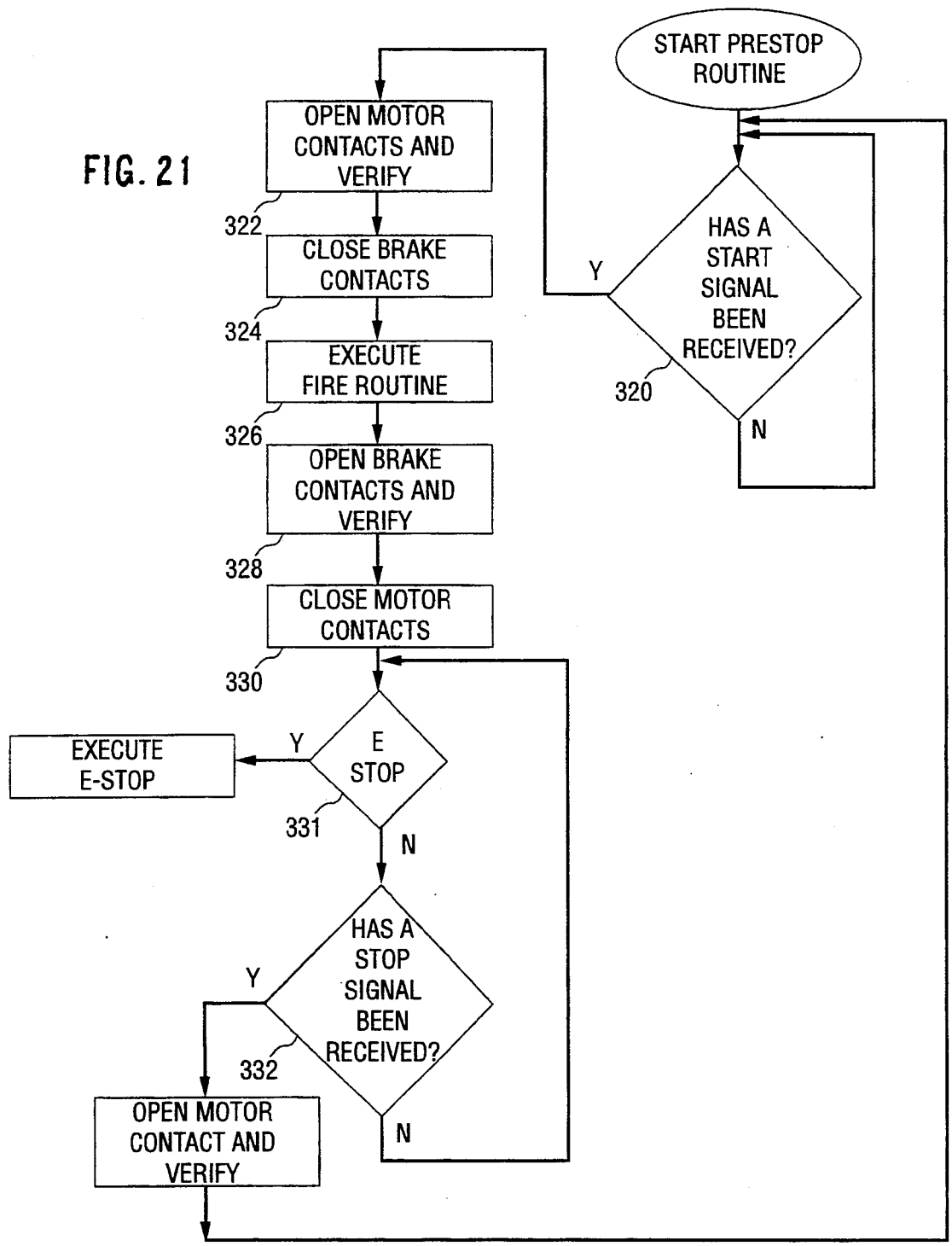

(CONTINUED TO 22B)

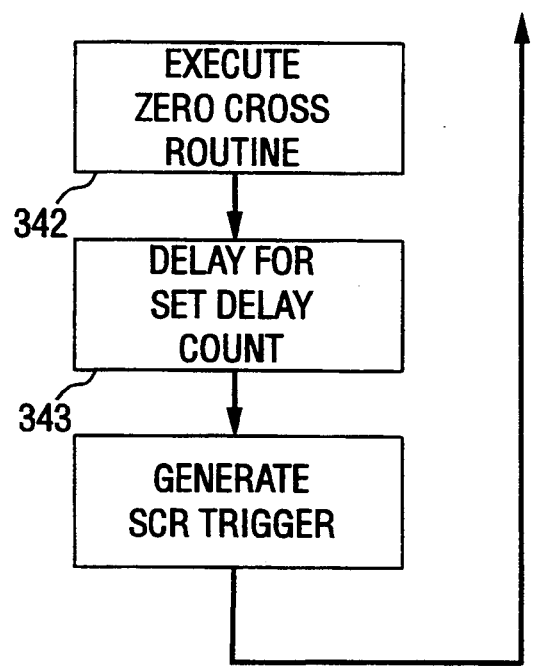
FIG. 22B
(CONTINUED FROM 22A)

(CONTINUED TO 23B)

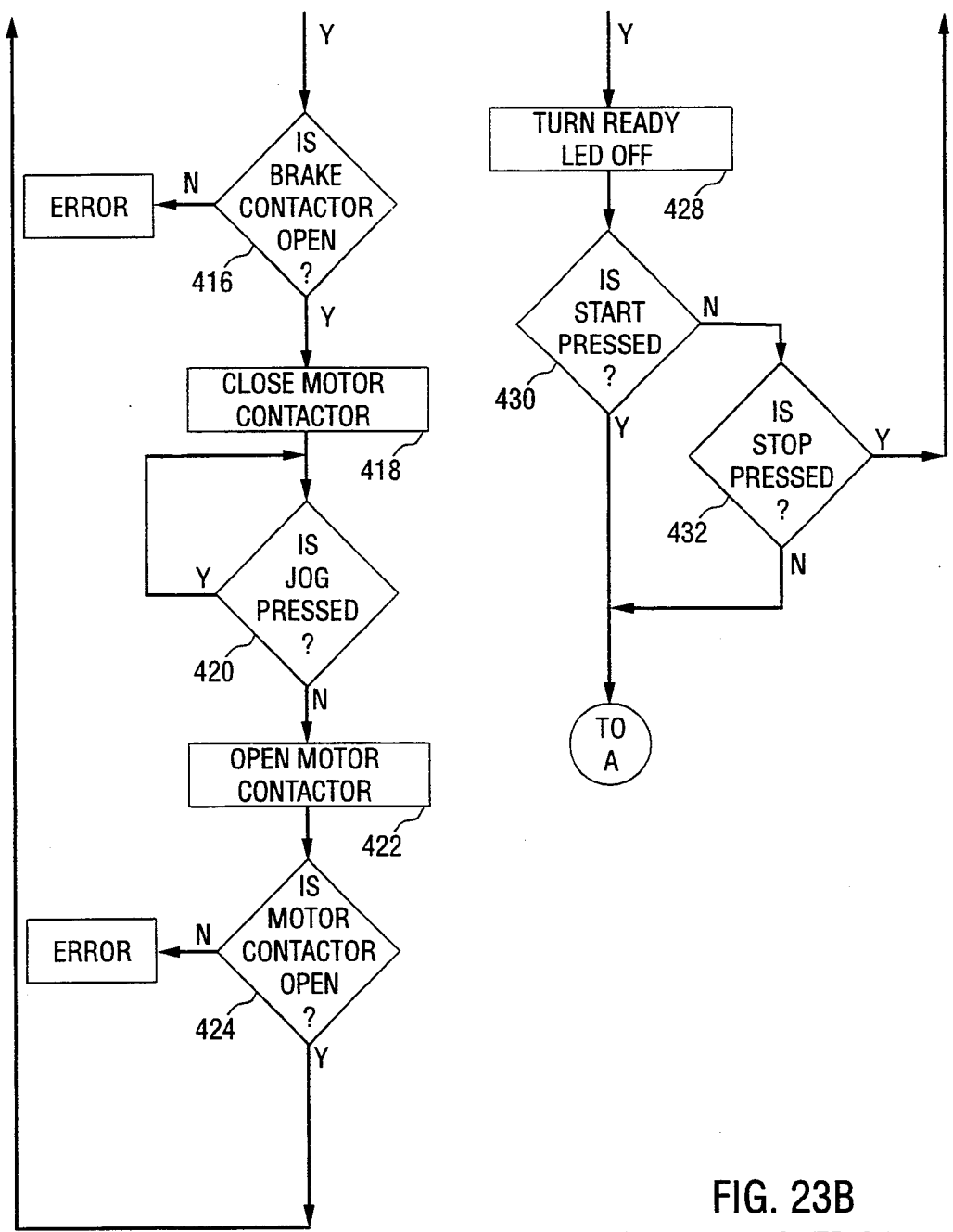
FIG. 23B
(CONTINUED FROM 23A
CONTINUED TO 23C)

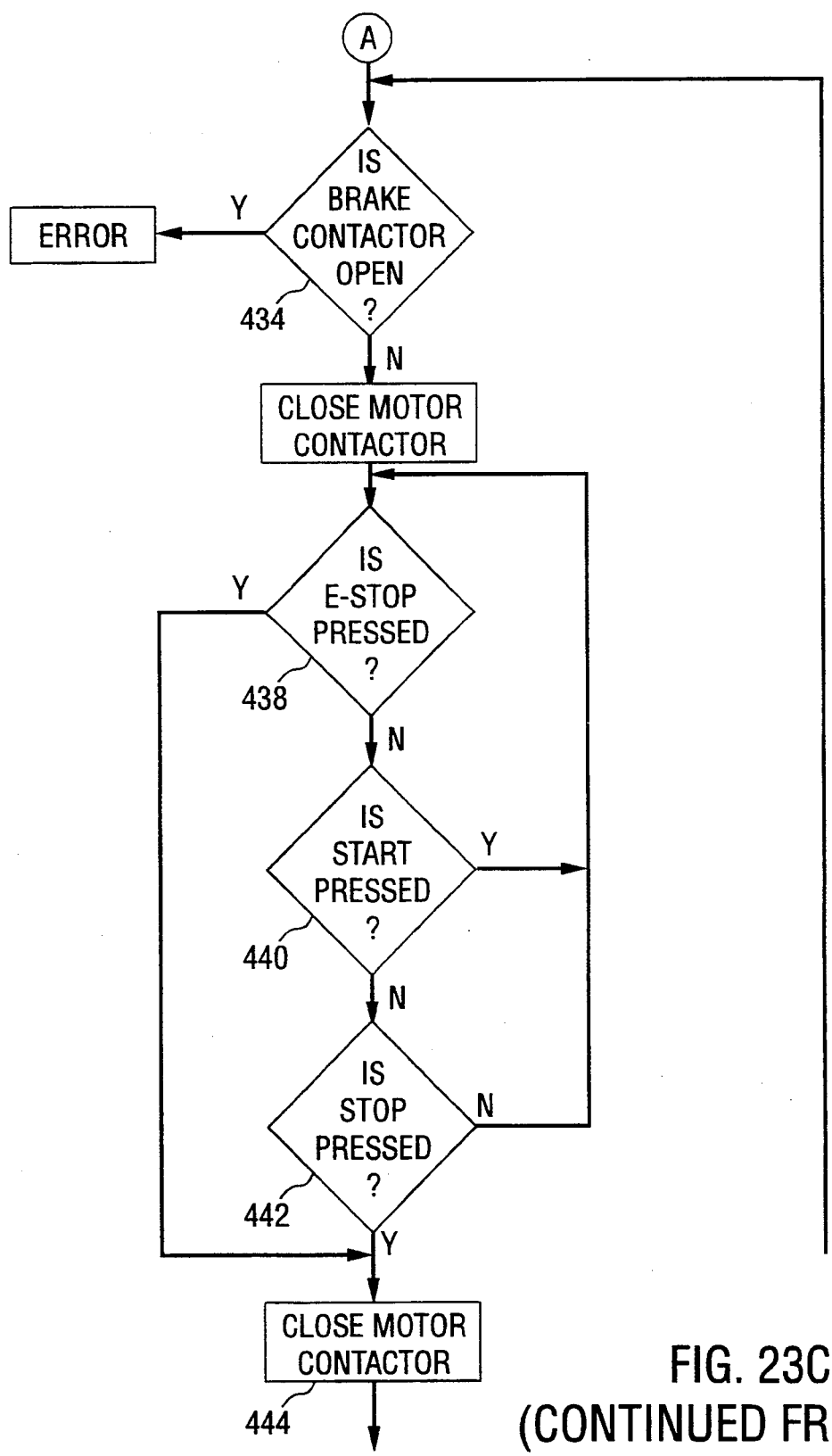
FIG. 23C
(CONTINUED FROM 23B
CONTINUED TO 23D)

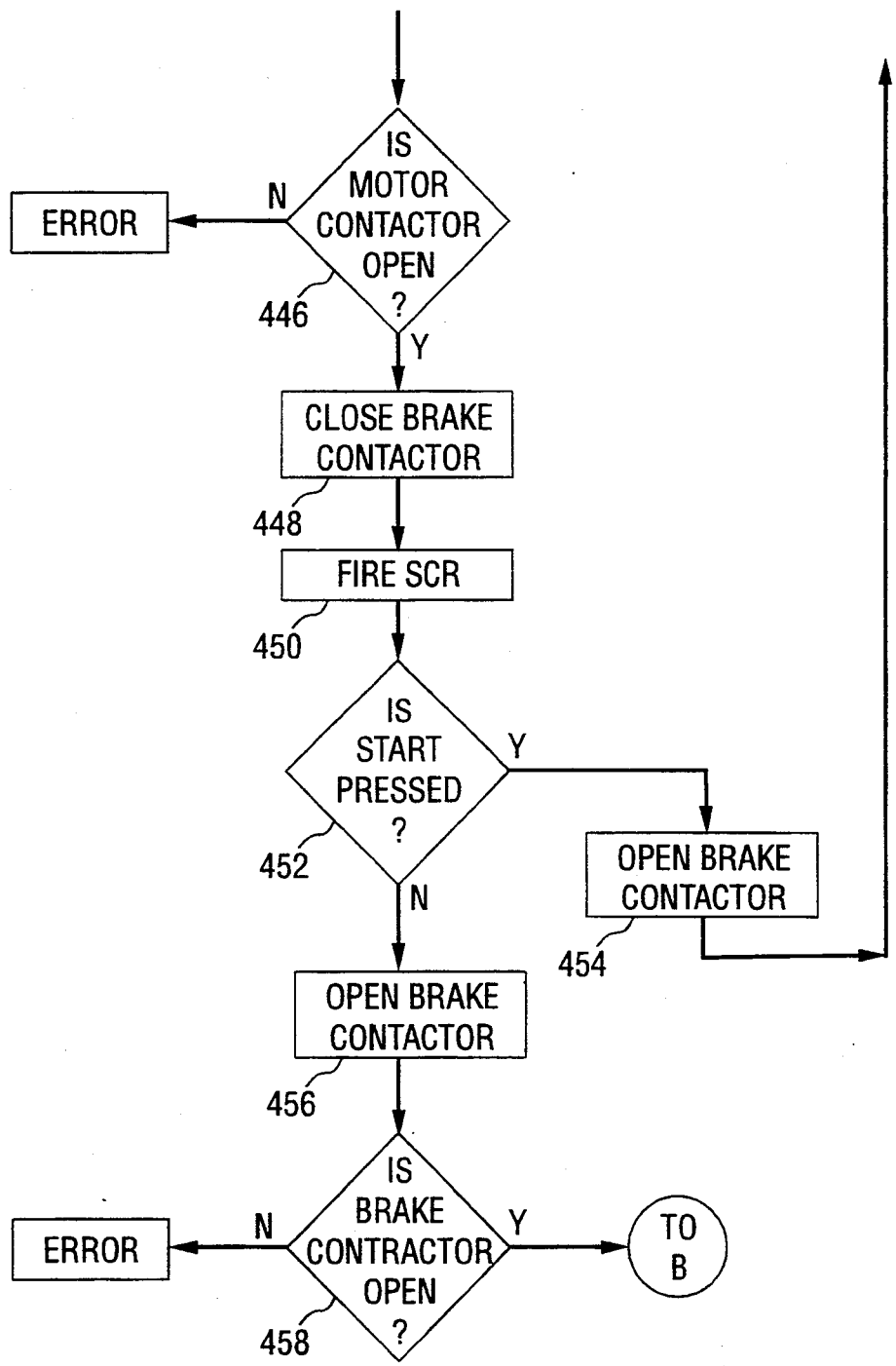
FIG. 23D
(CONTINUED FROM 23C)

DYNAMIC BRAKE ASSEMBLY

REFERENCE TO APPENDIX

Included with this disclosure is a thirty-page appendix. Reproduction of the appendix is authorized only in connection with the printing or copying of any patent that may issue from this application.

1. BACKGROUND OF THE INVENTION

1.1 Field of the Invention

The present invention pertains generally to dynamic brakes, and more particularly, to dynamic brakes that permit rapid stopping of alternating current (AC) motors through the use of direct current (DC) injection to create a stationary, braking, magnetic field within the motor.

1.2 Description of the Prior Art

AC motors are widely used in industry. For example, the large machines used in most wood processing plants, e.g., chippers, band saws and planers, are almost exclusively driven by AC motors. In industrial plants where AC motors are used and relied upon, an inoperable AC motor can bring an entire production line to a full stop. Accordingly, controlling and maximizing the productive time of each AC motor is important. One way to enhance the productive time available of an AC motor is through proper control of the motor's braking cycle.

Generally, when the power to an AC motor is cut off, the motor does not come to an immediate stop, but rather gradually "coasts" to a stop. For large motors with large loads this "coasting" period can be quite long (20–40 minutes for massive loads) resulting in periods when the motors are unavailable for useful work. In many cases (e.g., when changing motor loads) these "coasting" periods result in gaps of time when both the motor and the motor's operator are unproductive.

In addition to the productivity problems caused by coasting, allowing a motor to gradually coast to a stop can be quite hazardous. For example, a silently coasting machine such as a radial arm saw, disc sander or band saw can cause tremendous injury to both man and machine.

In an effort to reduce the unproductive and hazardous coasting periods associated with AC motors, mechanical or friction brakes are often used to decrease the time required to bring a running AC motor to a stop. Such brakes rely on the frictional force created between a mechanical brake pad and a rotating part of the motor. Because the brake pad often wears away after several braking cycles, mechanical brakes require significant adjustment, repair and maintenance (e.g., brake pad replacement). A further disadvantage with many mechanical brakes is that the brake pads for which the brakes were designed are manufactured from asbestos or asbestos substitutes—potential cancer-contributing materials most industries are hesitant to use.

In an effort to overcome the disadvantages associated with mechanical brakes, frictionless electronic brake assemblies were developed. Such frictionless electronic brake assemblies are often referred to as "electronic dynamic brakes."

The basic operation of a typical electronic dynamic brake assembly is illustrated in FIG. 1. As illustrated in FIG. 1, an electronic dynamic brake 10 is coupled via electrical connections 12, 12', 14 and 14' to the power line inputs and to a three-phase AC motor 20. Sense leads 16 and 16' detect motor contractor opening to initiate the brake cycle and are used to sense whether power is being applied to the motor. Connected across the power line inputs is a motor starter 30 that includes three contacts for controlling the power line inputs to the motor. When the START button on the motor starter is activated, the three contacts are closed, coupling the motor inputs to the power line inputs. When the STOP button of the motor starter is activated, the three contacts are opened and the three motor inputs are disconnected from the power lines.

The sense leads 16 and 16' of the electronic brake 10 monitor the power applied to the motor 20. When sense leads 16 and 16' sense that power is being supplied across the motor starter contacts to the motor, an indication that the motor is RUNNING is provided to the brake assembly. If, once the motor is running, the sense leads 16 and 16' sense that the power supplied to the motor has been cut off (e.g., by activation of the STOP button) the control leads provide an indication to the dynamic brake that a braking cycle should be instigated. The dynamic brake assembly will use the power it receives from the power lines to generate direct ("DC") current. This direct current is then injected, through motor input lines (a) and (c) into the stator of the AC motor 20. The injection of the DC current creates a stationary magnetic field within the motor. This stationary magnetic field forces the poles of the rotor field to align with the stationary poles of the stator, quickly brings the motor to a stop without mechanical friction. Because the braking cycle of the dynamic brake discussed above is initiated by activating the STOP button of the motor and is controlled by the motor starter, this type of brake assembly is commonly referred to as a "slave brake."

Because it could damage both the motor and the dynamic brake if a braking cycle were initiated when three-phase power is being supplied to the motor, most electronic dynamic brake assemblies are used in conjunction with a separate, electrical interlock system. An electrical interlock system is illustrated as part of element 10 in FIG. 1. Basically, the purpose of the electrical interlock is to ensure that the motor cannot be energized by the starter contacts during a braking cycle. During normal motor running operation, the interlock circuit is closed and power from the power lines is applied to the motor starter. During a braking cycle, the interlock opens up, thus "locking out" the motor starter and ensuring that power cannot pass through the motor starter to the motor. The installation and operation of electrical interlocks is understood by those skilled in the art and will not be further addressed herein.

When using an electronic dynamic brake, the length of the braking cycle (i.e., the time necessary to bring the motor to a complete stop) will vary depending on the magnitude of the DC braking current applied to the motor, the size and type of motor, and the size and type of load attached to the motor. In many prior art brake assemblies, a timer is used to ensure that the DC braking current is applied to the motor for a sufficient time period to bring the motor to a stop.

When a timer is used with a electronic dynamic brake, the brake is initially set so that when a braking cycle is initiated, the brake will apply DC current to the motor for a preselected time period. The time period is usually set—through trial and error—to be of sufficient length to bring the motor to a complete stop. Because variables such as the line voltage, temperature of the motor and slight load changes can affect the time required to brake a motor, the braking time period is usually selected to be longer than the maximum expected stopping time.

One disadvantage of "timed" electronic dynamic brakes is that the set time period (the maximum braking time) is often longer than the actual time period required to stop the motor. Accordingly, with timed dynamic drakes, there are often periods—referred to as dead time—when the motor has come to a stop, but the dynamic brake assembly continues to inject DC current into the motor. Excessive dead time frequently occurs when the load applied to the motor is smaller than normal. Such dead time periods, like the coasting periods discussed above, render the motor unproductive. Additionally, such periods waste power as DC current is unnecessarily being supplied to a stopped motor.

A further disadvantage of timed electronic dynamic brakes is that the preselected time period is generally optimized for a single motor and a single load. Accordingly, if the load changes, or the brake assembly is moved to a different motor, the brake assembly must be tested and reset to properly brake the new motor or load. Such resetting periods are inefficient in that during such periods it is difficult to efficiently use the brake assembly, the new motor, the new load or the technician who is responsible for resetting the brake. A still further disadvantage with timed electronic dynamic brakes is if, for some reason, the preselected time period is too short, the brake will stop injecting DC current into the motor before the motor is stopped, resulting in a "coasting" period like the ones discussed above.

In an effort to overcome the disadvantages associated with timed dynamic brakes, some in the prior art began to use "stop sensors" or "zero speed sensors" in conjunction with typical electronic dynamic brakes. These prior art zero speed sensors would detect the rotation of a three-phase motor by sensing the voltage at the motor input terminals. For example, as illustrated in FIG. 1, a lead 17 could be used to serve the voltage at a motor input terminal.

One type of prior art zero-speed detector is illustrated in FIGS. 2A and 2B. FIG. 2A is a partial schematic diagram of one prior art zero-speed sensor. The sensor generally comprises a differential sense amplifier that receives as its inputs the signals T1 and T2, from two input terminals of an AC motor. The differential amplifier 53 receives the two signals and produces an output signal proportional to their difference. The differential output signal is then applied to a low pass filter 54 and the output of the low pass filter is applied to a 60 Hz. notch filter 55. The notch filter is used to filter out any voltage waveforms caused by the 60 Hz. AC power typically applied through the power input lines to AC motors. The output from the notch filter 55 is then applied to four sample and hold circuits 56. The sample and hold circuits are configured such that two of the circuits are clocked every 60 Hz. cycle. The outputs form the sample and hold circuits 56 are then applied to additional circuitry 57 (not illustrated in detail) that produce a ZERO SPEED signal when certain conditions are met.

During a braking cycle the rotational speed of the motor being braked will normally be constantly decreasing. Because the rotational speed of the motor is constantly changing, so too are the voltages generated by the motor at its input terminals. When the motor has come to a complete stop, the voltage at the output terminals will be essentially constant. Accordingly, by monitoring the change in the voltages at the motor input terminals, and determining when the voltages cease to change, it is possible to sense when the motor has come to a stop.

The prior art zero-speed circuit of FIG. 2A generally operates as follow: First, two times during each 60 Hz. cycle, samples are taken of the output of the 60 Hz. notch filter 55. This is illustrated in FIG. 2B, where samples are shown being taken at points A and B. The two samples are then stored in two of the sample and hold circuits (A, B) 56. During the immediately following 60 Hz. cycle, two more samples are taken (A', B') and stored in sample and hold circuits (A', B') 56. The most recent samples are then compared to the previously taken two samples by circuitry 57. If the sample for A does not match the sample for A' (or if B does not match B') then there is no zero speed. If, however the pairs of samples match, then there is a chance that the motor is at zero-speed. In most prior art devices, the samples must match for a sufficient number of cycles, e.g., 40-100, before a zero-speed signal is generated. Accordingly, circuitry 57 monitors the outputs of the sample and hold circuits 56 and generates a ZERO-SPEED signal whenever the sample and hold pairs match for the preselected number of times.

One problem with prior art zero-speed detectors is that for most motors, there are periods during a braking cycle where portions of the output voltage at the terminals do not change, even though the motor is rotating. These periods are referred to as "dead spots." If the zero-speed sensor happens to take samples of the voltages from these "dead spots", it can be fooled into reporting that a motor is stopped when, in fact, the motor is still rotating. In order to avoid false zero speed detections, manual adjustments are required in many prior art zero speed detectors. Common adjustments included altering the time during the 60 Hz. cycle when the two samples are taken, and increasing the number of matches that must be detected before a ZERO-SPEED signal is generated.

The location of the "dead spots," discussed above, varies from motor to motor and load to load. Furthermore, the location of dead spots for the same motor and load can vary as the motor wears, the load changes, the line voltage varies or the temperature of the motor or load changes. Accordingly, it is quite difficult to set prior art zero-detectors for a particular motor/load/temperature range combination and—once the brake is set—it is difficult to move the brake to another motor/load/temperature combination without extensive resetting. In many instances, the "worst-case" scenario is used to set the zero-detector. In other words, the zero-speed detector is set to produce a ZERO-SPEED signal only after the number of matches indicated is such that it exceeds the worst case dead spot. Accordingly, in many cases, prior art zero-speed detectors require more matches prior to the generation of a zero-speed signal than are actually necessary.

Another problem with prior art zero-speed detectors is that they are operable at a sub-optimum time in the firing procedure. In most prior art zero-speed detectors, the zero speed sensing occurs after a delay and after a SCR firing. Thus there is a three-step procedure: (1) delay; (2) fire; and (3) zero-speed sensing. This is believed to provide sub-optimum results as the firing of the SCR immediately before the zero-speed sense is believed to negatively impact the zero-speed sensing.

The prior art zero-speed detectors are used with a variety of electronic brake assemblies. Generally, there are three different types of prior art brake assemblies:

(1) Slave Brakes—Discussed above, where the activation of the braking cycle is dependent on the position of the motor contacts in the motor starter (i.e., the motor contacts control the brake assembly);

(2) Pre-Stop Brakes—where the brake brings the motor to a complete stop before each start; and (3) Holding Brakes—where the brake, when activated, continuously supplies DC current to the motor to prevent it from rotating (when the START button is activated, the brake releases).

As discussed above, slave brakes are generally used to simply bring a motor to a stop when the STOP button is activated.

Pre-stop brakes are used in situations (such as in wind tunnels with fans) where there is chance that, prior to starting, the shaft of the motor will be rotating opposite to the desired direction of rotation. Such opposite rotation is referred to as "windmilling." Sever damage can occur to the motor and the load if it is started while the motor is windmilling. Pre-stop brakes overcome the windmilling problem by sensing when the START button has been activated, bringing the motor to a complete stop, and then releasing the brake and allowing the motor contacts to close, starting the motor. Unlike slave brakes, where the status of the motor contacts determines the status of the brake, in a pre-stop brake circuitry within the pre-stop brake assembly controls the status of the contacts in the motor starter.

Holding brakes are used when it is necessary to ensure that the motor does not rotate after it has been stopped. Holding brakes, when activated, bring the motor to a stop and then continuously apply DC current to the motor to ensure that the shaft does not rotate. Holding brakes are often used with dangerous equipment when it is important to ensure that the equipment does not move when not in operation or where a positive hold on the motor shaft must be maintained to prevent backward coasting (e.g., inclined conveyors).

In the prior art, each type of brake (slave, pre-stop and holding) requires a discrete and separate brake assembly. Accordingly, if one wants a holding brake, one purchases and installs a holding brake assembly. If one wants a pre-stop brake, a pre-stop brake must be installed. One difficulty with these separate prior art devices is that it is often difficult to accurately determine what type of brake is needed for a particular application. For example, one may initially determine that a slave brake is needed but, after observing wind and rotational effects, realize that a pre-stop brake is required. With prior art brake assemblies, one is forced to remove the installed slave brake and replace it with a different pre-stop unit. Such replacement of installed brake assemblies results in a loss of both the time and cost of replacement as well as the extra time the motor is unproductive.

2. SUMMARY OF THE INVENTION

The present invention addresses the aforementioned and other disadvantages or prior art dynamic brake assemblies by providing an improved dynamic brake assembly compatible with conventional AC motors. In particular, the dynamic brake assembly of the present invention provides a single dynamic brake assembly that is operable in a slave-mode, pre-stop mode, holding mode and a master mode. The present invention also provides an improved method for dynamically braking a motor and, in particular, and improved method for detecting the zero-speed of a motor.

Use of the dynamic brake of present invention may result in the use of a single multi-mode dynamic brake where, in the past, several brakes were required. Use of the method of the present invention may result in improved braking and zero speed detection. The dynamic brake of the present invention may be used in most all AC motor applications including use with woodworking and metal working machines such as saws, lathes, grinders and the like.

Other advantages will be apparent to one of skill in the art upon review of this disclosure.

3. BRIEF DESCRIPTION OF THE DRAWINGS

Figure 3:
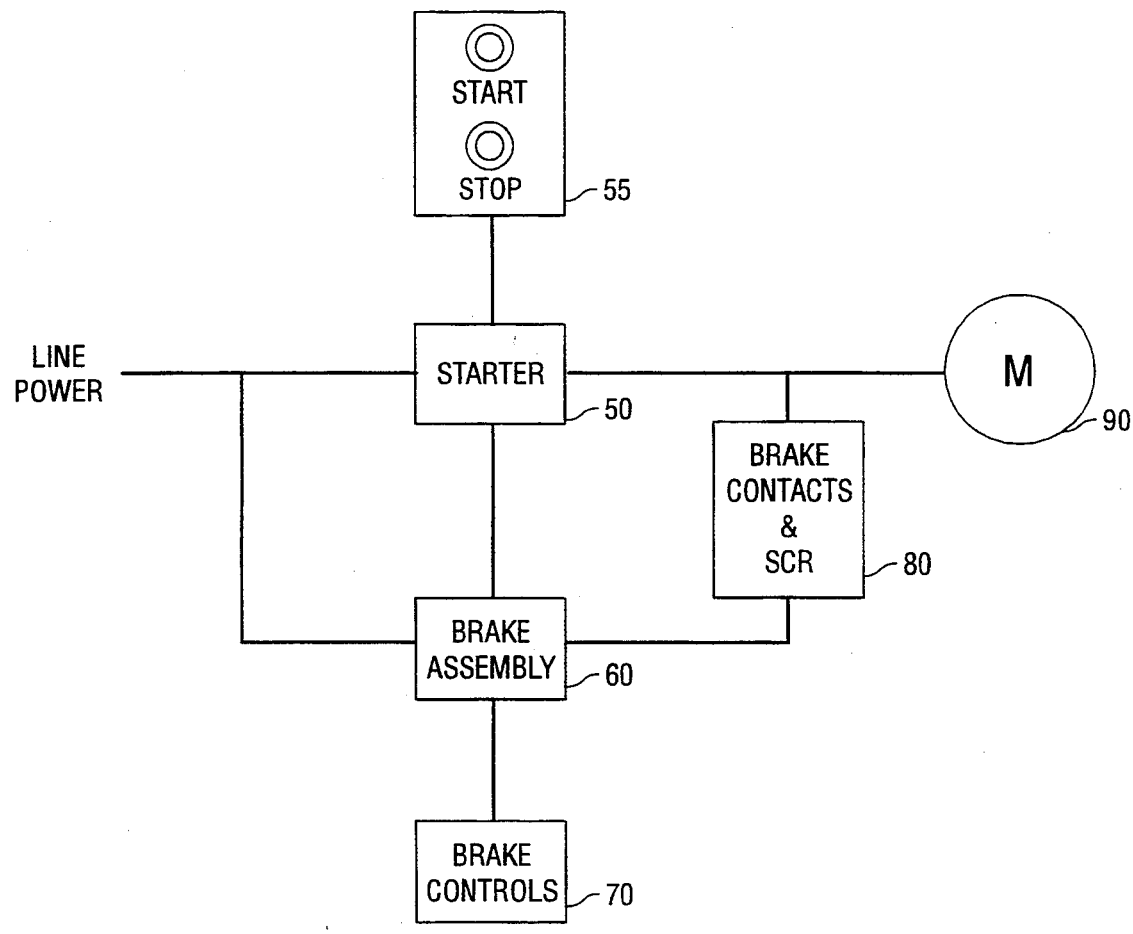

FIG. 3 generally illustrates the brake assembly of the present invention.

FIGS. 4A–4D illustrates the brake contacts and silicon controlled rectifier ("SCR") circuitry of the present invention.

FIG. 5 illustrates a manner in which DC braking currents are generating by the SCR circuitry of the present invention.

Figure 6:
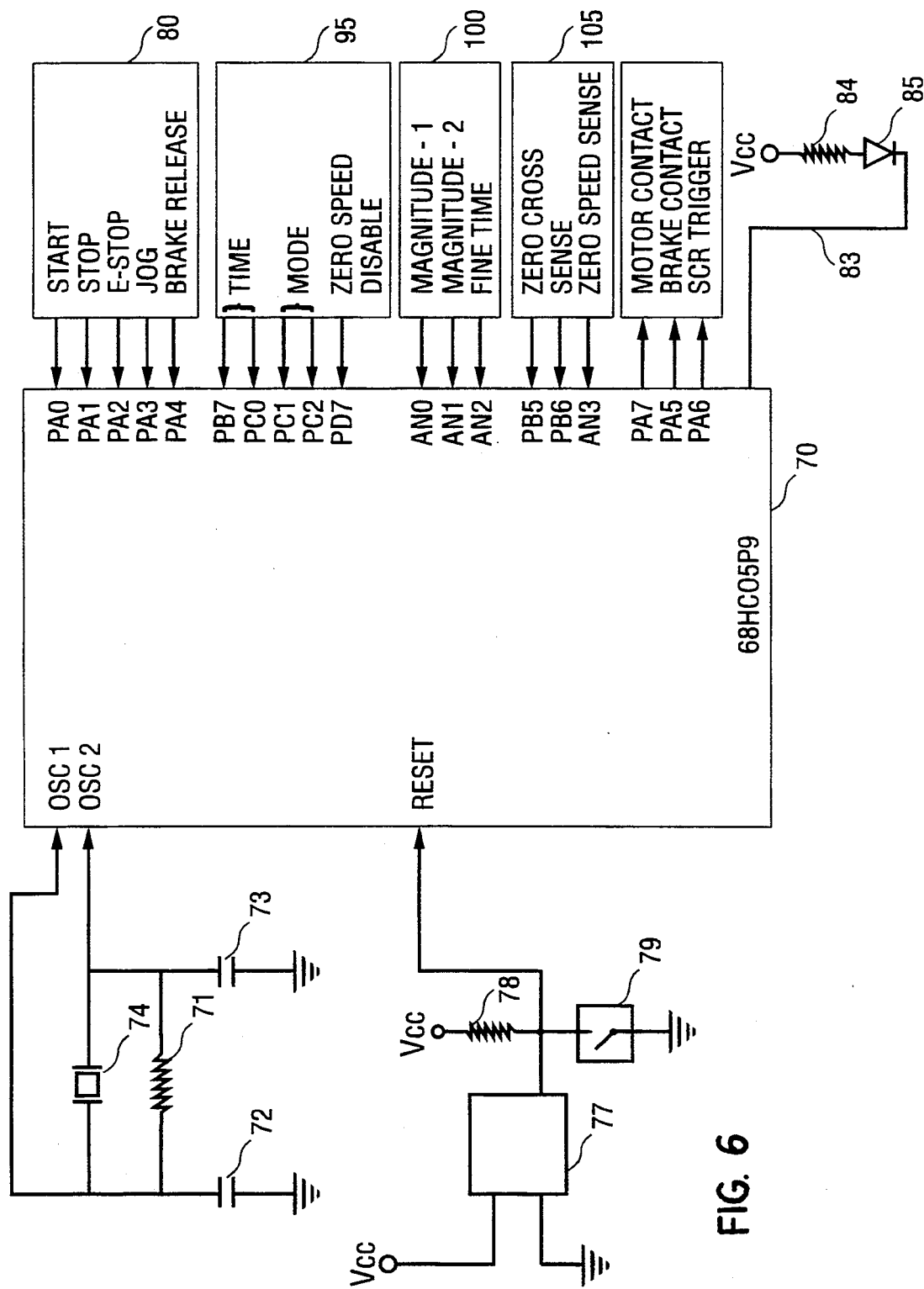

FIG. 6 is a block diagram of the dynamic brake assembly of the present invention.

Figure 7A:
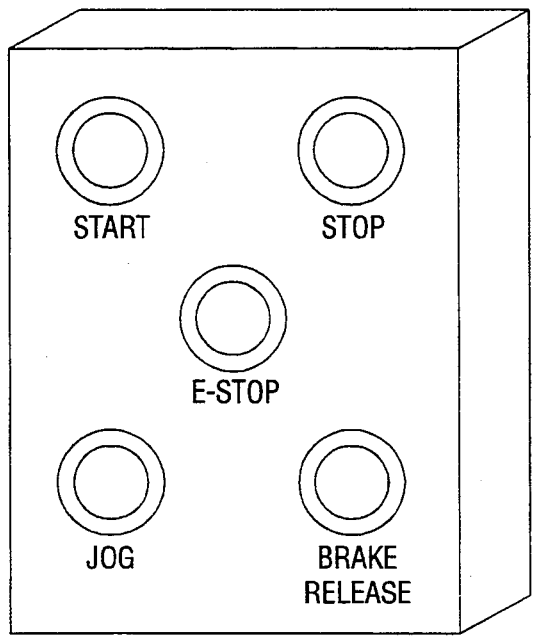
Figure 7B:
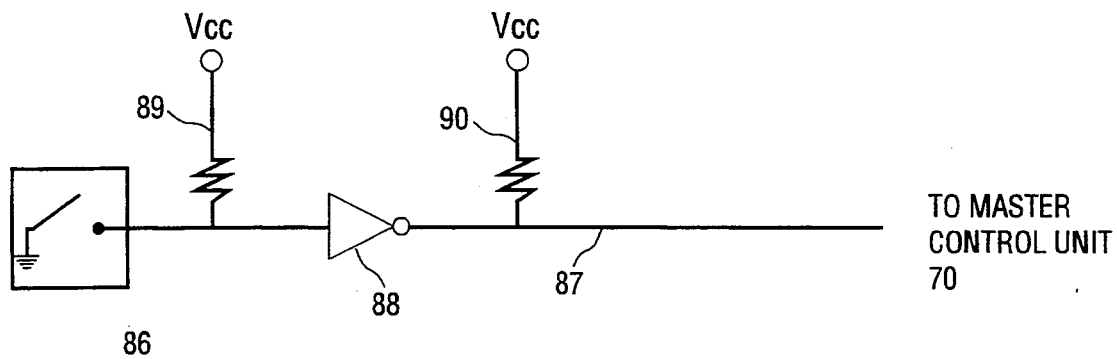

FIGS. 7A–7B illustrate the enclosure and circuitry associated with the control buttons of the present invention.

Figures 8A, 8B, 8C:
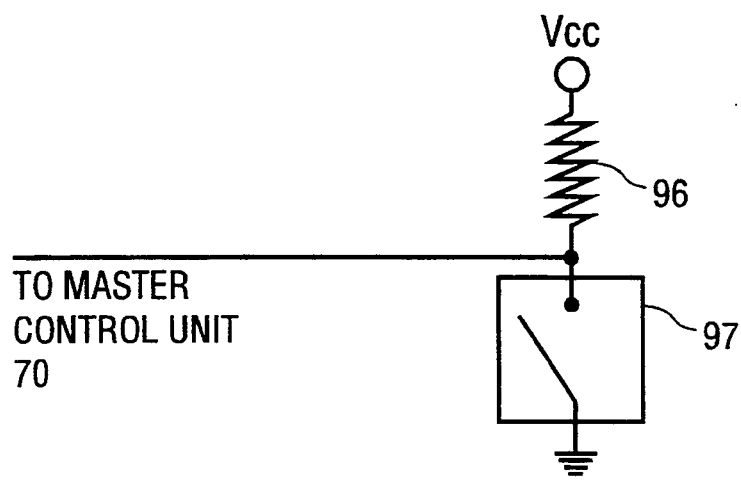

FIGS. 8A–8C illustrate the circuitry and settings for the control switches of the present invention.

Figure 9A:
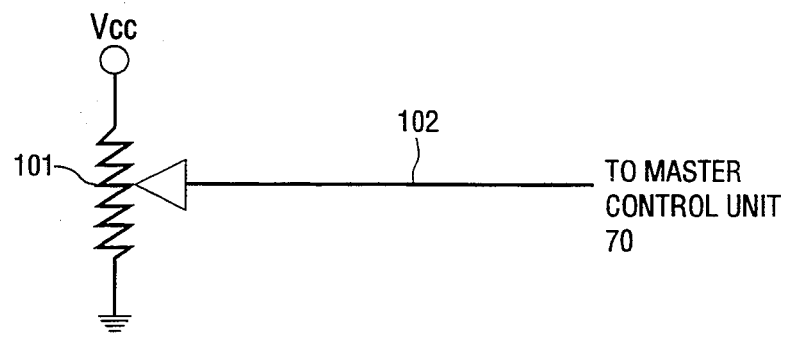
Figure 9B:
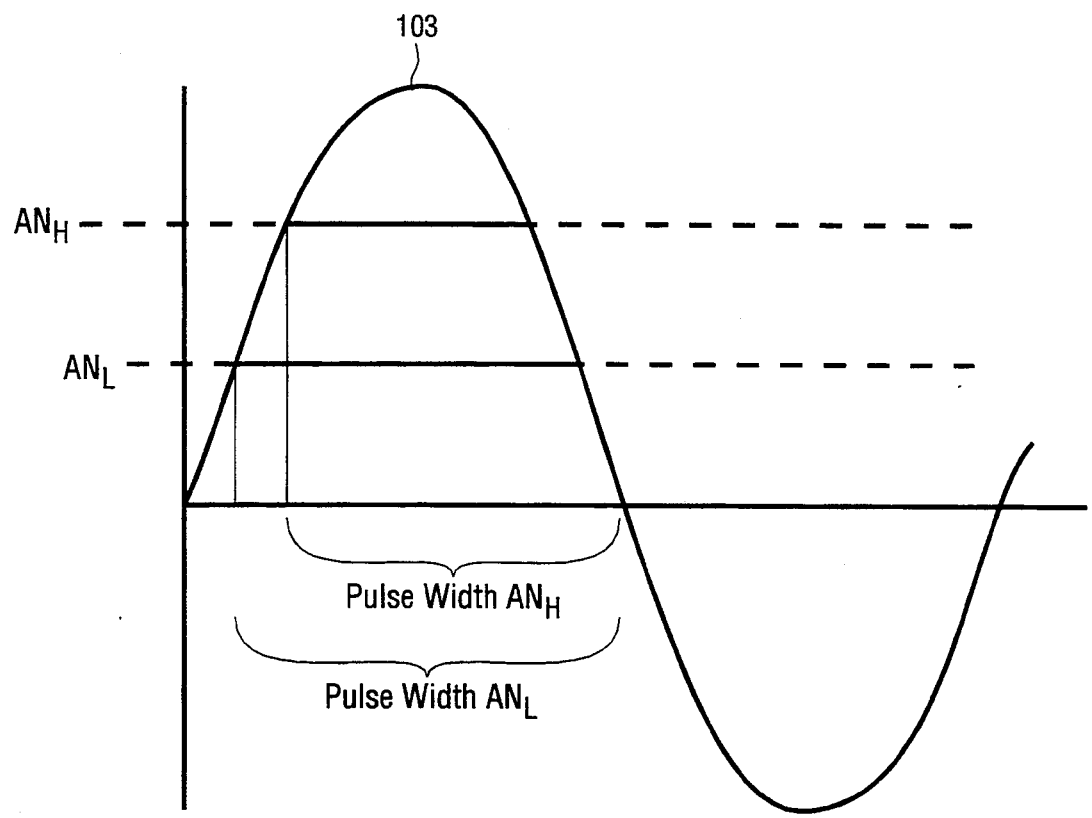

FIGS. 9A–9B illustrate the circuitry and operation of the variable analog control signals of the present invention.

Figure 10:
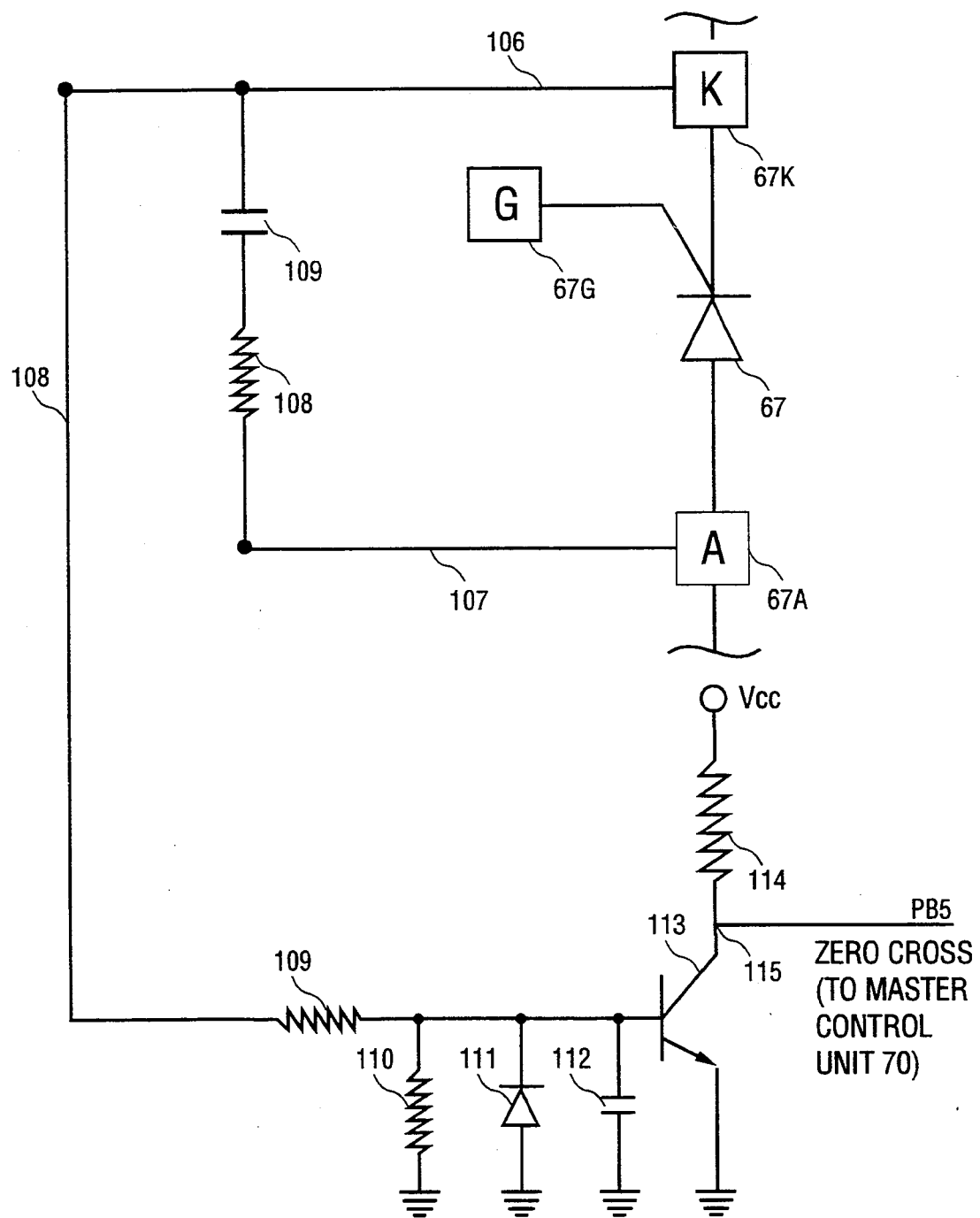

FIG. 10 illustrates circuitry for generating the ZERO CROSS signal.

Figure 11:
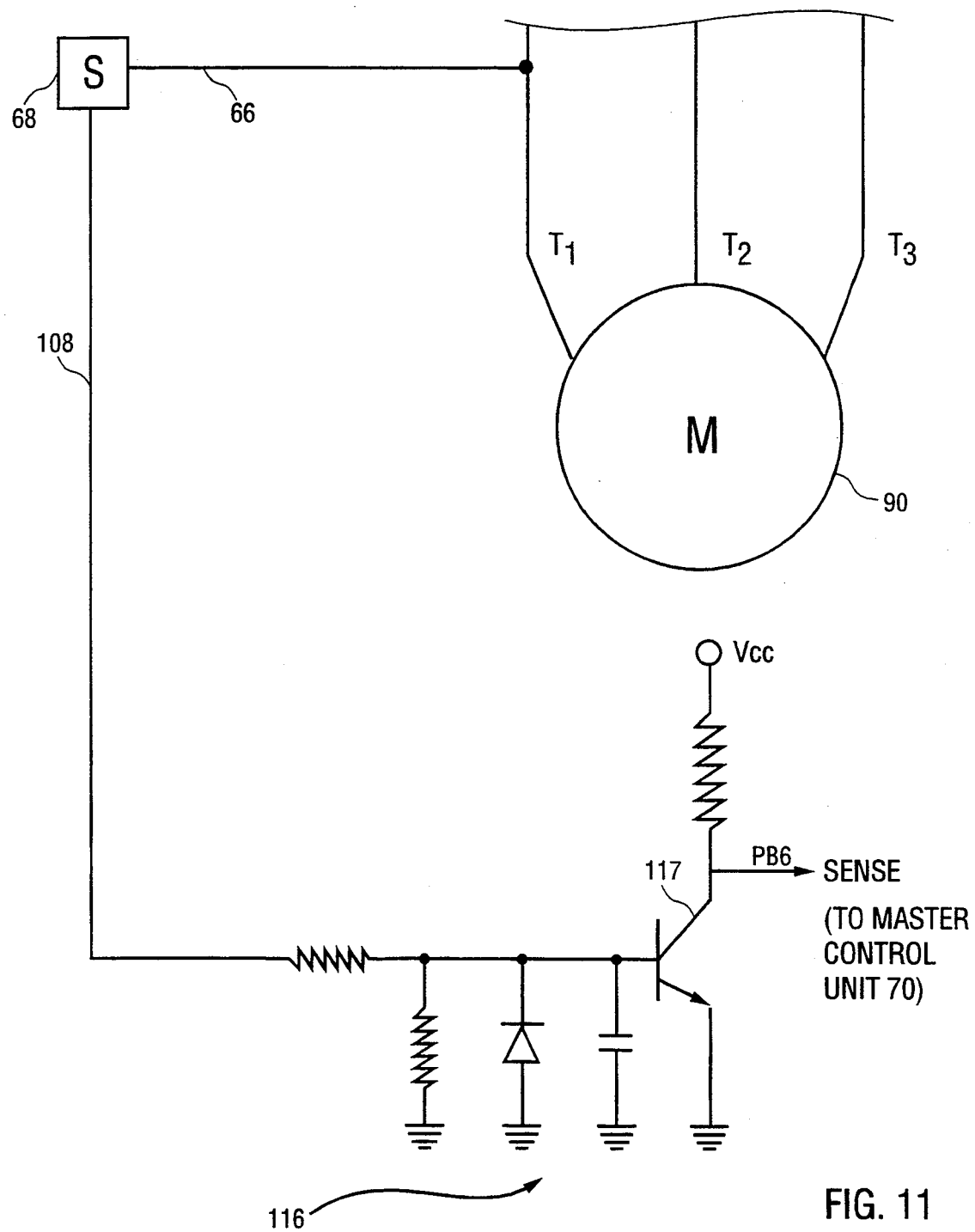

FIG. 11 illustrates circuitry for generating the SENSE signal.

Figure 12:
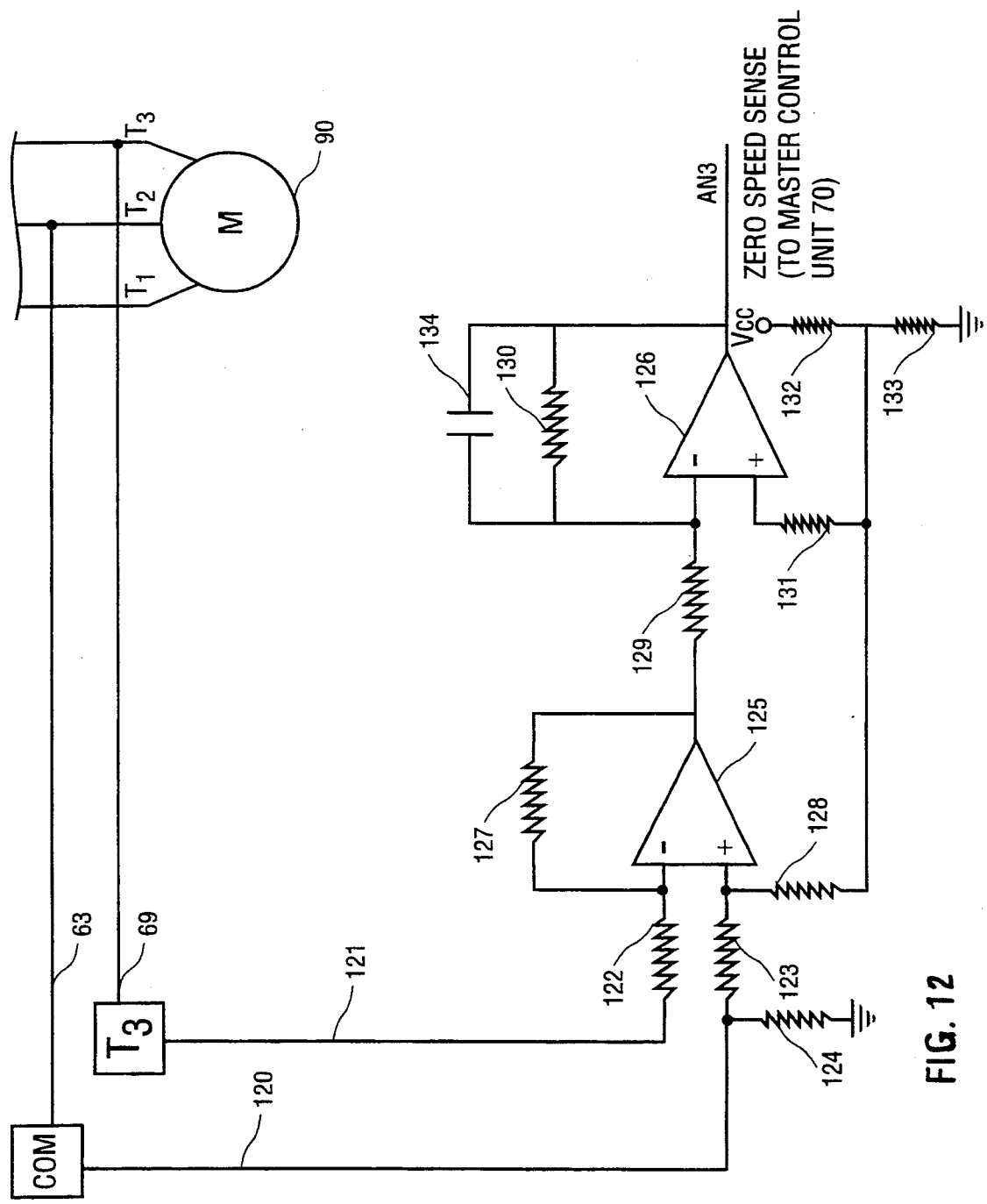

FIG. 12 illustrates circuitry for generating the ZERO SPEED signal.

Figure 13:
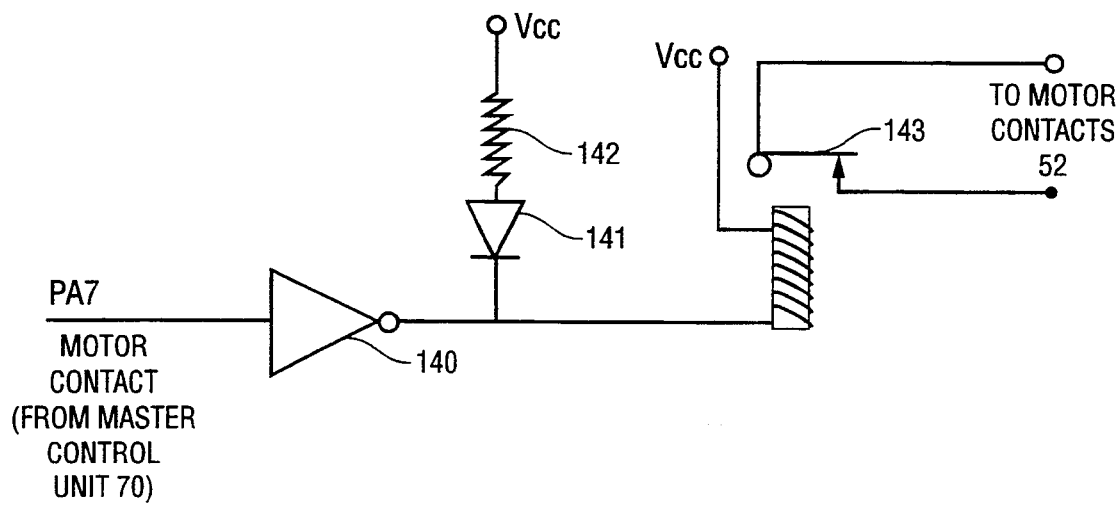

FIG. 13 illustrates a circuit for generating the MOTOR CONTACT control signal and for controlling the motor contacts.

Figure 14:
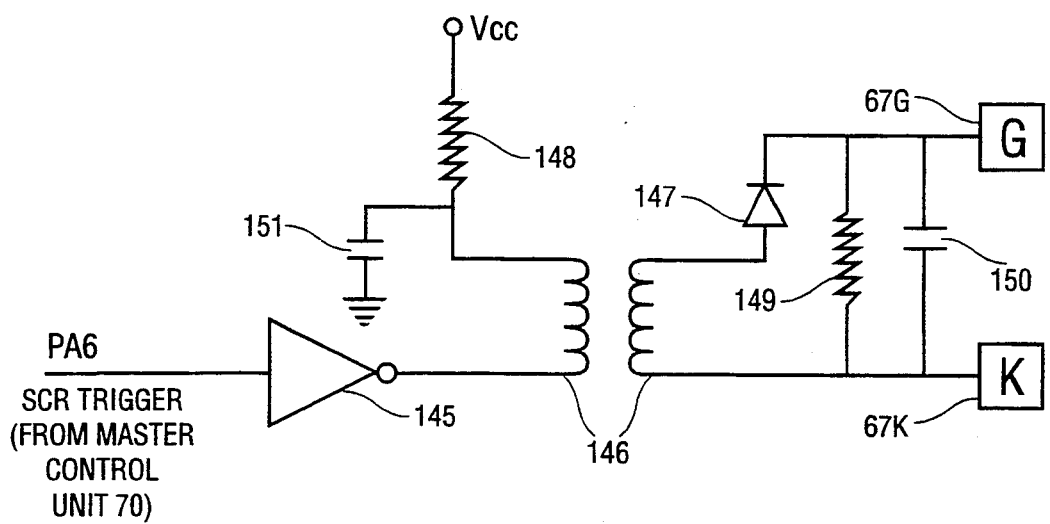

FIG. 14 illustrates the SCR trigger circuitry of the present invention.

Figure 15:
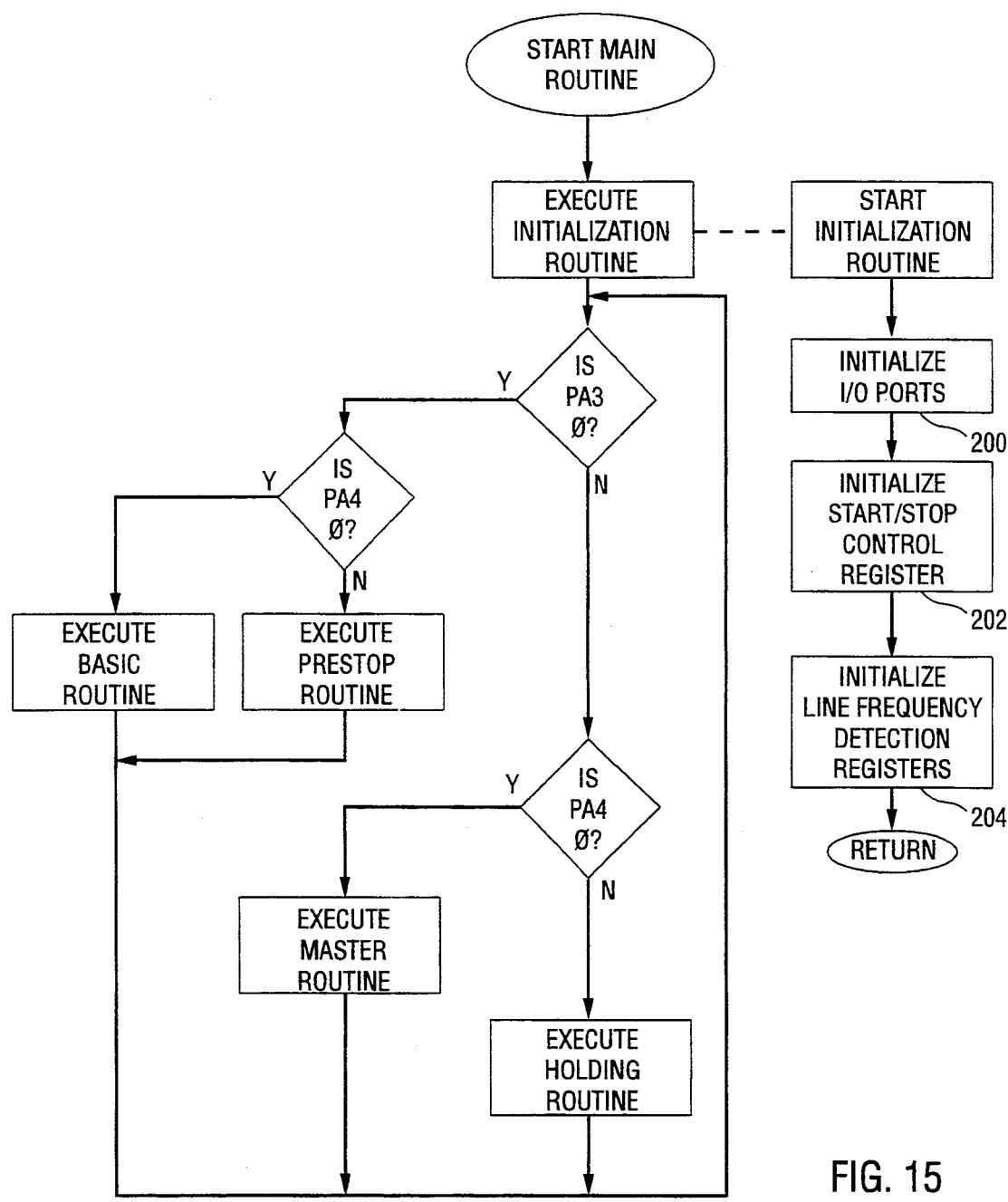

FIG. 15 is a flow diagram of the main program routine used in the control logic of the present invention.

Figure 16A:
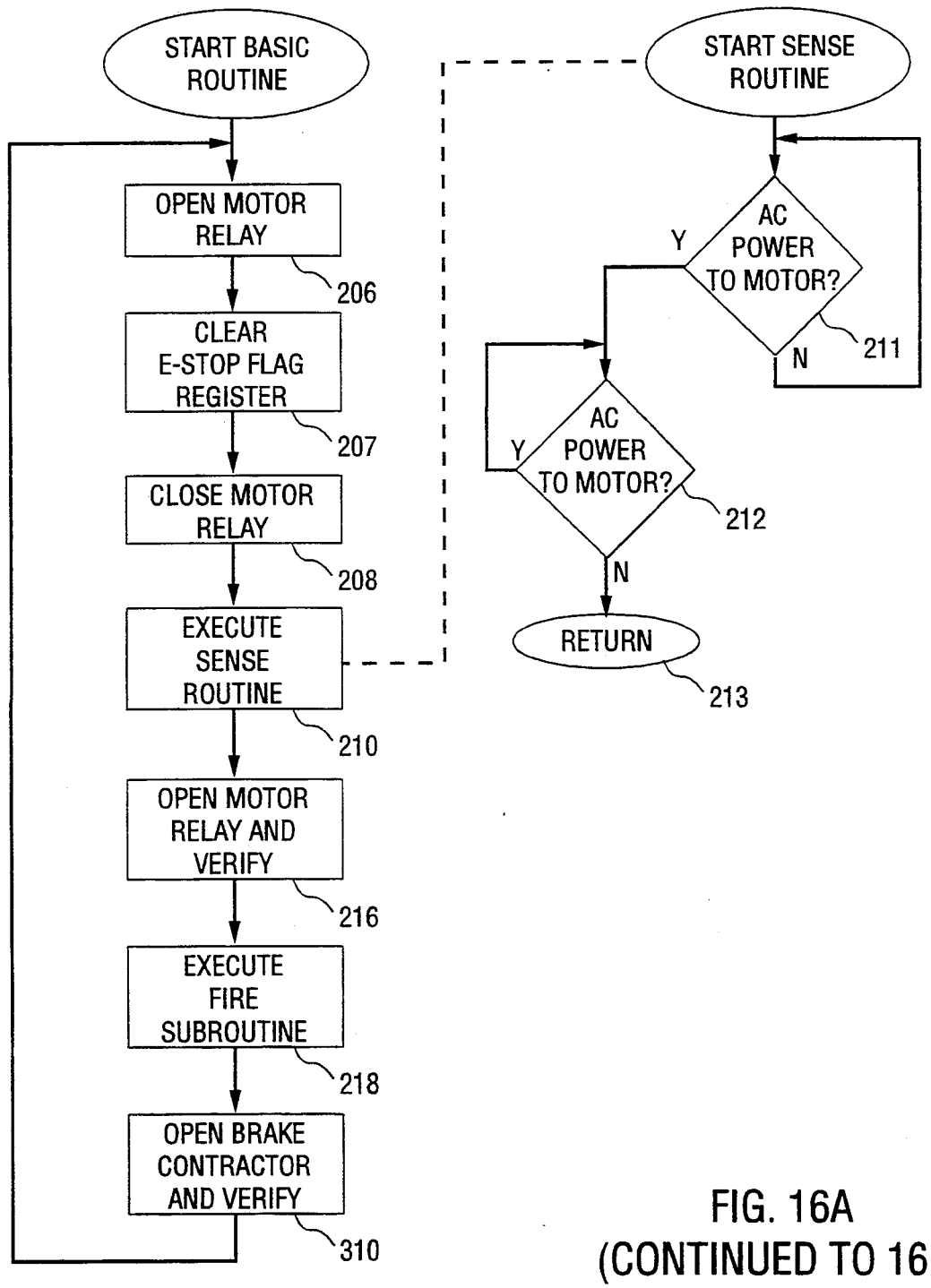

FIGS. 16A–16B represent a flow diagram of the control logic for a BASIC BRAKE routine in accordance with the present invention.

Figure 17A:
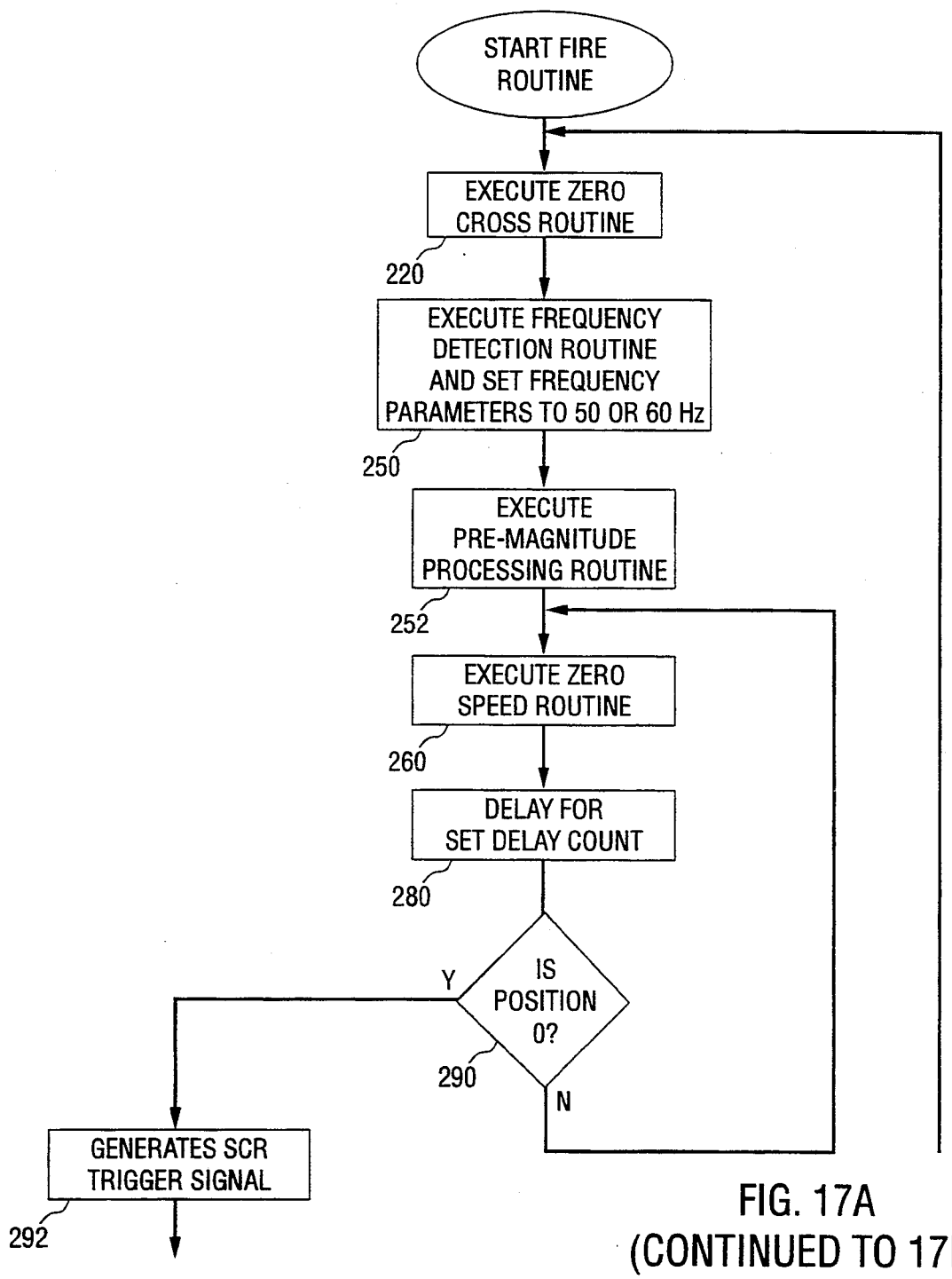

FIGS. 17A–17B illustrate a logic flow diagram for a FIRE routine in accordance with the present invention.

Figure 18:
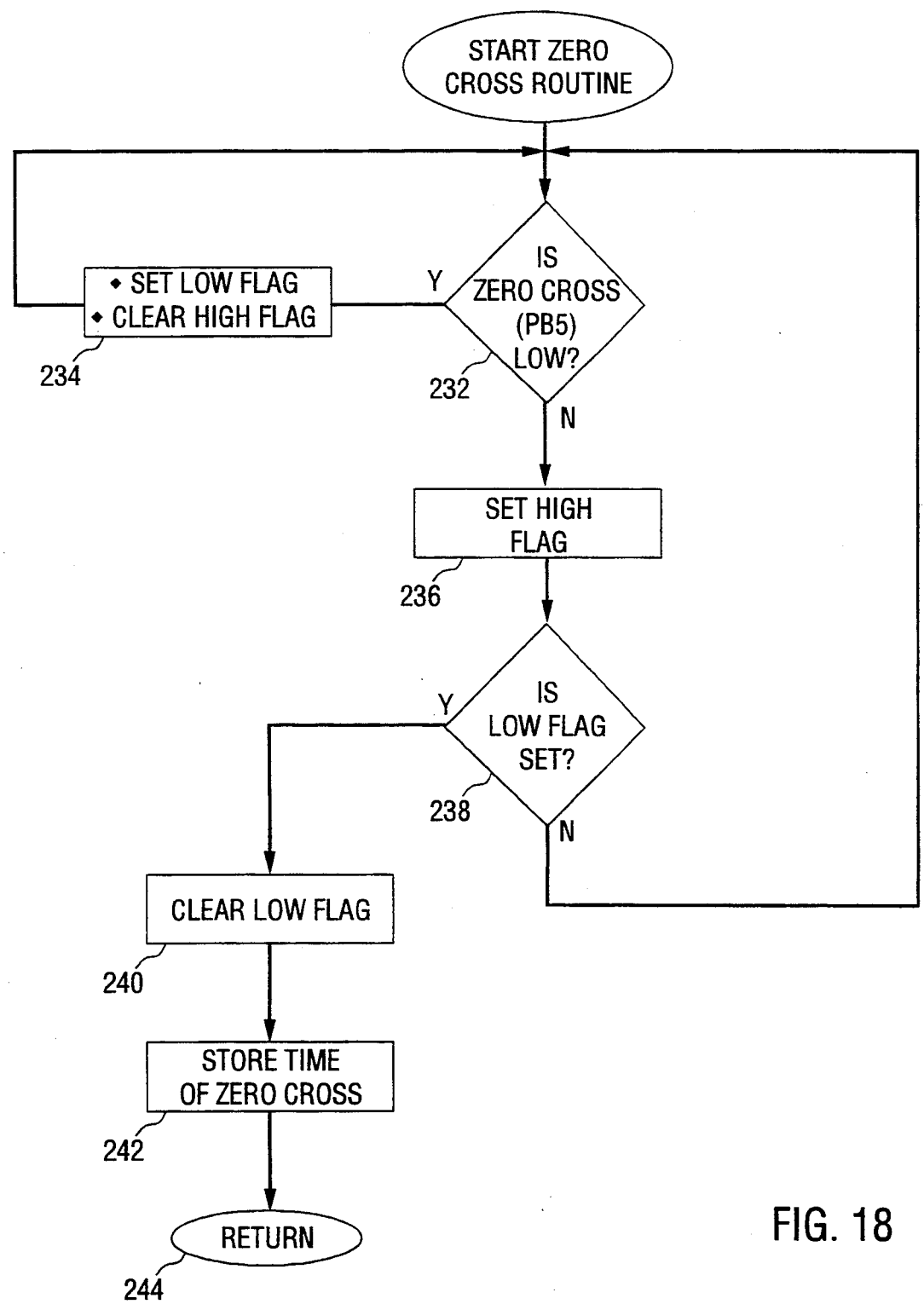

FIG. 18 illustrates a flow logic for a ZERO CROSS routine in accordance with the present invention.

Figure 19A:
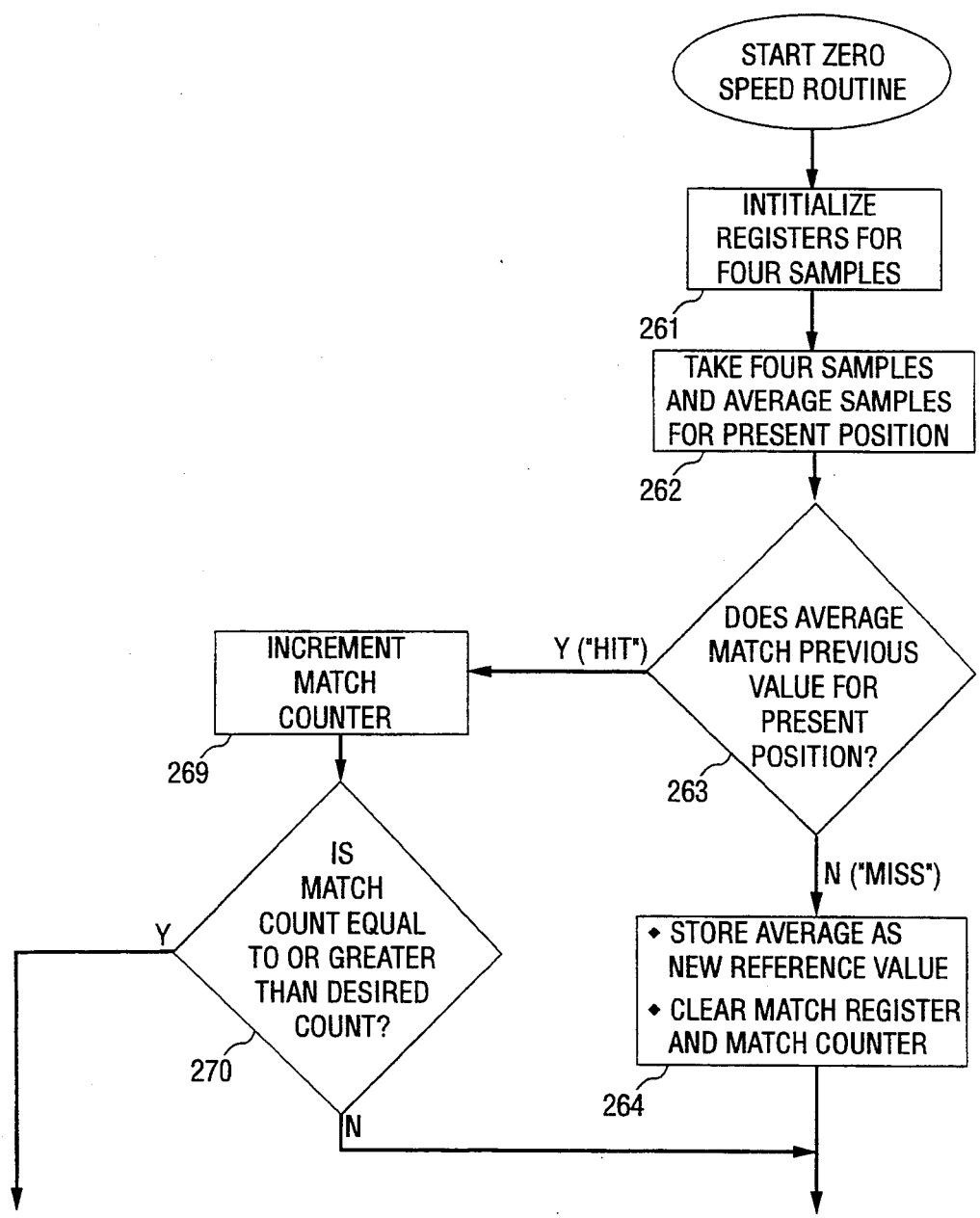

FIGS. 19A–19B are a flow diagram illustrating the logic flow of a ZERO SPEED DETECTION routine in accordance with the present invention.

Figure 20A:
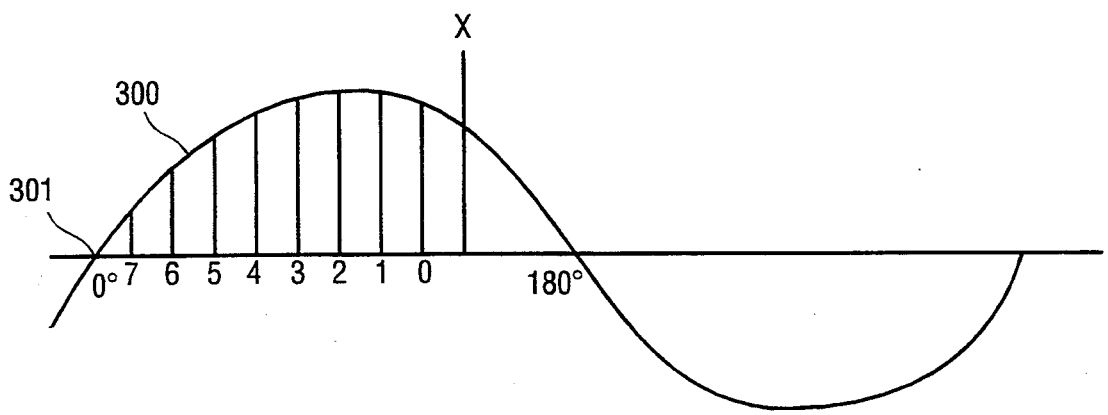
Figure 20B:
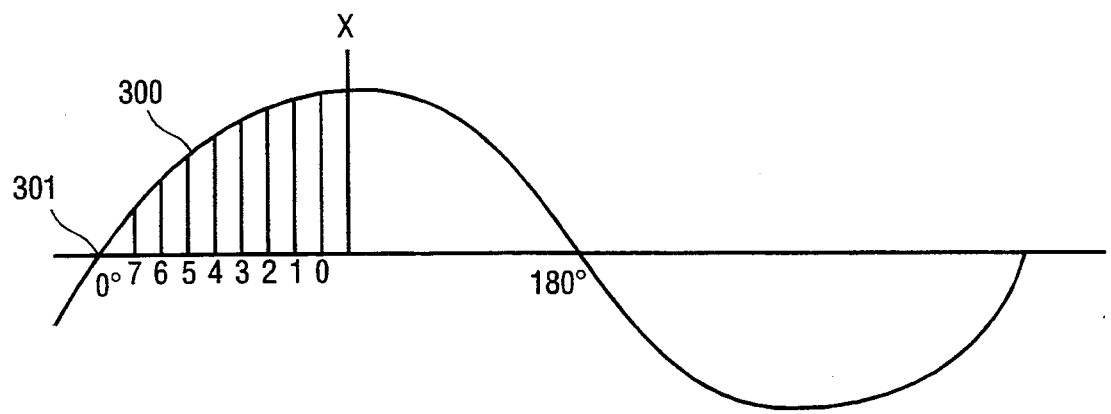

FIGS. 20A–20B illustrate features of a FIRE routine in accordance with the present invention.

FIG. 21 illustrates the control logic for a PRE-STOP routine in accordance with the present invention.

Figure 22A:
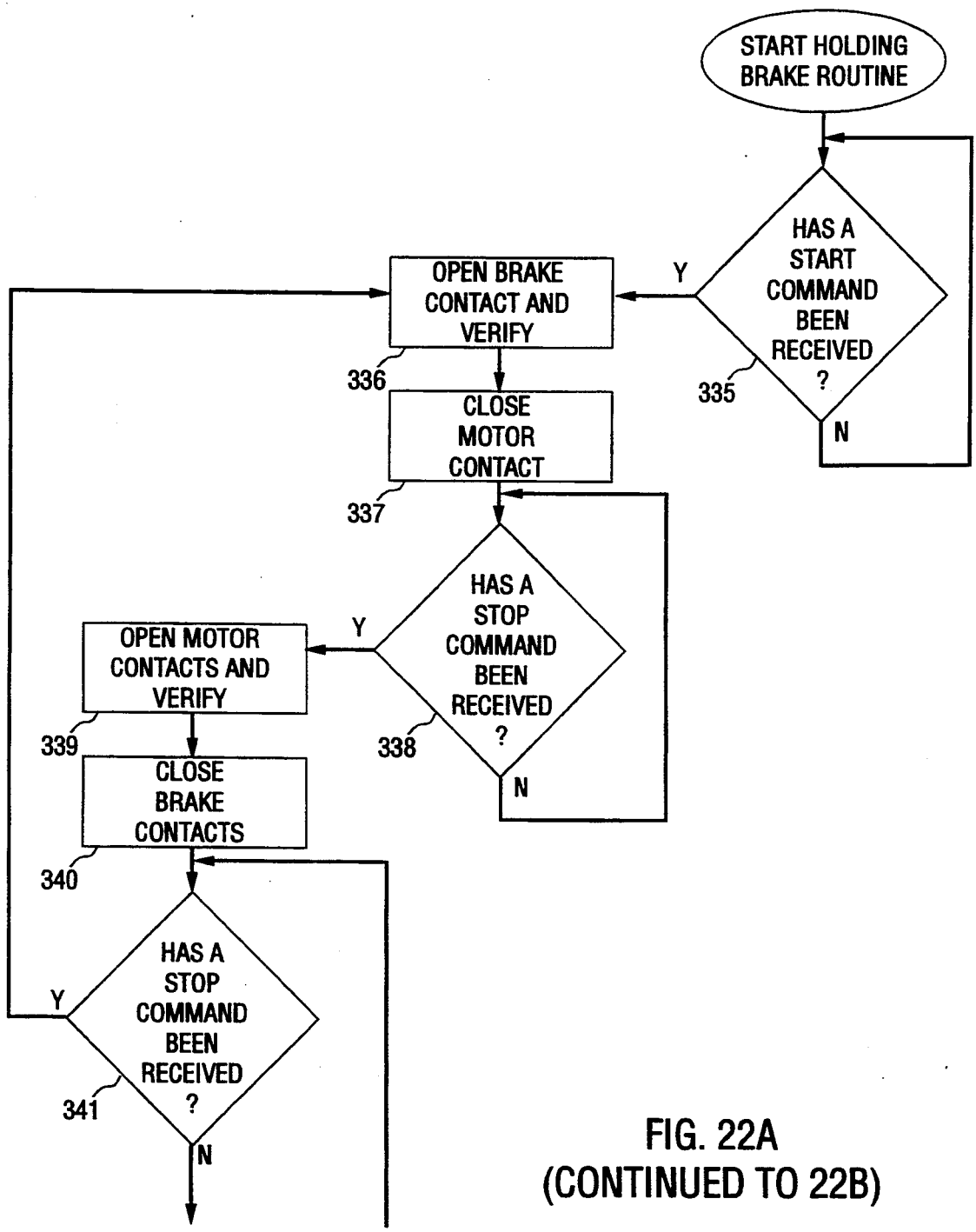

FIGS. 22A–22B illustrate a logic flow diagram of a HOLDING BRAKE routine in accordance with the present invention.

FIGS. 23A–23D illustrate a logic flow diagram of a MASTER BRAKE routine in accordance with the present invention.

4. DESCRIPTION OF A PREFERRED EMBODIMENT

4.1 The Dynamic Brake Assembly of the Present Invention—An Overview

Figure 1:
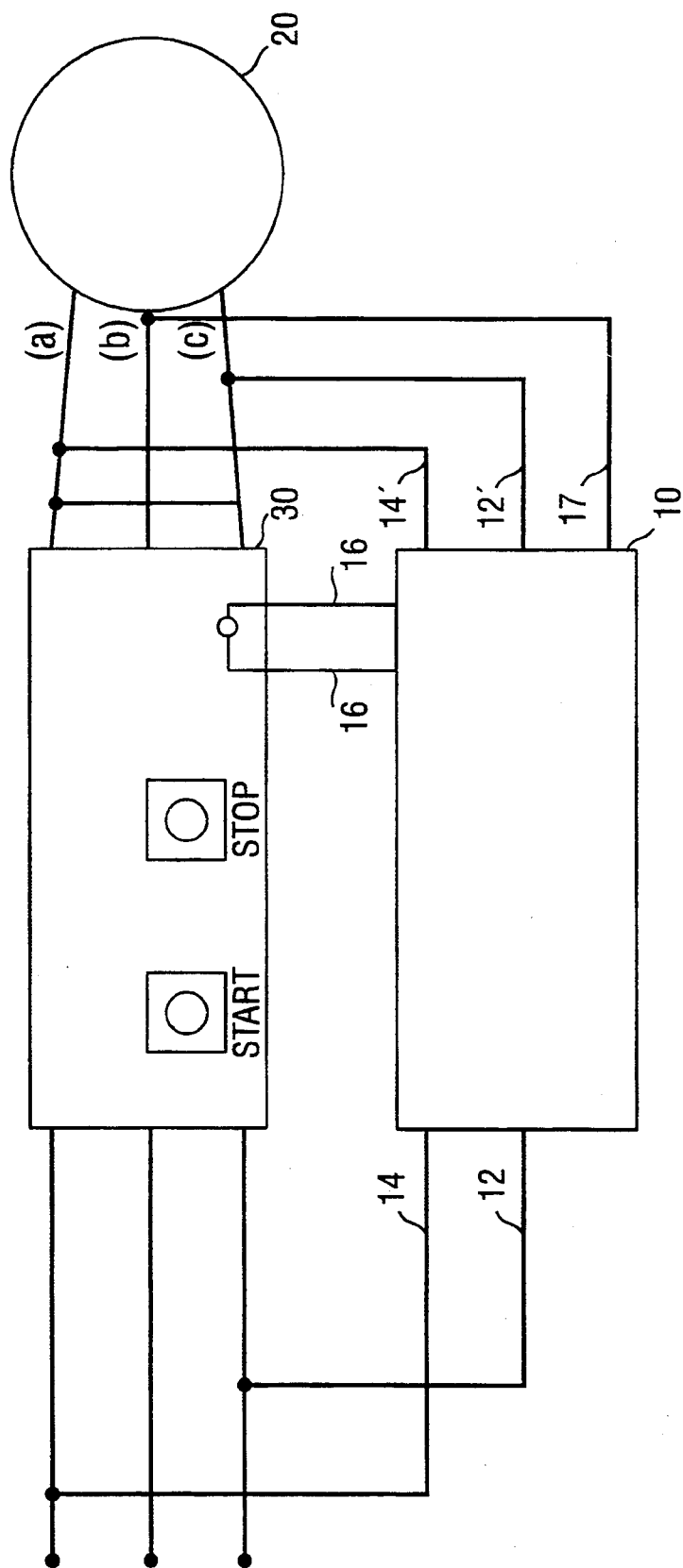
FIG. 1 illustrates the basic operation of a typical electronic dynamic brake assembly.
Figure 2A:
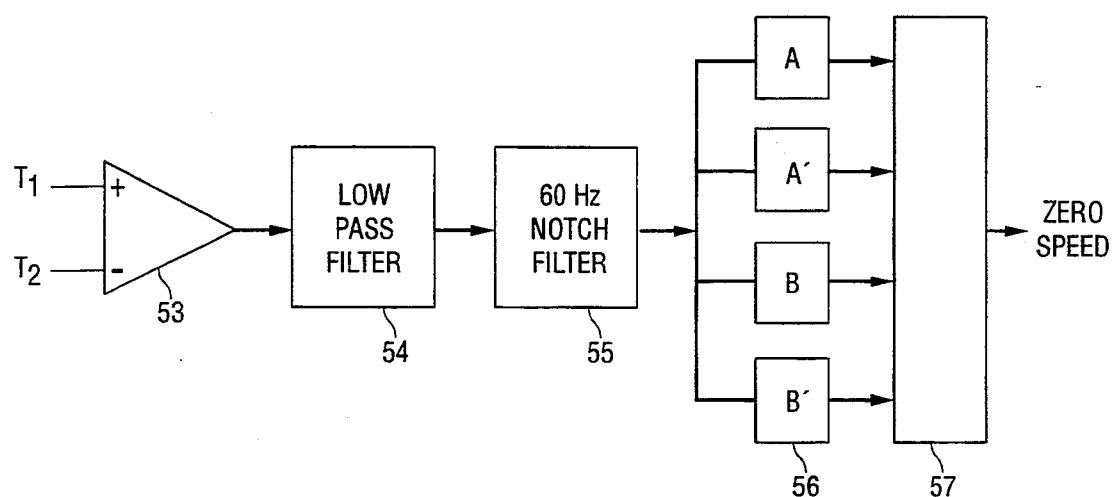
FIGS. 2A and 2B illustrate a prior art zero-speed sensor.
Figure 2B:
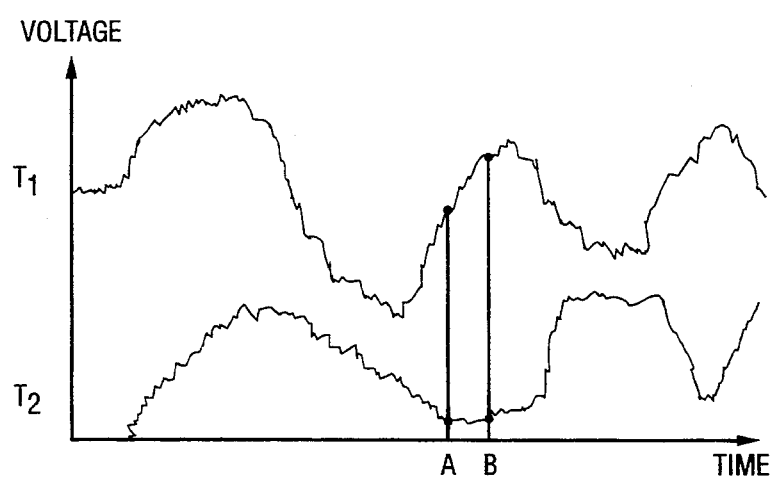

FIG. 3 generally illustrates the brake assembly of the present invention in combination with an AC motor 90 and motor starter 50. As illustrated in FIG. 3, the brake assembly of the present invention 60 is coupled via brake contacts and silicon controlled rectifier ("SCR") circuitry 80 to an AC motor 90. The brake assembly is coupled in parallel with a motor starter 50. The motor starter 50, with appropriate controls 55, is coupled to the AC motor 90 in a manner similar to that for the prior art device illustrated in FIG. 1.

FIGS. 4A–4D illustrate in greater detail the brake contacts and SCR circuitry 80 of the present invention.

Figure 4A:
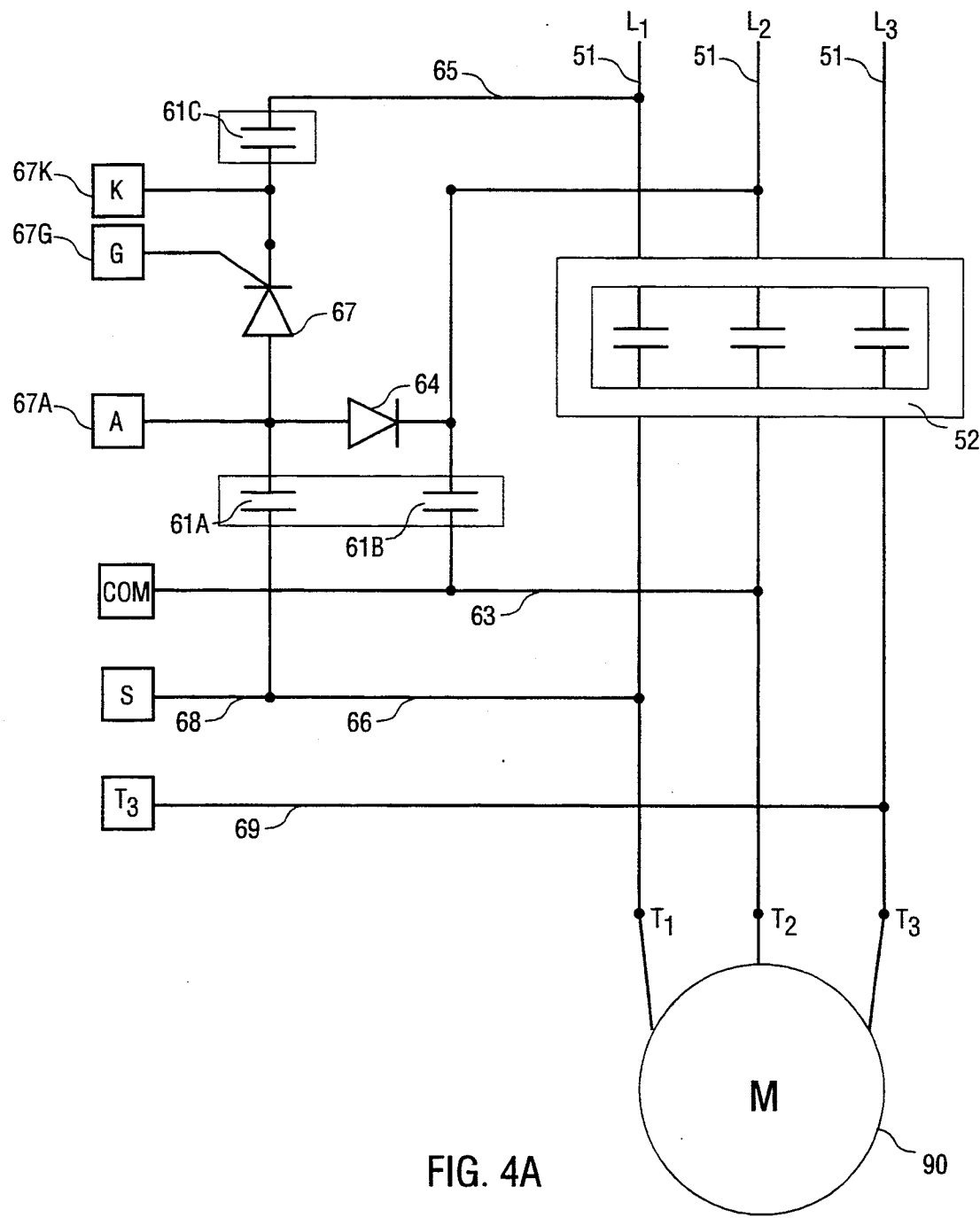
Figure 4B:
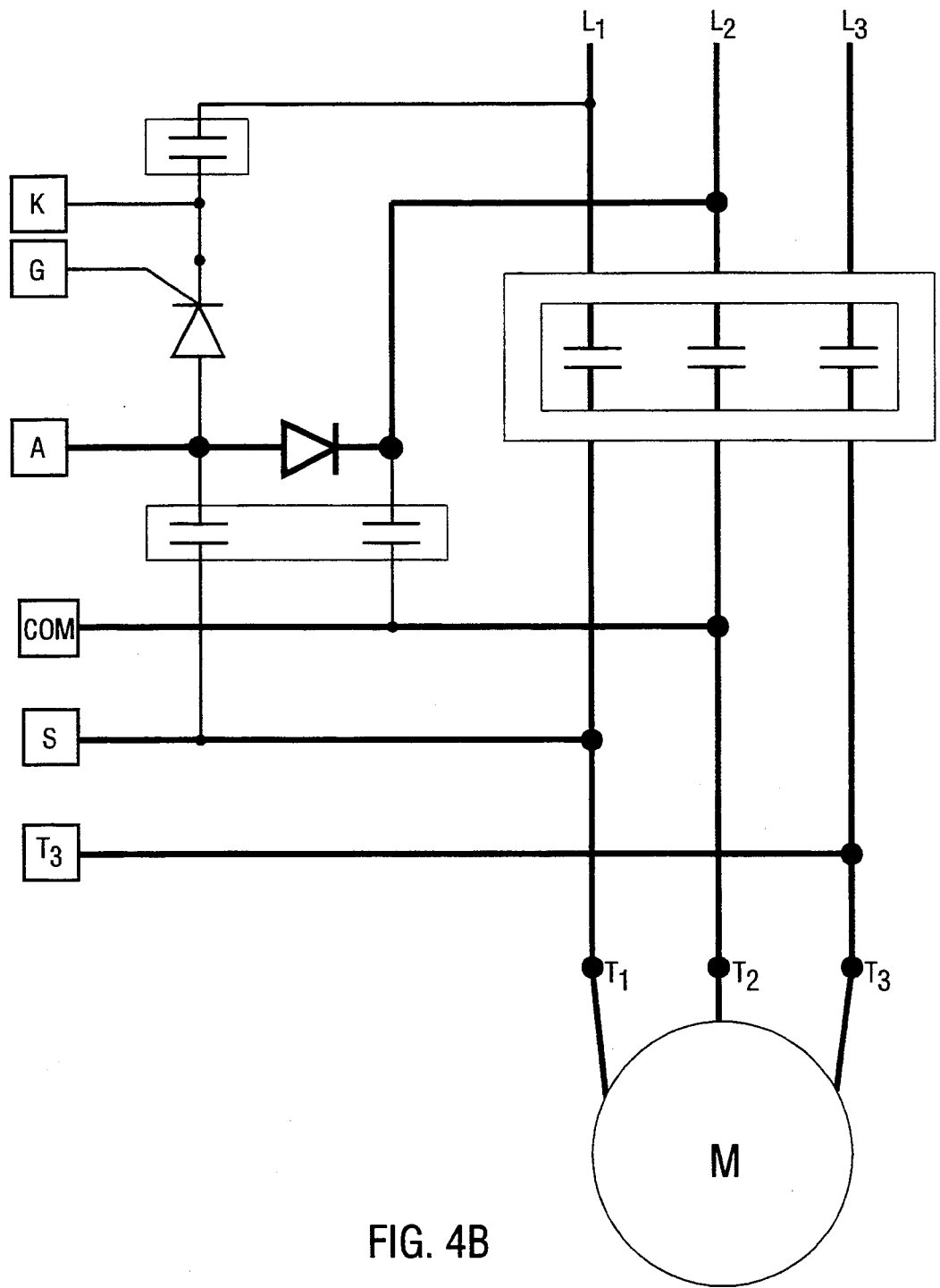

As illustrated in FIG. 4A, three motor starter contacts 52 couple three phase power lines (L1, L2, L3) 51 to the three motor input terminals (T1, T2, T3) 90. In the present invention, the status of the motor contacts 52 (i.e., open or closed) is determined by the controls 55 associated with the motor starter 50 or with the controls 70 associated with the dynamic brake assembly 60. When the motor contacts 52 are closed three phase power is passed from the line 51 to the stator of the motor 90. This is illustrated in FIG. 4B where the dark lines represent current paths. Note that the brake contacts 61a–61c are open when the motor contacts are closed.

Figures 4C, 4D:
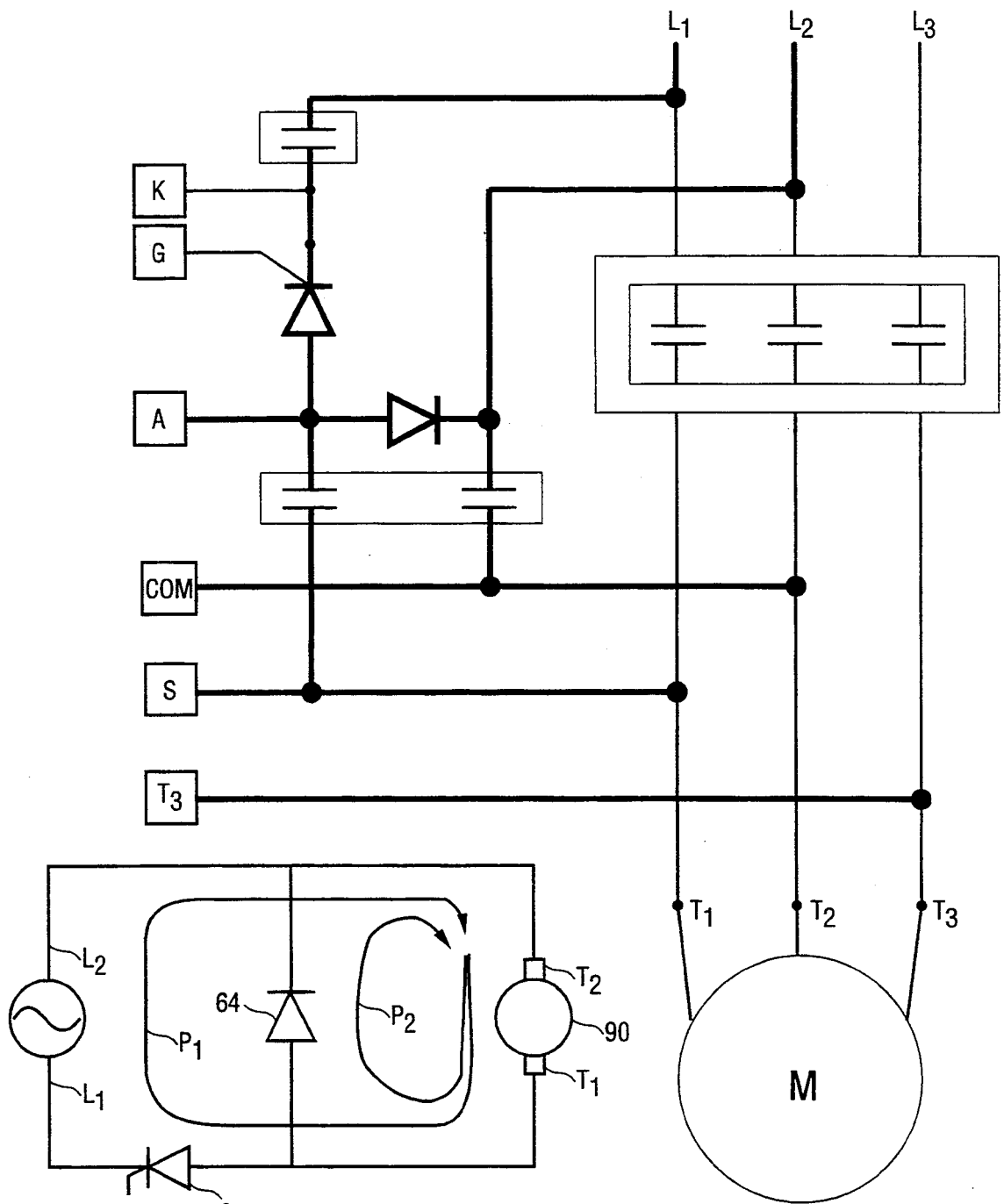
Figure 5A:
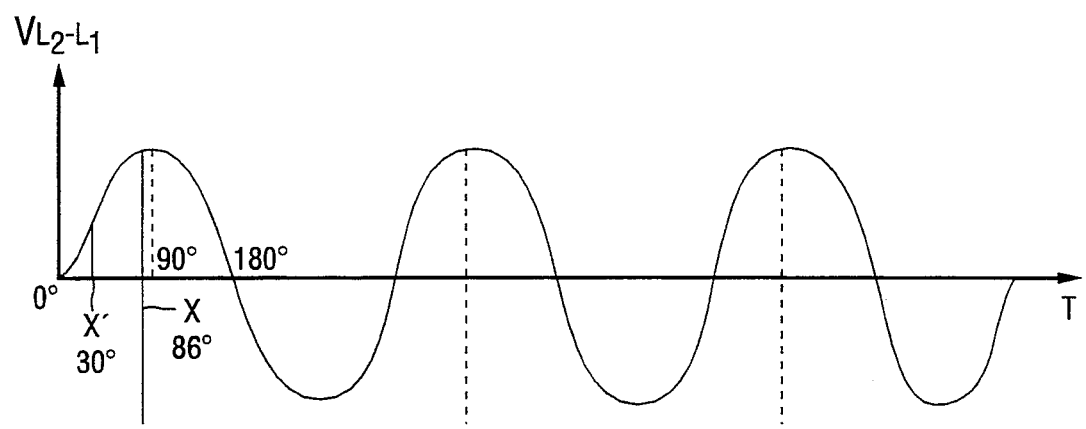
Figure 5B:
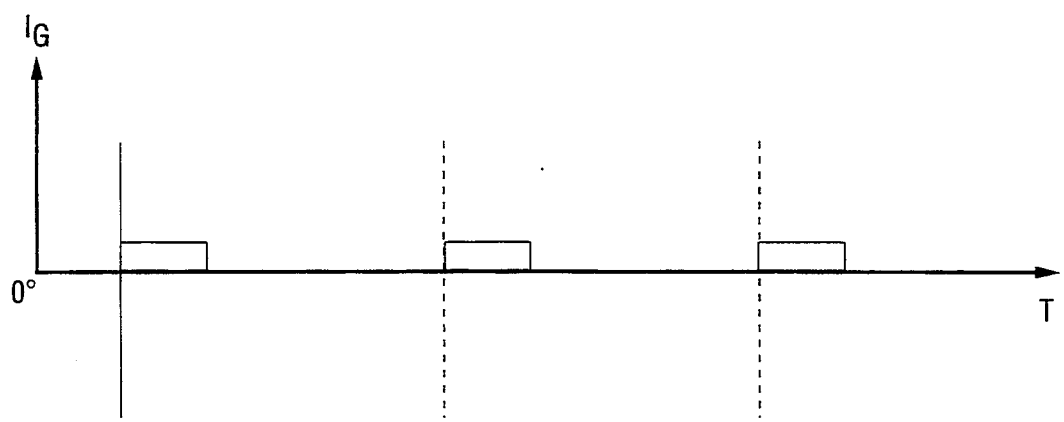
Figure 5C:
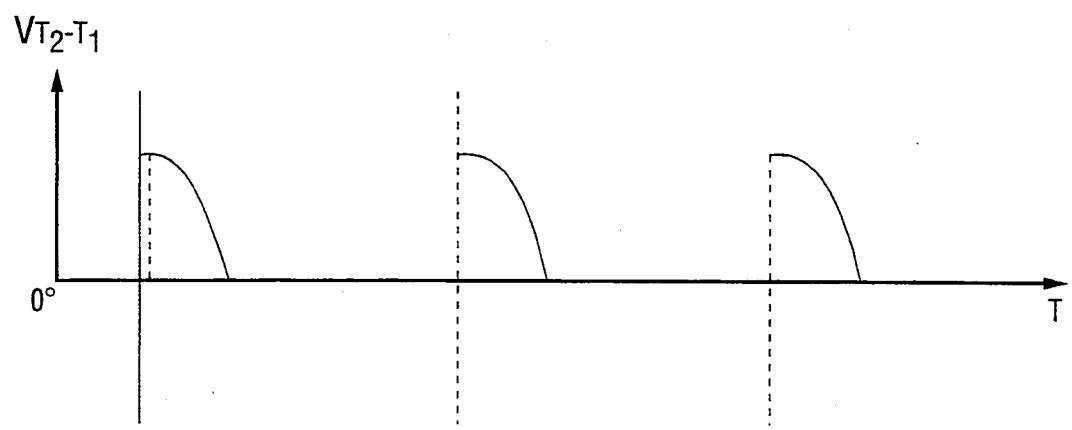
Figure 5D:
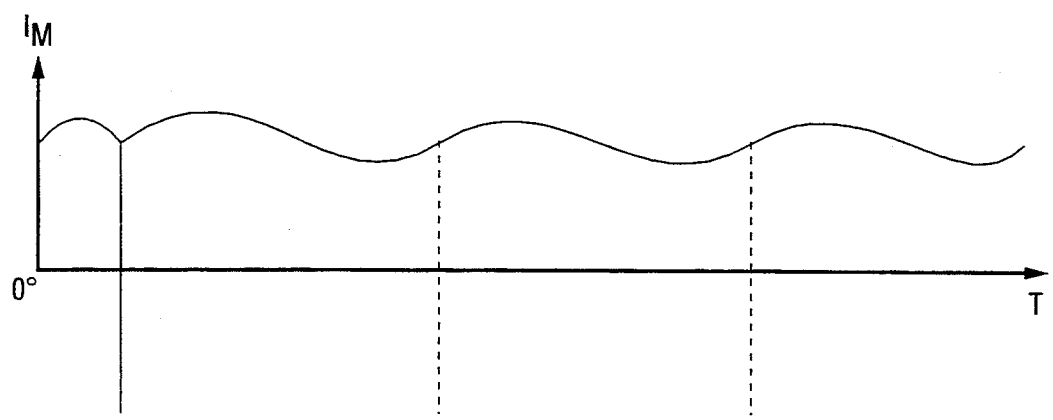

In addition to the three motor contacts, FIG. 4A also illustrates three brake contacts 61a–61c. These brake contacts couple the brake assembly of the present invention to both the power lines 51 and to the motor input terminals. When the brake contacts 61 are closed the brake is coupled to both the motor and the power supply; when the contacts are open, the brake is decoupled from the motor. FIG. 4C illustrates the status of the circuit when the brake contactors are closed. As before, the dark lines represent current paths. As discussed in more detail below, the present invention includes circuitry for ensuring that the motor contacts and the brake contacts are never closed simultaneously.

In addition to the motor and brake contacts, the circuitry of the present invention includes a diode and a silicon controlled rectifier ("SCR") coupled through various leads to a master control unit (not illustrated in FIGS. 4A–4D).

As illustrated in FIG. 4A, an electrically conductive lead 62 is coupled to the power line L2 as is another lead 63 to the second motor terminal T2. Coupled to the junction of these leads (after lead 63 passes through brake contact 61b) is a diode 64. Diode 64 is often referred as a "free-wheeling" diode for reasons to be discussed below. Diode 64 is used to set up the stationary DC field in the motor that is needed for braking. Without diode 64, the voltage and current applied to the motor would look like a pulsating current and a stationary magnetic field would not be established.

As illustrated, leads 65 and 66 are respectively coupled to power line L1 and motor terminal T1. An SCR 67 is coupled between the two leads. Leads from the cathode 67K, gate 67G and anode 67A of the SCR 67 are provided to the master control unit (not illustrated). Another lead 68 (the sense lead S) couples the signal at T1 to the master control unit. Further, a conductive lead 69 is attached to the third motor input terminal T3. This lead 69 is coupled to the master control unit of the present invention and is used for zero-speed sensing.

The operation of the motor when the motor contacts are closed and the brake contacts open (as illustrated in FIG. 4B) will be apparent to those skilled in the art and will not be discussed herein. The operation of the motor when the brake contacts are closed and the motor contacts open is discussed with reference to FIG. 4D.

FIG. 4D is a simplified representation of the above circuitry when the brake contacts are closed and the motor contacts open. Because only two terminals of the motor (T1 and T2) are coupled to the SCR circuitry when the brake contacts are closed the motor is illustrated as a two terminal device. For similar reasons, the power line is illustrated as having only two output supplies. The current paths of the circuit illustrated in FIG. 4D depends on the status of the SCR 67. As understood by those skilled in the art SCR 67 can be gated on or off, depending on the voltages of the cathode, anode and gate of the SCR. When the SCR is gated on, there is a current path P1 coupling the motor 90 to the power lines L1 and L2. Accordingly, current will flow along path P1 and current will flow from lines L1 and L2 through the motor. When, however, the SCR is off, there is no direct current path between the motor 90 and the power lines L1 and L2 and the only path for the current to flow is along the path P2.

As explained below, the SCR 67 may be gated on and off in such a manner that a controlled amount of direct current (DC current) is applied to the motor. The manner in which this occurs is illustrated in FIG. 5. Waveform (A) in FIG. 5 illustrates the voltage across power lines L2–L1. Waveform (B) illustrated the gating current applied to SCR 67. As understood by those skilled in the art, SCR 67 will turn on and conduct whenever the voltage across the SCR (i.e., the anode to cathode voltage) is positive and a positive current is applied to the gate. Waveform (C) illustrates the voltage signal applied to the motor across terminals T2–T1. As illustrated, a positive voltage is applied to the motor terminals whenever the SCR 67 is gated on. Waveform (D) illustrated the current flowing through the motor terminals T1–T2. As illustrated, the current through motor terminals T1 and T2 (labeled Im for the motor current) increases whenever a positive voltage from the power lines is applied to the motor (i.e., when the SCR is gated on) and decreases otherwise (i.e., when the motor current is flowing through the diode 64). Although the motor current Im has a slight ripple, it is essentially a DC current that will create a stationary magnetic braking field in the motor. The magnitude of the DC braking current varies in response to the voltage applied to the motor and can be controlled by adjusting the gating of the SCR.

In waveform (A) of FIG. 5 the positive gating current is first applied at a time X. If however, the gating current were applied at an earlier time (illustrated as X') there would be a longer period of time in which positive voltage is applied the motor and thus a longer time for the motor current Im to increase in magnitude. As understood by those skilled in the art, the magnitude of the effective DC current Im applied to the motor can be controlled by adjusting the time at which the gating pulse is applied to the SCR.

In the art, periodic waveforms such as the one illustrated in waveform (A) of FIG. 5, although functions of time, are often referred to in terms of degrees, where 360° represents one period of the waveform. For example, when the waveform (A) in FIG. 5 is viewed in this light, the point X may be considered to occur at an angular position of 86°, while the point X' may be considered as having an angular position of 30°. In the art, the angular position at which the SCR is gated on is referred to as the "firing angle." For reasons discussed above, the value of the "firing angle" corresponds to the magnitude of the DC braking current applied to the motor.

Through minor adjustments that will be apparent to one skilled in the art, the embodiment described herein may be adapted for use with most all AC motors. Retrofitting older machines with mechanical brakes is easy with the brake of the present invention since no mechanical connections are required.

4.2 The Structure of the Dynamic Brake Assembly of the Present Invention

FIG. 6 is a block diagram of the dynamic brake assembly of the present invention. As illustrated, a master control unit 70 is coupled to various other control circuits. In one embodiment, the master control unit is a microprocessor, such as the 68HC05P9 available from Motorola, Austin, Tex., although other microprocessors and other controllers (e.g., a discrete circuit controller) may be used. Additional information concerning the 68HC05P9 may be found in technical literature available from Motorola.

One circuit coupled to the master control unit 70 is an oscillator circuit comprising resistor 71, capacitors 72 and 73, and crystal oscillator 74. In one embodiment, the crystal oscillator 74 is a 4 mHz HC25UV oscillator, available from Motorola, although other oscillators may be used. The purpose of the oscillator circuit is to provide clock signals to the master control unit. An understanding of the design and operation of oscillator circuits such as the one illustrated in FIG. 6, is not essential to an understanding of the present invention and will not be discussed herein in any detail.

Also coupled to the master control unit is reset circuitry 76 comprising a voltage source 77, a resistor 78 and reset switch 79. As understood by those skilled in the art, the activation of the reset switch 79 will reset the master control unit 70 to a predetermined initial state. The use of reset circuitry with microprocessor control units is well understood and is discussed below only as it related to the present invention.

In addition to the oscillator and reset circuits, a reference voltage 80 is applied to the master control unit 70. The reference voltage is established through resistor 81 and capacitor 82 and is used to provide a base against which various control signals can be compared. In a preferred embodiment of the invention, the reference voltage is 5 volts.

A light emitting diode (LED) circuit 83, comprising resistor 84 and LED 85 is also coupled to the master control unit 70. In the embodiment illustrated in FIG. 6, the LED circuit 83 is used by the master control information 70 to convey information to the human user of the brake assembly. For example, the LED light can indicate a first state when off, a second state when on continuously, and a third state when blinking. In other embodiments of the invention, master control unit 70 can control the timing of the blinking of LED 85 such that specific information concerning the operation of the dynamic brake is conveyed through the use of a digital code. Although an LED circuit is illustrated in FIG. 6, other communicating devices (e.g., LED display, small video display) may be used to convey the same types of information.

4.2.1 The Control Buttons

In one embodiment of the present invention, five control buttons (START, STOP, E-STOP, JOG and BRAKE RELEASE) are used to control the operation of the dynamic brake assembly. These control buttons and their associated circuitry are collectively represented by Box 80 in FIG. 6 and are coupled to the master control unit 70 by five input lines PA0–PA4. These control buttons and their associated circuitry may be located in a properly configured NEMA enclosure, positioned in a location accessible to the operator of the motor. One such enclosure, with the five control buttons is illustrated in FIGS. 7A.

FIG. 7B illustrates the basic circuitry associated with the control buttons. Only one button circuit is illustrated as the circuits are identical for each of the five buttons. A button or switch 86 is coupled to a control signal line 87 through an inverting buffer 88. Coupled to both outputs of the inverter are resistors 89 and 90 whose other end is coupled to the supply voltage. As understood by those skilled in the art the basic circuit arrangement in FIG. 7B provides for a relatively clear, noise-free signal at the control signals lines to which the circuits are attached. The control signals generated by the five control button circuits are referred to herein as PA0—the START signal, PA1—the STOP signal, PA2—the E-STOP signal, PA3—JOG signal; and PA4—the BRAKE RELEASE signal. The use of these signals by the master control unit 70 is discussed in detail below.

4.2.2 The Status Control Switches

Referring back to FIG. 6, in addition to the five control signals from the control buttons, the master control unit 70 receives five digital status control signals (PC0, PC1, PC2, PB7, PD7) from five status control switches represented by Box 95 in FIG. 6. Two of the digital control signals (PB7, PC0) are referred to as the TIME signals; two others (PC1, PC2) as the MODE signals and one (PD7) as the ZERO SPEED DISABLE signal. As with the control buttons, the status control switches and their associated circuitry may be located in a NEMA enclosure.

FIG. 8A illustrates the circuitry used to generate the digital status control signals. Only one control circuit is illustrated as the circuitry is identical for all five of the digital signals. Basically, the circuitry consists of a resistor 96 coupled between voltage source and ground through a control switch 97. In one embodiment of the present invention DIP switches may be used for the five switches 97. An output terminal is provided at the junction of the control switch 97 and the end of resistor 96 not coupled to the voltage source. As understood by those skilled in the art, when the switch is closed the voltage at the output terminal will be near ground (a logic "0") and, when the switch is open the output voltage will be near the voltage of the voltage source (a logic "1").

In one embodiment of the present invention the control signals PB7 and PC0 operate together to set the rough maximum brake time for the brake assembly of the present invention. The rough maximum brake time is roughly the maximum time allowed for a braking cycle. Thus, if a brake cycle is initiated (e.g., by activation of the STOP button) the dynamic brake assembly of the present invention will not apply DC current to the motor after expiration of the preselected maximum braking time.

In a preferred embodiment of the present invention control signals PB7 and PC0 allow the operator to select one of four maximum rough time periods: 15 seconds, 30 seconds, 45 seconds or 60 seconds. FIG. 8B illustrates the settings for the control switches and the corresponding maximum rough times. As understood by those skilled in the art, other setting codes and other rough time settings may be used.

In a manner similar to that discussed above with respect to control signals PB7 and PC0, control signals PC1 and PC2 are used to select the operating mode of the present invention. As discussed above, the dynamic brake assembly of the present invention is capable of operating in four modes: BASIC (similar to a slave mode), PRE-STOP, HOLDING and MASTER. FIG. 8C illustrates the settings of the MODE control switches for each of the four modes.

The BASIC mode of the brake assembly of the present invention is similar to the slave mode of prior art assemblies discussed above.

The BASIC, PRE-STOP and HOLDING modes of the single brake assembly are similar to those discussed above for the separate brake assemblies of the prior art. The MASTER mode is a mode unique to the brake assembly of the present invention which is discussed in greater detail below.

Control signal PD7 is used to control the operation of the zero-speed detector. When the switch accompanying control signal PD7 is set, zero-speed sensing is enabled; otherwise zero-speed sensing is disabled.

4.2.3 The Analog Control Potentiometers

Referring back to FIG. 6 it may be noted that in addition to the control button signals and the signals from the status control switches, the master control unit also receives three analog signals (AN0, AN1 and AN2) from the analog control potentiometers represented by Box 100. The analog control signals AN0, AN1 and AN2 are respectively referred to as the MAGNITUDE-1 signal (AN0), the MAGNITUDE-2 signal (AN1) and the FINE TIME signal (AN2).

FIG. 9A illustrates the circuitry for generating the variable analog control signals AN0, AN1 and AN2. Again only one circuit is illustrated as the circuitry is identical for all three signals. Such circuitry comprises a variable potentiometer 101 connected between a voltage source and ground. As understood by those skilled in the art, the resistance of the potentiometer 101 may be manually adjusted to vary the analog voltage on output line 102 from a voltage near ground to a voltage near the voltage source to which the potentiometer is coupled.

As discussed above, analog control signal AN0 is the MAGNITUDE-1 signal while signal AN1 is the MAGNITUDE-2 signal. These two signals are used to determine the magnitude of the DC braking current applied to the motor when the dynamic brake of the present invention is activated. As discussed above, the magnitude of the DC braking current applied to the motor directly corresponds to the firing angle of the SCR circuit. AN0 and AN1 are used to set voltage levels which determine the firing angle of the SCR 67. The operation of AN0 and AN1 in setting the firing angle is illustrated in FIG. 9B.

FIG. 9B illustrates a AC voltage waveform 103, such as waveform (A) in FIG. 5, applied to the SCR circuit. The lines $AN_x$ represent the voltage values of control signals AN0 and AN1. In the present invention, the master control unit 70 is configured to initiate the firing of the SCR circuit whenever the input voltage exceeds the value of AN. As illustrated, by raising or lowering the voltage AN0 and AN1 it is possible to vary the firing angle of the SCR circuit. For example, a low value of AN0 or AN1 (represented by $AN_l$) results in a smaller firing angle, a greater pulse width and greater DC current magnitude than a high value of AN0 or AN1 (represented by $AN_h$). As discussed in more detail below the brake assembly of the present invention monitors the zero crossing of waveform 103 and utilizes a time delay before firing to ensure proper firing of the SCR.

In one embodiment of the present invention AN0 is used to set the magnitude of the DC braking current for a normal braking cycle and AN1 is used to set the magnitude for the DC braking cycle for an emergency braking (E-STOP) cycle. In many instances, for purposes of maintaining the motor and equipment to which it is attached, it is desirable to brake a motor at a rate less than the maximum braking rate the motor can accommodate. Accordingly, in a normal braking operation, the DC braking current applied to the motor will generally be less than the maximum DC braking current that the motor can handle. Control signal AN0 is used to set the magnitude of this normal braking current.

While it is desirable in most instances to brake the motor with less than the maximum braking current, in certain emergency situations it is important to brake the motor as fast as possible. Accordingly, the dynamic brake assembly of the present invention includes an emergency stop ("E-STOP") feature for braking the motor as fast as possible in emergency situations. Thus, the magnitude of the emergency DC braking current is normally greater than the magnitude of the normal braking current. AN1 is used to set the value of the emergency braking current.

Analog control signal AN2 is the fine braking time. By adjusting the potentiometer associated with AN2 the voltage of AN2 may be made to vary from a value of close to ground, which corresponds to a fine braking time of zero seconds, to a value close to the supply voltage, which corresponds to a fine braking time of 17 seconds. As discussed above in §4.2.2, the rough braking time is set by control signals PB7 and PC0. This rough braking time is used in conjunction with the fine braking time to determine the actual maximum braking time. In one embodiment, the master control logic sets the actual maximum braking time to the value of the rough braking time (defined by signals PB7 and PC0) plus the value of the fine braking time determined by the analog value of AN2. In this embodiment, by adjusting the rough braking time and the fine braking time signals, the actual maximum braking time may be set anywhere between 0 seconds and 62 seconds.

4.2.4 Sensed Input Signals

In addition to the control signals discussed in §§4.2.1–4.2.3 above, the dynamic brake assembly of the present invention utilizes several control signals that are derived from voltages sensed at the motor terminals. In a preferred embodiment of the present invention the sensed signals are: the ZERO CROSS signal (PB5); the SENSE signal (PB6) and the ZERO SPEED SENSE signal (AN3). The circuits for generating the sensed input signals are represented by Box 105 in FIG. 6.

FIG. 10 illustrates the circuitry for generating the ZERO CROSS signal. As illustrated in the Figure the ZERO CROSS circuitry comprises two input leads 106 and 107 which are electrically coupled to the cathode 67K and anode 67A of the SCR 67 as illustrated in FIG. 10. The signal from the anode 67K is coupled to a resistor 109 and a capacitor 109 by lead 107 and the output of the capacitor 109 is coupled to the cathode 67K of the SCR 67 by lead 106. The signal from the cathode 67K of SCR 67 is coupled by lead 108 to a circuit comprising resistors 109, 110; diode 111; capacitor 112; and transistor 113. The collector of transistor 113 is coupled to $V_{cc}$ through resistor 114. The node 115 at which resistor 114 meets the collector of transistor 113 provides the ZERO CROSS signal PB5. The ZERO CROSS signal PB5 will provide a pulse whenever the voltage across the SCR equals zero. As discussed below, the ZERO CROSS signal PB5 is used by the control logic of the master control unit 70 to control the firing of the SCR 67 during a braking operation.

FIG. 11 illustrates the circuitry for generating the SENSE signal. The input to the SENSE signal circuitry is coupled to terminal T1 of the motor lead 66 as illustrated in FIGS. 4A and 11. Referring to FIG. 11, the input signal 68 is passed through the sense circuit 116, which is substantially identical to the lower portion of the ZERO CROSS circuit discussed above. The output of transistor 117 in the SENSE circuit produces a SENSE signal PB6 that will pulse whenever the voltage at T1 is approximately 0 Volts. When the motor is running, SENSE signal PB6 is a pulsed signal whose frequency is substantially equal to the line frequency of the AC voltage applied to the motor 90. In a preferred embodiment, the frequency of PB6 when the motor is running is between 50 and 60 Hz. As discussed more fully below, the SENSE signal PB6 is used by the master control unit 70 to determine when the motor is running.

FIG. 12 illustrates the circuitry for generating the ZERO SPEED signal AN3. The ZERO SPEED signal circuit receives two inputs 120 and 121. The two input leads to the ZERO SPEED signal circuit are coupled to the common terminal 63 and the third terminal of the motor T3 69 as illustrated in FIGS. 4A and 12. Referring to FIG. 12, the two inputs to the ZERO SPEED signal are passed though input resistors 122, 123 and 124 to a differential amplifier arrangement comprising differential amplifier 125 and resistor 127. The output of differential amplifier 125 is an analog signal that corresponds to the difference between the voltages at the common terminal 63 and the third terminal T3 69. This differential analog voltage is passed through a high-pass filter comprising differential amplifier 126 and accompanying resistors 128, 129, 130, 132, 133 and capacitor 134. The output of the high-pass filter comprising differential amplifier 126 is applied as the ZERO SPEED SENSE analog input AN3 to the master control unit 70.

This analog signal AN3 is used in zero speed sensing as discussed in greater detail below.

4.2.5 The Output Signals

In addition to receiving digital and analog control and sense signals as discussed above, the master control unit 70 also provides output signals for controlling the brake contacts, for firing the SCR circuit and for controlling the motor contacts. These output signals are illustrated as Box 130 in FIG. 6. Each of these output signals and their associated circuitry is discussed in detail below.

As illustrated in FIG. 6, the master control unit 70 generates two output control signals for controlling the state of the motor contacts 52 (MOTOR CONTACT signal PA7 and BRAKE CONTACT signal PA5). In operation the corresponding contact is closed whenever the respective contact signal is asserted. A circuit for generating the MOTOR CONTACT control signal and for controlling the motor contacts 52 is illustrated in FIG. 13. The circuitry for generating the BRAKE CONTACT signal and controlling the brake contacts 61 is substantially similar and is not discussed herein.

As illustrated in FIG. 13, the control circuitry receives a MOTOR CONTACT signal PA7 from the master control unit 70. The signal is passed through an inverter 140 and is coupled to a high voltage source through a light emitting diode 141 and a resistor 142. The output of the resistor is also coupled to a relay 143, which controls the status of the motor contacts 52.

FIG. 14 illustrates the SCR trigger circuitry of the present invention. Through the use of this circuitry the SCR 67 is triggered. As illustrated in FIG. 6, the master control unit 70 generates a SCR TRIGGER signal that is applied to the gate 67G of the SCR 67 to fire the SCR. Referring to FIG. 14, the SCR trigger circuitry is illustrated. As indicated in FIG. 14, the SCR trigger circuitry receives a SCR TRIGGER signal PA6 from the master control unit 70. Signal PA6 is passed through an inverter 145 and a step-up transformer circuit comprising transformer 146, diode 147, resistors 148, 149 and capacitors 150 and 151. The two outputs from the transformer circuit are applied to the gate 67G and cathode 67K of the SCR 67 to control the firing of SCR 67.

4.3 The Control Logic for the Brake Assembly of the Present Invention

In addition to the hardware comprising the master control unit and the input and output circuitry, the present invention also comprises the control logic used to implement the novel brake assembly of the present invention. In an embodiment where the master control unit is a microprocessor or microcontroller such as the 68HC0P59 the control logic may be implemented through software control routines stored in a memory device, such as a random access memory device, located internal or external to the master control unit 70. One set of such software control routines that can be used with the 68HC0P59 microprocessor is set forth in the Appendix to this disclosure. Copies of the appendix are available from the United States Patent and Trademark Office. The information set forth in the appendix is part of this disclosure.

For master control units 70 other than the 68HC0P59, the control logic may be implemented through hardwired digital or analog logic (e.g., PLAs and the like) or a software routing similar in function to that set forth in the appendix. Although the control logic may be implemented in any of the above described ways, only a software control routine is discussed in detail herein.

4.3.1 The MAIN Routine

FIG. 15 is a flow diagram of the main program routine used in the control logic of the present invention. One acceptable control routine may be found at lines 227–35 of the appendix. Basically, the main routine can be divided into three discrete steps and functions: (1) initialization, (2) mode selection and (3) mode execution. Each step is discussed below.

*Initialization

A flow diagram for an initialization routine for the present invention is illustrated in FIG. 15. One acceptable initialization routine may be found at lines 236–303 of the attached appendix.

As illustrated in FIG. 15, the initialization program general establishes the various ports of the master control unit as either inputs or outputs (block 200); initializes the START/STOP control register (block 202) and initializes the line frequency detection registers (block 204). The setting of the various ports as inputs and outputs and the initialization of certain control registers is generally understood by those skilled in the art and is explained in materials on the 68COP59 available from Motorola and will not be discussed in any detail herein.

*Mode Selection

Following the execution of the Initialization Routing, the Mode Select routing is executed. Basically, the Mode Select Routine reads the values of PC1 and PC2 to determine which mode setting was selected by the operator. A simple routine, such as the one illustrated in FIG. 15, performs this function and ensures a proper mode selection according to the switch settings discussed in §4.2.2 with respect to FIG. 8C.

*Mode Execution

Once the Mode Select routine is complete, the logic control will jump to the selected execution mode and begin executing. As discussed above, in the brake assembly of the present invention, there are four execution modes: BASIC mode, PRE-STOP mode, HOLDING mode and MASTER mode. The control logic for each of the four modes is discussed in the following sections.

4.3.2 The BASIC Mode Control Logic

FIGS. 16A–16B represent a flow diagram of the control logic for the BASIC BRAKE ROUTINE. One acceptable BASIC BRAKE ROUTINE is listed at line 320–44 of the attached appendix.

As illustrated in FIGS. 16A–16B, the control logic for the BASIC BRAKE ROUTINE first opens the motor relay, thus cutting off the power to the motor (block 206). This is accomplished by simply setting the MOTOR CONTACT output PA7, refer to §4.2.5 above, to turn the relay off. Once the motor relay is turned off (i.e., open) the control logic then clears a flag register that, when set, indicates that the E-STOP control switch has been activated (block 207). The control logic then closes the motor contactor in the manner described above, thus allowing power to be applied to the motor (block 208).

As discussed above the activation of a slave brake depends on the power applied to the motor. In a manner similar to the prior art slave brakes, the brake assembly of the present invention, when operating in the BASIC MODE, initiates a braking cycle when the power to the motor is cut off after the motor has been running. In the brake assembly of the present invention, a SENSE routine is used to determine when power is no longer applied to the motor. After closing the motor relay the control logic executes the SENSE routine (block 210).

4.3.2(a) The SENSE Routine

The SENSE routine of the present invention is illustrated as block 210 in FIG. 16A. One acceptable SENSE routine may be found at lines 734–800 of the attached appendix.

As illustrated in FIG. 16A the SENSE routine first determines whether AC power is being applied to the motor (block 211). This step is necessary because the motor must be running (i.e., AC power must have been applied to the motor) before a braking cycle is initiated. Once it is determined that the AC power is being supplied the motor (and the motor is therefor running) the sense cycle then monitors the sense signal to determine when AC power is no longer applied to the motor (e.g., if the operator opens the motor contact in an effort to brake the motor)(block 212). As the above indicates, the SENSE routine looks for the motor contacts to be closed first, then open (or for AC power to be applied to the motor and then cut off) to ensure that a braking cycle is initiated only after the motor is running. Once it is determined that the AC power is no longer applied to the motor, the SENSE routine will return to the SLAVE routine to initiate a braking cycle.

Once the SENSE routine determines that AC power is no longer being applied to the motor it will return to the SLAVE routine (block 213). The control logic for the SLAVE routine then opens the motor relay (block 216) through deactivating the MOTOR CONTACT signal PA7 and will not further execute until the motor relay is verified to be open. One acceptable routine for opening the motor contact and verifying its state may be found at lines 599–611 of the attached appendix.

As illustrated in FIGS. 16A–16B the control logic for the basic brake routine first provides a signal to open the motor relay thus cutting off power to the motor. As discussed above, this is accomplished by setting the MOTOR CONTACT output PA7 to turn the relay off. Once the signal has been provided to open the motor relay the control logic then verifies the motor relay as open. This is accomplished by starting a timer and then checking at block 217 to determine whether AC powers apply to the motor. This is accomplished through use of the SENSE signal (PB6) in a manner similar to that previously discussed. If the control logic determines that AC power is being applied to the motor (i.e., that the motor relay is still closed) it restarts the timer and again checks to determine whether AC power is being applied. If, however, the control logic determines that AC power is not being applied to the motor it then determines whether the timer has timed out at block 218. If the time has not timed out the control logic will loop back to block 217 and again determine whether AC power is being applied to the motor. If the control logic determines at block 218 that the time has timed out it will set a timer and delay and then return to the main SLAVE routine. In this manner the control logic determines that AC power is not being applied to the motor for a preselected time period to verify that the motor relay is open.

Even if the motor relay was previously open, this step is executed to ensure that the Brake contacts are never closed at the same time as the motor contacts are closed.

After the control logic verifies that the motor contactor is open, it closes the brake contactor, coupling the SCR circuitry of the brake assembly of the present invention to the input terminals of the motor and executes a FIRE routine to initiate firing of the SCR circuitry so that a DC braking current is applied to the motor (block 218). The FIRE routine of the present invention is discussed in detail below.

4.3.2(b) The FIRE Routine

FIGS. 17A–17B illustrate a logic flow diagram for the FIRE routine of the present invention. One acceptable FIRE routine may be found at lines 830-69 of the attached appendix.

As illustrated in FIGS. 17A–17B, the control logic for the FIRE routine first executes a ZERO CROSS routine to detect the zero crossing of the AC voltage waveform applied to the SCR 67 (when the brake contactors are closed) and to the motor (when the motor contactors are closed)(block 220). Flow logic for one ZERO CROSS routine is illustrated in FIG. 18.

4.3.2(b)(1) The ZERO CROSS Routine

Referring to the ZERO CROSS flow logic in FIG. 18, the manner in which a ZERO CROSS is detected will be explained. First, the control logic monitors the voltage of the ZERO CROSS input PB5, see §4.2.4 above, to determine when the voltage changes from low (e.g., negative) to high (e.g., positive) thus indicating a negative to positive transaction which is necessarily accompanied by a zero cross. (blocks 232-38). When a low to high transition is detected, the ZERO CROSS routine stores the clock value at the time the zero cross is detected (block 242) and returns to the FIRE routine (block 244). One acceptable ZERO CROSS routine may be found at lines 801-29 of the attached appendix.

4.3.2(b)(2) The FREQUENCY DETECTION Routine

Once the ZERO CROSS routine has determined that a zero crossing has occurred, control then passes back to the FIRE routine. The FIRE routine then executes a frequency detection routine which determines the frequency of the input AC waveform that is applied to the motor 90 and the SCR circuitry and sets control parameters accordingly (block 250). The value of the frequency of the AC waveform applied to the motor and the SCR circuitry must be determined, among other reasons, to set the firing angle of the SCR. In one embodiment, the FREQUENCY DETECTION routine does not actually determine the exact frequency, but instead determines whether the actual frequency is closer to one limit (e.g., 50 Hz.) than to another (e.g., 60 Hz.) and selects one of two parameter settings (50 Hz. or 60 Hz.) depending on the value of the actual input AC waveform. In this embodiment, control logic may be used to ensure that the frequency of the input waveform is within a predefined range (e.g., 48-60 Hz.) by generating an error when the actual input frequency is outside this range. Frequency detection control logic is generally understood in the art and will not be discussed in any detail herein. However, one acceptable FREQUENCY DETECTION routine may be found at lines 612-71 of the attached appendix.

4.3.2(b)(3) The PRE-MAGNITUDE PROCESSING Routine

Having detected the zero crossing and determining the frequency of the input the control logic executes a PRE-MAGNITUDE PROCESSING routine (block 252). The PRE-MAGNITUDE PROCESSING routine is used to determine the firing angle of the SCR and thus the magnitude of the DC current to be injected into the motor for braking purposes. As discussed in §4.2 above, the actual value of the firing angle is determined by the settings on the magnitude control potentiometers. One acceptable PRE-MAGNITUDE PROCESSING routine may be found at lines 672-694 of the attached appendix.

As discussed above the PRE-MAGNITUDE PROCESSING routine determines the magnitude of the DC current that will be injected into the motor for braking purposes. Because the magnitude of the DC braking current depends on whether the STOP or the E-STOP control switch has been activated, the control logic first determines whether the E-STOP flag is set (i.e., whether the E-STOP control switch has been activated). If the E-STOP detected then the setting of the E-MAGNITUDE potentiometer, signal AN1, (refer to §4.2, above) will control the magnitude of the DC braking current; otherwise the magnitude will be controlled by the setting on the MAGNITUDE potentiometer, signal AN0. After determining the value corresponding to the appropriate braking potentiometer, the control logic then multiples the determined value by a multiplier factor that is based on the previously measured AC line frequency. Appropriate control logic for determining the multiplier factor and multiplying the same may be found in the attached appendix.

After generating the appropriate DC magnitude factor, the logic control then returns to the main FIRE routine and then executes a ZERO SPEED DETECTION subroutine (block 260). When enabled, the ZERO SPEED DETECTION subroutine is an important part of the present invention and accordingly is discussed in some detail in the following section.

4.4.2(b)(4) The ZERO SPEED DETECTION Subroutine

Basically, the ZERO SPEED DETECTION subroutine determines when a motor has stopped rotating or has reached "zero speed." The ZERO SPEED DETECTION routing of the present invention detects the zero speed of a motor by sampling the waveform appearing between the common terminal COM 63 and the third terminal T3 69 of the motor at various positions (i.e., the zero speed signal AN3, see FIG. 12 and corresponding text) and comparing the samples to samples previously taken at the same position. In one embodiment of the present invention, eight different waveform positions are sample in each cycle. These samples are compared to their respective references. When a sample matches the reference, the reference is not changed and a "Match Counter" is incremented. In the sample does not match the reference, the reference is set to the new reference value and the Match Counter is cleared. After the Match Counter reaches a predefined value, each time a match is indicated for a particular waveform position a bit corresponding to the waveform position is set in a "Match Register." When all eight bits of the Match Resistor (corresponding the eight waveform position) are set, zero speed has been detected.

In one embodiment of the present invention the predefined value that the match counter must meet before the bits in the Match Register begin to be set is determined by the maximum brake time setting signals provided by the user (e.g., time signals PB7, PC0 and AN2, see §4.2). In this embodiment, the predefined value will be relatively large when a relatively large maximum brake time setting is selected by the used. Similarly, a relatively low predefined value will be selected whenever the maximum braking time is short. The advantage of varying the predefine value according to the maximum braking time is that short braking times generally indicates that the load is small or that the motor must be stopped quickly. For small loads the number of matches required to avoid "dead spots" is generally low and thus a low predefined value can be selected. Accordingly, the predefined value can be reduced without significantly impacting the accuracy of zero speed detection. Likewise, long maximum braking times generally correspond to large loads where a large number of matches may be required to overcome the dead spots associated with large loads and ensure the accuracy of the zero speed detection. Other embodiments are envisioned where the predefined value varies as a function of motor load, motor speed at the time of braking, or other user settings.

As the above indicates, in order for a zero speed detection, all eight waveform positions must hold steady for at least the predefined number of matches that must be made before the Match Counter exceed the preselected value.

FIGS. 19A-19B provide a flow diagram illustrating the logic flow of an acceptable ZERO SPEED DETECTION routine. The logic control for an acceptable ZERO SPEED DETECTION routine may be found at lines 1221-1327 of the attached appendix.

Referring back to the main FIRE routine illustrated in FIGS. 17A-17B, it may be noted that there is a loop consisting of blocks 260, 280 and 290 where the ZERO SPEED DETECTION routine and a DELAY routine (discussed below) are executed and reexecuted until the position counter reaches a value of zero. As discussed above, in one embodiment of the invention, samples of the ZERO SPEED signal AN3 are taken eight times during each period of the AC waveform (i.e., at eight different positions). In that embodiment, the initial position counter will be set to seven and the loop comprising blocks 260, 280 and 290 will execute eight times (once for each position 0-7). A Position Counter is used to keep track of the current position. In the following discussion the ZERO SPEED DETECTION routine is discussed as to a single position ("the present position") only. It must be remembered, however, that during one execution of the FIRE routine the ZERO SPEED DETECTION routine will execute eight times, once for each position 0-7.

Referring back to FIGS. 19A-19B, it may be noted that the ZERO SPEED DETECTION control logic first establishes a sample accumulation register for receiving four samples of the ZERO SPEED SENSE signal AN3 (block 261). The control logic then configures the input port that receives the voltage waveform appearing between the third terminal and the common terminal, see discussion at §4.2.4, to perform an A/D conversion. The control logic then takes four digital samples of the input waveform and sums them together in the sample accumulation register and divides the sum by four to obtain an average sample value (block 262). The average sample value is then compared to the average sample value of the present waveform position from the previous cycle. The average value of the waveform position sample from the previous cycle is referred to herein as the "reference value."

If the average sample value is larger than the reference value then the reference value is subtracted from the reference value by taking the two's complement of the reference value and adding it to the average sample value. If, on the other hand, the average sample value is smaller than the reference value then the average sample value is subtracted from the reference value by taking the two's complement of the average sample value and adding it to the reference value. The result of either subtraction operation is then compared to a window constant to determine whether a match exists (block 263).

Because an exact numerical match between the average sample value and the reference value is unnecessary for proper zero speed detection a "tolerance window constant" may be established such that a match will be indicated whenever the absolute value of the difference between the reference voltage and the average sample value is less than the tolerance window constant. In one embodiment of the present invention the tolerance window constant is selected to have a value of between one and two.

If the absolute value of the difference between the reference value and the average sample value is greater than the tolerance window constant then there is a "miss." The control logic will then store the new average sample value as the reference value for that waveform position (block 264) and will clear: (1) all of the bits of the Match Register and (2) the Match Count. The control logic will then determine if the value of the waveform position is zero (block 265). If the waveform position is not zero the control logic will decrement the Position Counter and return to the main FIRE routine (blocks 266, 267). If, however, the Position Counter is zero, the control logic will reset the Position Counter count to seven and will then return to the main FIRE routine (blocks 268, 267).

Going back to block 263, if the absolute value of the difference between the reference value and the average sampled value is less than the tolerance window constant then there is a "match." The control logic will first increment the Match Count and the determine whether the Match Count is higher than the Match Stop Constant (blocks 269, 270). If the Match Count is lower than the Match Stop constant then that is an indication that the current number of matches between the reference values and the average sampled values is smaller than their preselected amount for a zero detection. The control logic will then check the value of the present position and decrement the position counter if the Position Counter is other than zero or set the Position Counter to seven if the waveform position is zero (blocks 265-68). If the Match Count is equal to the Match Stop Constant then that is an indication that the number of matches between reference and average values meets or exceeds the minimum number required for a zero detection. Accordingly, the control logic will then determine what waveform position corresponds to the match and will set the bit in the Match Register that corresponds to the waveform position (block 271). The control logic will then check the value of the present position, decrement the Position Counter if it is non-zero, set it to seven if it is zero, and return to the main FIRE routine (blocks 265-67).

4.4.2(b)(5) The DELAY Routine

Returning back to the main FIRE routine in FIGS. 17A-17B, after executing the ZERO SPEED DETEC- TION routine for a particular waveform location position, the FIRE routine will then execute a DELAY routine in which a delay period is introduced. The delay routine may be executed by setting a counter corresponding the desired delay time and repeatedly decrementing the counter until the desired delay period has expired. The execution of delay routines is generally understood by those skilled in the art and will not be discussed herein in detail. One acceptable DELAY routine may be found at lines 695–708 of the attached appendix.

The purpose of the delay routine is to control the firing angle of the SCR and thus to control the magnitude of the DC braking current applied to the motor. As discussed above, the magnitude of the DC braking current directly corresponds to the length of time between the time the input AC waveform crosses zero and the time when a gating pulse is applied to the SCR 67. See §§4.2.3 and 4.2.5, above. In the present invention, the DELAY routine is used to set the time period between the zero cross of the input AC waveform and the firing of the SCR 67.

As discussed above, the DELAY routine at block 280 is executed eight times (once for each waveform position) for each firing of the SCR. Accordingly, the delay period for each execution of the delay routine should be set to slightly less than one-eight of the total desired delay period. The actual delay should be slightly less than one-eight of the desired delay to accommodate the execution time of the ZERO SPEED DETECTION routine, which is also executed eight times per SCR 67 firing. The actual value of the delay period in the present invention is determined by first setting a base delay that corresponds directly to the MAGNITUDE (AN0) or E-MAGNITUDE (AN1) signals and adding to that base value a value to correct for the actual AC waveform frequency (e.g., 60 or 50 Hz.). After the DELAY routine delays for approximately one-eight of the total desired delay time, control passes back to the main FIRE routine.

Referring back to FIGS. 17A–17B, once the control logic returns to the main FIRE routine it checks the current value of the Position Counter to determine whether the current Position Count is zero (block 290). A Position Count of zero is an indication that the appropriate number of samples for zero speed detection has been taken and that the total desired delay has expired. If the Position Counter is not zero, the program initiates another ZERO SPEED DETECTION and DELAY cycle where samples will be taken of the waveform location corresponding to the next waveform position.

4.4.2(b)(6) The SCR TRIGGER Routine

After all eight samples of the waveform have been taken and after the DELAY routine has ensured that the required delay period has passed, the FIRE routine will execute a SCR TRIGGER routine to generate a firing pulse for the SCR 67 (block 292). The control logic in the SCR TRIGGER routine simply generates an SCR TRIGGER output signal that cause the SCR circuitry to generate a gating pulse for the SCR. See FIG. 14 and accompanying text. One acceptable SCR TRIGGER routine may be found at lines 491–517 of the attached appendix. The SCR TRIGGER output signal should be of sufficient duration to ensure that the SCR 67 is gated on. In one embodiment of the present invention, the SCR TRIGGER routine is set such that the gating pulse for the SCR 67 has a duration of approximately 100 micro-seconds. After the gating pulse is applied to the SCR circuitry, the control logic returns to the main FIRE ROUTINE.

As illustrated in FIGS. 17A–17B, after generating a firing pulse to the SCR 67 the control logic for the main FIRE routine and determines whether additional firing of the SCR 67 is required. In other words, the control logic determines whether it should continue to provide DC braking current to the motor. There are at least three instances when the control logic should stop providing DC braking current to the motor: (1) when the maximum braking time has expired; (2) when the brake has been manually released; and (3) when zero speed has been detected. To test for these conditions, the FIRE routine first determines whether the maximum braking time has expired (i.e., whether the brake has timed out)(block 294). This is done by comparing the bytes in the timer counter to the maximum timer setting determined by the control signals PB7, PC0 and AN2 discussed in §4.2, above. If the timer counter meets or exceeds the maximum timer setting then the maximum braking time has been met or exceeded. As indicated in blocks 296 and 299 of FIGS. 17A–17B, when the maximum braking time has been met or exceeded, the FIRE routine will (1) clear the timer count; (2) clear the zero cross time register; (3) clear the Match Register used for zero speed detection and (4) return to the execution routine that called the FIRE routine—here, the main SLAVE routine.

If the maximum brake time has not been exceeded, the control logic for the FIRE routine will then determine whether a manual brake release switch has been activated (not illustrated in FIGS. 17A–17B). If the manual brake release switch has been activated, the main routine will clear the counters and registers discussed above and return to the main execution routine. If, however, the manual release was not activated, the control logic will then test to determent if zero speed sensing is enabled (block 297). If zero speed sensing is not enabled, then the control logic will loop back to the start of the FIRE routine and will continue to repeat the FIRE cycle until (1) the maximum brake time expires or is met or (2) the manual brake release switch is activated. If, on the other hand, zero speed sensing is enabled, the control logic will check the Match Register discussed in §4.4.3(b)(4) (block 298), and, if all eight bits in the Match Register are set, will end the FIRE routine by executing the steps at blocks 296 and 299. If the Match Register used by the ZERO SPEED DETECTION routine does not indicate zero speed, then the control logic will loop to the initiation of the FIRE routine and will continue to do so until (1) the maximum brake time is met or exceeded; (2) the manual brake release switch is activated; or (3) the match register for the zero speed detection circuit indicates that zero speed is detected.

4.3.2(b)(7) Additional Discussion of the FIRE Routine

One feature of the FIRE routine discussed above is that is flexible both in terms of both the AC input frequency and the firing angle defined by the user settings of the MAGNITUDE control potentiometer. See §4.2. This flexibility is demonstrated by the fact that the FIRE routine will always take eight samples for zero speed detection within the time period beginning after a zero cross is detected and ending when the SCR 67 is fired as illustrated in FIGS. 20A and 20B.

FIGS. 20A and 20B illustrate an input AC waveform 300 having a zero crossing point 301. In FIG. 20A a gating pulse having a firing angle at point X is illustrated. During the time between the zero cross, samples are taken at eight waveform positions (7-0) and there are eight delay periods of equal magnitude represented by the hatched regions. As FIG. 20A indicates, during the FIRE routine of the present invention the execution of the DELAY routine and the ZERO SPEED DETECTION routine are interleaved much in the same way the slice portions are interleaved with bread pieces in a loaf of bread.

FIG. 20B illustrated the waveform sampling locations and delay periods for the same AC waveform but with a different selected firing angle X'. Note that the FIRE routine still allows for the same number of sample and delay periods, although the length of the delay periods is somewhat shortened.

It should also be noted from FIGS. 20A and 20B that in the present invention the samples for the zero speed detection are taken before the trigger pulse for the SCR pulse is generated and during the first 90° of the input AC waveform. This is significant in that it is believed that the optimum waveform positions for sampling to determine zero speed are those positions occurring in the first 90°-180° of the input AC waveform.

Once the FIRE routine is completed for one of the reasons discussed above, the control logic will return to the main execution routine from which it began. In this present discussion, the FIRE routine was initiated from the BASIC BRAKE routine and thus the control logic will return thereto. Accordingly, once the FIRE routine is complete the control logic will return to block 310 of FIG. 16A. As the braking cycle will have been completed at this point, the control logic will open the brake contactor and then verify that the brake contactor is open. Once the brake contactor is opened by the control logic, the control logic will loop to the initiation of the BASIC BRAKE routine and await another signal indicating the initiation of a braking cycle (i.e., and indication that AC power has been applied to the motor and then cut off).

4.3.3 The PRE-STOP Routine

The preceding discussion was of the operation of the brake assembly of the present invention when the MODE selection switches were configured such that the BASIC mode of operation was selected. This section discusses the operation of the brake assembly of the present invention when the PRE-STOP mode of operation is selected.

As briefly discussed above, the PRE-STOP mode is desirable when a motor is attached to loads that may be windmilling when the motor is desired to be started.

The control logic for the PRE-STOP routine is illustrated in the logic flow diagram of FIG. 21. One acceptable PRE-STOP routine may be found at lines 421-59 of the attached appendix.

As illustrated in FIG. 21, once the PRE-STOP routine is entered and begins executing, it continually looks for an indication that the START command has been issued or that the START switch has been activated. (block 320). The control logic will continue to loop to block 320 until it senses a START signal. Once a START signal is sensed, the control logic will first check to ensure that the motor contacts are open (in a manner similar to that discussed above) and then will close the brake contacts coupling the SCR circuitry to the motor (blocks 322 and 324).

Once the brake contactors are closed and the brake is electrically coupled to the motor, the main PRE-STOP program will call the PRE-STOP INTERRUPTABLE FIRE routine (block 326), which will execute in a manner substantially to the FIRE routine discussed above. One acceptable PRE-STOP INTERRUPTABLE FIRE routine may be found at lines 907-944 of the microfiche appendix.

Upon conclusion of the PRE-STOP INTERRUPTABLE FIRE routine (e.g., because the maximum braking time was met or exceeded or because a zero speed was detected) the PRE-STOP routine will open the brake contacts verify that it they are open (block 328) and then close the motor relay allowing AC power to flow to the motor thus starting the motor (block 330). The control logic for the PRE-STOP routine will then monitor the output form the STOP control button to determine whether an E-STOP signal has been asserted (block 331) or whether a STOP signal has been asserted (block 332). If an E-STOP signal is detected, the control logic will bring the motor to a stop through the firing of the SCR circuitry in a manner substantially similar to that discussed above. Upon sensing the STOP signal the control logic will open the motor contactor, thus cutting power off to the motor and loop to the initiation of the PRE-STOP routine where it will await the assertion of the START signal, upon which the above cycle will be repeated.

4.3.4 The HOLDING BRAKE Routine

As discussed above, in certain instances holding brakes—i.e., brakes that bring the motor to a stop and then continue to apply DC braking current to inhibit rotation of the rotor—are desirable. The brake assembly of the present invention, when properly configured, can operate as a holding brake.

FIGS. 22A-22B illustrate a logic flow diagram of a Holding Brake routine that may be used with the brake assembly of the present invention. The Holding Brake routine is executed when the status switches configured by the user indicate that the Holding Mode has been selected. One possible Holding Brake routine may be found at lines 460-90 of the attached appendix.

As illustrated at block 335 of FIGS. 22A-22B, the control logic for the Holding Brake routine first looks for an assertion of the START signal (PA0). See §4.2.1. When the START signal is detected, the Holding Brake routine ensures that the brake contactor is open and then closes the motor contactor allowing AC power to flow to the motor, thus starting the motor (blocks 336-37). The Holding Brake routine then monitors the looks for an indication that the STOP signal (PA1) has been activated (block 338). Upon detection of the STOP signal, the control logic for the Holding Brake routine (1) opens the motor relay, thus cutting off AC power to the motor (block 339); and (2) closes the brake contactor, thus coupling the brake assembly to the motor (block 340). The Holding Brake routine then executes a fire routine, which in many way is similar to the FIRE routine discussed in §4.3.2(b).

As illustrated in FIGS. 22A-22B, in executing its fire routine, the Holding Brake routine first determines whether the START signal has been asserted, indicating that the braking of the motor should be terminated and the motor started (block 341). If a START signal is detected, the control logic returns to the main Holding Brake routine at block 336, opens the brake contactor and closes the motor contactor to start the motor (block 337). If, however, the control logic does not detect the START signal, it then detects a zero crossing in a manner similar to that discussed above with respect to the slave mode. (block 342). After a zero crossing is detected, the control logic then executes a delay cycle to ensure that the proper firing angle is maintained (block 343). In the holding fire routine, the magnitude of the DC braking current may be determined by a holding magnitude potentiometer, in a manner similar to that discussed in §4.2.3 above. In most instances, the holding magnitude potentiometer will be set such that the magnitude of the DC braking current during a holding brake cycle is less than that for a SLAVE brake cycle. Embodiments are anticipated where a regular DC braking cycle is applied until zero speed is detected and thereafter a reduced holding brake DC current is applied until a START signal is detected.

After delaying the necessary time period, the control logic generates an SCR trigger pulse to fire the SCR 67 in a manner similar to that discussed above with respect the SLAVE mode operation (block 344). After firing the SCR 67, the control logic then loops back to the initiation of the HOLDING FIRE routine and will continue to fire the SCR 67 and apply a DC braking current to the motor until a START signal is detected.

4.3.5 The MASTER MODE Routine

Figure 23A:
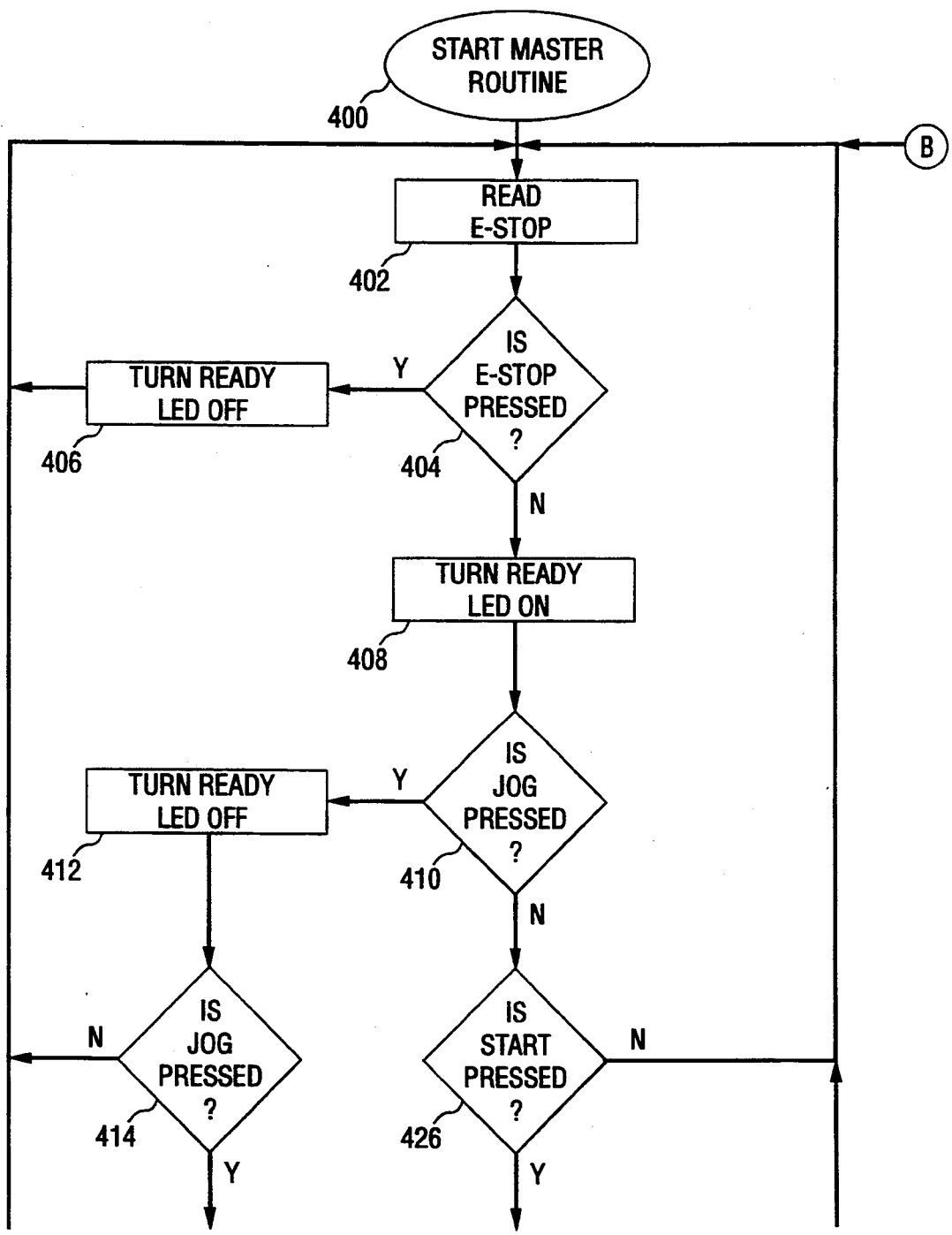

As discussed above the dynamic brake assembly of the present invention includes a MASTER MODE of operation in which a jog feature may be used. The jog feature allows the motor operator to selectively apply AC current to the motor to force the motor to, for example to rotate in incremental steps. The jog feature is particularly useful when the motor is used with machinery that must be accurately positioned or with an assembly line that must be incrementally advanced. FIGS. 23A and 23B illustrate a logic flow diagram of a MASTER brake routine that may be used with the brake assembly of the present invention. The MASTER brake routine is executed when the status switches configured by the user indicate that the MASTER mode has been selected. One possible MASTER brake routine may be found at lines 345–420 of the attached appendix.

As illustrated at block 402 of FIG. 23A the first step in the MASTER mode routine is to read the E-stop flag (block 402) and then determine whether the E-stop is pressed (block 404). It should be noted that prior to each decision step the flag value upon which the decision is based should be read; the read steps for the remaining decision blocks of FIG. 23A and 23B are not illustrated and should be implied.

If the logic control circuitry determines that E-stop is pressed (block 404) it turns off a ready LED (block 406) and returns to the starting point of the master routine. The ready LED is used during the master routine to indicate to the operator that the brake assembly is in a ready state.

If the decision at block 404 indicates that the E-stop has not been pressed the control logic will turn the ready LED on (block 408) and then read and determine whether the jog button is pressed (block 410).

When the jog button is pressed AC current is to be applied to the motor as long as the jog button is activated. Accordingly, if the decision at block 410 indicates that the jog button is pressed, the control logic will then turn the radio LED off (block 402) and then recheck the jog button to insure that it is pressed (block 414). The second check of the jog button is to insure that a momentary depression does not activate the motor. Accordingly, if the second jog check at block 414 indicates that the button is not longer pressed the control logic will then loop back to the starting point of the MASTER routine. If, however, the control logic determines at block 414 that the jog button is pressed, it will then check whether the brake contactor is open (block 416). As the brake contactor should be open at this stage the control logic will generate an error should the brake contact be closed. If, however, the brake contactor is open, the control logic will then close the motor contactor in a manner discussed above (block 418) and AC current will be applied to the motor. The control logic will then continuously monitor the jog button at block 420 to determine if it is pressed. As long as the jog button is activated the control logic will loop back and continue to apply AC current to the motor. When, however, the jog button is released the control logic will open the motor contactor (block 422) and verify that it is open (block 424). Once the motor contactor is open, the control logic will loop back to the initial step of the MASTER routine.

Referring back to block 410 if the control logic had determined that the jog button was not pressed, it would then determine whether the start button was activated (block 426). If the start button was not depressed, the control logic will loop back to the initial step of the MASTER routine.

If, however, the start button is activated, the control logic will then turn the ready LED off (block 428) and again check the start button (block 430). If upon the second checking of the start button, the start button is not activated the control logic will then determine whether the stop button is pressed (block 432). If at this time the control logic determines that the stop button has been activated it will loop to the initial step of the master routine. If it is determined at this point that the stop button is not activated it will proceed to start the motor.

Referring to FIGS. 23A–23D it may be noted that if the start button is pressed and the stop button is not detected, the control logic will first verify that the brake contactor is open (block 434) and then close the motor contactor thus applying AC voltage to the motor (block 436).

While the motor is running because of the application of AC current, the control logic will monitor the E-stop START and STOP buttons as illustrated in FIGS. 23A–23B. Initially, the control logic will monitor and determine whether the E-stop button is pressed (block 438). If the E-stop button has been pressed the control logic will loop to a braking routine where the magnitude of the braking current is determined by the previously defined E-stop magnitude. If, however, the control logic determines that the E-stop button is not pressed, it will then monitor the START button (block 440). If the START button is activated, the control logic will continue to apply AC current to the motor. If, however, it is determined that the START button is not activated, the control logic will then determine whether the STOP button is activated (block 442). If the STOP button is not activated the control logic will continue to apply AC current and allow the motor to run.

If it is determined at block 442 if the STOP button has been activated, or if it was previously determined at block 438 that the E-stop button was activated, the control logic will initiate a braking operation. First, the control logic will open the motor contactor (block 444) and verify that the contactor is open (block 446). Once it is determined that the motor contactor is open the control logic will close the brake contactor (block 448) and then initiate a firing of the SCR to brake the motor (450). The fire routine is substantially similar to that previously discussed for the other brake modes. Once the braking routine is completed (e.g., through a time out or through a zero speed detection) the control logic will monitor the START button to determine whether it has been pressed (block 452). If the START button has been activated the control logic will open the brake contactor (block 454) and then loop to the initiation of block 432 where it will again apply AC current to the motor and monitor the E-stop, START and STOP buttons. Alternatively, if it is determined at block 452 that the STOP button has not been activated the control logic will open the brake contactor (block 456), verify that the brake contactor is open (block 458), and loop to the initial step of the MASTER routine.

Although the present invention has been described in terms of one or more embodiments, it is not intended to be so limited. The scope and extent of the present invention is set forth in the following claims.

Appendix To

IMPROVED DYNAMIC BRAKE ASSEMBLY

Inventors

Kenneth Keller

Kenneth Hopwood

```
BRAKE2.ASM       Assembled with IASM   06/25/1993  14:33  PAGE 1

1  *************************************************************
 2  * BRAKE2.ASM                 ----------------                *
 3  *                            B A L D O R                     *
 4  *                            ----------------                *
 5  *************************************************************
 6  *                                                            *
 7  *            MULTI-MODE DYNAMIC BRAKE PROGRAM                *
 8  *                  FOR THE MC68HC05P9                        *
 9  *                                                            *
10  *               CREATED BY KEN HOPWOOD                       *
11  *                                                            *
12  *************************************************************
13  *               MODIFICATION HISTORY                         *
14  *************************************************************
15  *                                                            *
16  *     18-NOV-91   KEN H.   INITIAL VERSION                   *
17  *                          USE POTS SUBROUTINE               *
18  *                          TEST RELAY CIRCUIT                *
19  *     19-NOV-91   KEN H.   ADD SCR FIRING P-P TEST ROUTINE   *
20  *     26-NOV-91   KEN H.   ADD MPOT, FIXDLY ROUTINES         *
21  *     27-NOV-91   KEN H.   ADD SENSE ROUTINE                 *
22  *     02-DEC-91   KEN H.   FIRE PULSE ROUTINE                *
23  *     03-DEC-91   KEN H.   FIRE DELAY ROUTINE                *
24  *     04-DEC-91   KEN H.   TIMING/FIRING ROUTINE             *
25  *     05-DEC-91   KEN H.   SENSE ROUTINE                     *
26  *     06-DEC-91   KEN H.   INVERT ZERO CROSS DETECTION       *
27  *                          FIRST BRAKING OF A MOTOR!         *
```

| | | | | |
|---|---|---|---|---|
| 28 * | 09-DEC-91 | KEN H. | CORRECTED TIMER WRAP ERROR | * |
| 29 * | 10-DEC-91 | KEN H. | ADD E-POT, M-RELAY ROUTINES | * |
| 30 * | 03-JAN-92 | KEN H. | ADD MODE SELECTION ROUTINE | * |
| 31 * | 07-JAN-92 | KEN H. | ADD READY LED AND MASTER MODE | * |
| 32 * | 08-JAN-92 | KEN H. | ADD EMERGENCY MAGNITUDE ROUTINE | * |
| 33 * | 09-JAN-92 | KEN H. | START MASTER ROUTINE | * |
| 34 * | 10-JAN-92 | KEN H. | ADD IFIRE AND CONTINUE MASTER | * |
| 35 * | 13-JAN-92 | KEN H. | COMPLETE MASTER ROUTINE, ADD FAIL | * |
| 36 * | | | ROUTINE, TIMEOUTS ON CONTACTOR CHECKS | * |
| 37 * | | | BASIC MODE ZERO SPEED SWITCH SHUTDOWN | * |
| 38 * | 14-JAN-92 | KEN H. | ADD EMERGENCY STOP ISR AND FLAG CHECKS | * |
| 39 * | 15-JAN-92 | KEN H. | ADD PRE-STOP MODE | * |
| 40 * | 17-JAN-92 | KEN H. | CHANGE CONTROL DECODE ROUTINE | * |
| 41 * | 22-JAN-92 | KEN H. | ADJUST SENSE DELAY | * |
| 42 * | 23-JAN-92 | KEN H. | ADD HOLD BRAKE MODE | * |
| 43 * | 28-JAN-92 | KEN H. | TEST PROGRAM STAND-ALONE AND USE COP | * |
| 44 * | 29-JAN-92 | KEN H. | ADD TIMER SETTINGS, CORRECT CONTACTOR CHECKING | * |
| 45 * | 11-JUN-92 | KEN H. | ADD DEBOUNCING TO CONTROL RTN | * |
| 46 * | 17-AUG-92 | KEN H. | START CLEANUP AND DEBUG | * |
| 47 * | 18-AUG-92 | KEN H. | | * |
| 48 * | 19-AUG-92 | KEN H. | MODIFY CONTROL RTN FOR E-STOP AND DEBOUNCE | * |
| 49 * | 21-AUG-92 | KEN H. | FINISH DEBOUNCE | * |
| 50 * | 24-AUG-92 | KEN H. | ADD E-STOP TO BASIC MODE | * |
| 51 * | 25-AUG-92 | KEN H. | REWRITE CONTROL ROUTINES AND ADD E-STOP TO | * |
| 52 * | | | MASTER MODE | * |
| 53 * | 26-AUG-92 | KEN H. | ADD E-STOP TO MASTER MODE | * |
| 54 * | 27-AUG-92 | KEN H. | WORK ON ERROR TIMING | * |
| 55 * | 28-AUG-92 | KEN H. | WORK ON ERROR TIMING | * |
| 56 * | 31-AUG-92 | KEN H. | WORK ON ERROR TIMING | * |
| 57 * | 01-SEP-92 | KEN H. | START ZERO SPEED SENSE RTN | * |
| 58 * | 02-SEP-92 | KEN H. | CHANGE ZERO SPEED SENSE TO AN AVERAGE OF 16 | * |
| 59 * | | | SAMPLES | * |
| 60 * | 04-SEP-92 | KEN H. | SAMPLE AND STORE FOR TEST AGAINST AVERAGE | * |
| 61 * | 08-SEP-92 | KEN H. | DELAY 10 CYCLES BETWEEN ZERO SPEED COMPARISONS | * |
| 62 * | | | AND REQUIRE MULTIPLE MATCHES | * |
| 63 * | 14-SEP-92 | KEN H. | MODIFY ZERO SPEED ROUTINE | * |
| 64 * | 18-SEP-92 | KEN H. | CHANGE FIRE PULSE DELAY TO USE COMMON DELAY | * |
| 65 * | 22-SEP-92 | KEN H. | CHANGE ZERO SPEED DELAY REFERENCE TO ZCROSS | * |
| 66 * | 23-SEP-92 | KEN H. | SYNC ZERO SPEED SENSE TO ZERO CROSS | * |
| 67 * | 24-SEP-92 | KEN H. | CHANGE POSITION OF ZERO SPEED SENSING TO: | * |
| 68 * | | | ZCROSS, FIXED DELAY, MAGNITUDE DELAY, ZERO | * |
| 69 * | | | SPEED SENSE, FIRE | * |
| 70 * | | | ADD ZERO SPEED SENSING TO MASTER AND PRESTOP | * |
| 71 * | | | MODES | * |
| 72 * | 07-OCT-92 | KEN H. | WORKED ON FREQUENCY DETECTION | * |
| 73 * | 12-OCT-92 | KEN H. | MODIFY FOR NEW PROTOTYPE | * |
| 74 * | 13-OCT-92 | KEN H. | ADD ZERO SPEED DISABLE | * |
| 75 * | 14-OCT-92 | KEN H. | ADD TIMER RANGES | * |
| 76 * | 26-OCT-92 | KEN H. | REWRITE SENSE AND CONTACTOR CHECKING | * |
| 77 * | 27-OCT-92 | KEN H. | ADD SEQUENCING DELAYS | * |
| 78 * | 30-OCT-92 | KEN H. | START REWORK FOR SBM | * |
| 79 * | 04-NOV-92 | KEN H. | CHANGE FIRE AND FREQDET FOR SBM | * |
| 80 * | 11-NOV-92 | KEN H. | TEST BASIC MODE | * |
| 81 * | 16-NOV-92 | KEN H. | DEBUG TIMER | * |
| 82 * | 17-NOV-92 | KEN H. | TESTED TIMER AND ZERO SPEED | * |
| 83 * | 18-NOV-92 | KEN H. | CONVERT MASTER AND PRE-STOP TO SBM | * |
| 84 * | 20-NOV-92 | KEN H. | INCREASE TIME ON FAILURE CHECKING | * |
| 85 * | 24-NOV-92 | KEN H. | ADD RAM CLEARING ROUTINE | * |
| 86 * | 25-NOV-92 | KEN H. | ADD FREQUENCY TRACKING TO HOLD BRAKE MAG | * |
| 87 * | 30-NOV-92 | KEN H. | DISABLE E-STOP IN PRE-STOP MODE | * |
| 88 * | 04-DEC-92 | KEN H. | ADD COP RESET | * |

```
 89  *    14-DEC-92   KEN H.   ADJUST MAGNITUDE                              *
 90  *    26-JAN-93   KEN H.   ADD OPEN OPPOSING CONTACTOR TO CONT. CLOSE RTN*
 91  *                         ADD VERSION CODE                              *
 92  *    28-JAN-93   KEN H.   CHANGE TRANSITION DELAYS                      *
 93  *    29-JAN-93   KEN H.   ADD ZERO SPEED SENSITIVITY                    *
 94  *    01-FEB-93   KEN H.   CHANGE MAGNITUDE                              *
 95  *    08-FEB-93   KEN H.   CORRECT E-STOP IN MASTER MODE                 *
 96  *    24-FEB-93   KEN H.   ADD MORE COMMENTS                             *
 97  *    25-FEB-93   KEN H.   CHANGE HOLD BRAKE MAGNITUDE                   *
 98  *    28-APR-93   KEN H.   ADD EMERGENCY STOP TO PRE-STOP MODE           *
 99  *    12-MAY-93   KEN H.   ENABLE E-STOP MAG IN PRE-STOP MODE            *
100  *    21-MAY-93   KEN H.   INVERT TIMER POT                              *
101  *    24-MAY-93   KEN H.   READY LED CLEANUP                             *
102  ***********************************************************************
103
104  $INCLUDE 'HC05P9.ASM'          ;I/O DEFINITIONS
105  ***********************************************************************
106  *                                                                      *
107  *                  I/O AND REGISTER INITIALIZATION                     *
108  *                                                                      *
109  *    15-JUN-92   KEN H.   INITIAL VERSION                               *
110  *    01-SEP-92   KEN H.   ADD REST OF I/O DEFS                          *
111  *                                                                      *
112  ***********************************************************************
113
114  PORTA   EQU $00             ;I/O PORT A DATA REGISTER
115  PORTB   EQU $01             ;I/O PORT B DATA REGISTER
117  PORTD   EQU $03             ;I/O PORT D DATA REGISTER
118  DDRA    EQU $04             ;PORT A DATA DIRECTION REGISTER
119  DDRB    EQU $05             ;PORT B DATA DIRECTION REGISTER
120  DDRC    EQU $06             ;PORT C DATA DIRECTION REGISTER
121  DDRD    EQU $07             ;PORT D DATA DIRECTION REGISTER
122  SCR     EQU $0A             ;SIOP CONTROL REGISTER
123  SSR     EQU $0B             ;SIOP STATUS REGISTER
124  SDR     EQU $0C             ;SIOP DATA REGISTER
125  TCR     EQU $12             ;TIMER CONTROL REGISTER
126  TSR     EQU $13             ;TIMER STATUS REG
127  ICR     EQU $14             ;INPUT CAPTURE REGISTER
128  OCR     EQU $16             ;OUTPUT COMPARE REG
129  TCNT    EQU $18             ;TIMER COUNT REGISTER
130  ALTCNT  EQU $1A             ;TIMER ALTERNATE COUNT REGISTER
131  ADDR    EQU $1D             ;ADC DATA REG
132  ADSCR   EQU $1E             ;ADC STATUS AND CONTROL REG
133  EPROM0  EQU $20             ;PAGE 0 EPROM STARTS HERE
134  RAM     EQU $80             ;RAM STARTS HERE
135  EPROM   EQU $100            ;EPROM PROGRAM SPACE STARTS HERE
136  MOR     EQU $901            ;MASK OPTION REGISTER
137  COP     EQU $1FF0           ;COP REGISTER
138
139          ORG EPROM0          ;48 BYTES
140
141  FDLYTAB FCB $00              ;100us FIRING PULSE
142          FCB $32
143
144  CH0     FCB $20              ;ADC CONTROL BYTE FOR CH0
145  CH1     FCB $21              ;ADC CONTROL BYTE FOR CH1
146  CH2     FCB $22              ;ADC CONTROL BYTE FOR CH2
147  CH3     FCB $23              ;ADC CONTROL BYTE FOR CH3
148
149  WINDOW  FCB $01              ;WINDOW OF ZERO SPEED AVG. COMPARISON
150
```

```
                151 ***************************************************************
                152 *              MAGNITUDE POT READING SUB ROUTINE               *
                153 ***************************************************************
                154
0027 [03] B622  155 MPOT   LDA CH0              ;CONFIGURATION BYTE FOR ADC
0029 [04] B71E  156        STA ADSCR            ;LOAD BYTE INTO A/D STATUS AND CONTROL REG.
002B [05] 0F1EFD 157 CONV1 BRCLR 7,ADSCR,CONV1  ;WAIT UNTIL CCF IS SET (CONVERSION COMPLETE)
002E [03] B61D  158        LDA ADDR             ;READ CONVERTED VALUE
0030 [05] C70082 159       STA POT1             ;STORE VALUE FOR POT1
0033 [06] 81    160        RTS
                161
                162
                163 ***************************************************************
                164 *           RELAY SUBROUTINE TO CLOSE MOTOR CONTACTOR           *
                165 ***************************************************************
                166
0034 [05] 1B00  167 MRLYON BCLR 5,PORTA          ;TURN BRAKE RELAY OFF
0036 [02] A674  168        LDA #$74             ;SET DELAY
0038 [05] C70086 169       STA COUNT
003B [02] A624  170        LDA #$24
003D [05] C70087 171       STA COUNT+1
0040 [06] CD086D 172       JSR ALTDLY           ;DELAY
0043 [06] CD1FF1 173       JSR COPRST           ;RESET COP
0048 [06] 81    175        RTS
                176
                177 ***************************************************************
                178
0080            179        ORG RAM              ;64 BYTES
0080            180 POT0H  RMB 1                ;POT0 HIGH BYTE MEMORY STORAGE
0081            181 POT0L  RMB 1                ;POT0 LOW BYTE MEMORY STORAGE
0082            182 POT1   RMB 1                ;POT1 MEMORY STORAGE
0083            183 POT2   RMB 1                ;POT2 MEMORY STORAGE
0084            184 TEMPA  RMB 1                ;TEMPORARY STORAGE FOR LOW OCR BYTE
0085            185 TLC    RMB 1                ;TIMER LOOP COUNT FOR FAIL ROUTINE
0086            186 COUNT  RMB 2                ;DELAY COUNT
0088            187 PCOUNT RMB 2                ;MAGNITUDE POT COUNT
008A            188 TIMECTH RMB 1               ;BRAKE TIMER COUNT HIGH BYTE
008B            189 TIMECTL RMB 1               ;BRAKE TIMER COUNT LOW BYTE
008C            190 SCNT2  RMB 1                ;SENSE AC ON COUNT
008D            191 TEMPB  RMB 1                ;TEMPORARY STORAGE FOR TIMER HIGH BYTE
008E            192 STFLAG RMB 1                ;START REQUEST FLAG
008F            193 START  RMB 1                ;START BUTTON FLAG
0090            194 STOP   RMB 1                ;STOP BUTTON FLAG
0091            195 JOG    RMB 1                ;JOG BUTTON FLAG
0092            196 ZSWITCH RMB 1               ;ZERO SPEED SWITCH FLAG
0093            197 ESTOP  RMB 1                ;EMERGENCY STOP MAGNITUDE FLAG
0094            198 LFLAG  RMB 1                ;ZERO CROSS LOW FLAG
0095            199 HFLAG  RMB 1                ;ZERO CROSS HIGH FLAG
0096            200 TCOUNT RMB 1                ;SWITCH DEBOUNCING TRUE COUNT
0097            201 FCOUNT RMB 1                ;SWITCH DEBOUNCING FALSE COUNT
0098            202 DBNCCT RMB 1                ;SWITCH DEBOUNCING COUNT
0099            203 OC2    RMB 2                ;PSEUDO OUTPUT COMPARE
009B            204 INTCNT RMB 1                ;INTERRUPT TIMER COUNTER
009C            205 ERRFLAG RMB 1               ;ERROR TYPE FLAG
009D            206 ZSPD   RMB 2                ;ZERO SPEED SAMPLE VALUE
009F            207 MATCH  RMB 1                ;MATCH REGISTER
00A0            208 ARRAYI RMB 1                ;NUMBER OF DIFFERENT LOCATIONS SAMPLED
00A1            209 DLYTIME RMB 2               ;DELAY VARIABLE
00A3            210 MATCHCT RMB 8                ;SAMPLE MATCH COUNTERS
00AB            211 REF    RMB 8                ;REFERENCE REGISTERS
00B3            212 ZCSTAMP RMB 2               ;ZERO CROSS TIME STAMP
```

```
0B5              213 ZCSAVE  RMB 2              ;PREVIOUS ZERO CROSS TIME STAMP
0B7              214 FREQFIX RMB 2              ;FIXED DELAY BASED ON FREQUENCY
0B9              215 FREQMUL RMB 1              ;MULTIPLIER BASED ON FREQUENCY
0BA              216 FRQFLAG RMB 1              ;FREQUENCY DETECTION FLAG
0BB              217 SFLAG   RMB 1              ;SENSE FLAG
0BC              218 ERRVAR  RMB 1              ;ERROR NUMBER VARIABLE
0BD              219 NSTOP   RMB 1              ;NUMBER OF MATCHES REQUIRED FOR ZS DETECT
0BE              220 TEMPT   RMB 1              ;TIME POT TEMPORARY REGISTER
                 221
901              222         ORG MOR
901    01        223         FCB $01            ;SET MASK OPTION REGISTER
                 224
100              225         ORG EPROM
                 226
                 227 *****************************************************************
                 228 *                          MAIN PROGRAM                          *
                 229 *****************************************************************
                 230
100 [06] CD010A  231 MAIN    JSR INIT           ;INITIALIZE BRAKE
106 [03] CC0103  233         JMP MENU           ;LOOP TO MODE EXECUTION
109 [06] 81      234         RTS
                 235
                 236 *****************************************************************
                 237 *                       INITIALIZE ROUTINE                       *
                 238 *****************************************************************
                 239
10A [02] 9B      240 INIT    SEI                ;DISABLE INTERRUPTS
10B [02] AEBF    241         LDX #$BF           ;SET COUNTER
10D [05] 7F      242 CLOOP   CLR ,X             ;CLEAR RAM LOCATION
10E [03] 5A      243         DECX               ;DECREMENT COUNTER
10F [02] A379    244         CPX #$79           ;IS COUNTER = $79?
111 [03] 26FA    245         BNE CLOOP          ;IF NOT, CLEAR NEXT LOCATION
113 [05] 3F9B    246         CLR INTCNT         ;CLEAR INTERRUPT COUNTER
115 [05] 3F12    247         CLR TCR            ;SET UP TIMER
                 248
                 249 * INIT PORT A FOR RELAY AND FIRING CIRCUIT
                 250
117 [05] 3F00    251         CLR PORTA          ;INIT PORT A TO $00
119 [02] A6E0    252         LDA #$E0           ;SET PA7, PA6, PA5 TO OUTPUTS, THE
11B [04] B704    253         STA DDRA           ;REST AS INPUTS
                 254
                 255 * INIT PORT B
                 256
11D [05] 3F01    257         CLR PORTB          ;INIT PORT B TO $00
11F [02] A600    258         LDA #$00           ;SET PB7, PB6 AND PB5 AS INPUTS
121 [04] B705    259         STA DDRB
                 260
                 261 * INIT PORT C FOR ZERO CROSS AND SENSE INPUTS
                 262
123 [05] 3F02    263         CLR PORTC          ;INIT PORT C TO $00
125 [02] A600    264         LDA #$00           ;SET ALL BITS OF PORT C AS INPUTS
127 [04] B706    265         STA DDRC
129 [04] B71E    266         STA ADSCR          ;CLEAR A/D CONTROL REGISTER
                 267
                 268 * INIT PORT D FOR READY/FAIL LED AND E-STOP
                 269
12B [02] A6FF    270         LDA #$FF           ;INIT PORT D TO $FF
12D [04] B703    271         STA PORTD
12F [02] A630    272         LDA #$30           ;SET PD5 AS AN OUTPUT
131 [04] B707    273         STA DDRD
                 274
```

```
                          275  * INIT START/STOP CONTROL REGISTER
                          276
0133 [02] A6FF            277         LDA #$FF
0135 [04] B790            278         STA STOP              ;INIT STOP TO TRUE
0137 [04] B793            279         STA ESTOP             ;INIT ESTOP TO TRUE
                          280
                          281  * INIT SWITCH DEBOUNCING COUNT
                          282
0139 [02] A630            283         LDA #$30
013B [04] B798            284         STA DBNCCT            ;COUNT OF 1 IS AT LEAST APPROXIMATELY 60 us
                          285
                          286  * ZERO SPEED SENSE
                          287
013D [02] A607            288         LDA #$07              ;INIT ZERO SPEED SENSE ARRAY COUNTER TO $07
013F [04] B7A0            289         STA ARRAYX
                          291  * FREQUENCY DETECTION
                          292
 41 [02] A601             293         LDA #$01              ;SET FREQUENCY MULTIPLIER TO 1
 43 [04] B7B9             294         STA FREQMUL
 45 [02] A656             295         LDA #$56              ;INIT FIXED FREQUENCY DELAY TO $56
 47 [04] B7B8             296         STA FREQFII+1
                          297
                          298  * ZERO SPEED SENSITIVITY
                          299
 49 [02] A6A0             300         LDA #$A0              ;INIT NUMBER OF ZERO SPEED SENSE MATCHES
 4B [04] B7BD             301         STA MSTOP             ;REQUIRED TO $A0
 4D [06] 81               302         RTS
                          303
                          304  *****************************************************************
                          305  *                      MODE SELECTION                            *
                          306  *****************************************************************
                          307
 4E [05] 030207           308  MODE   BRCLR 1,PORTC,PA4     ;TEST PA3 FOR 0, GOTO PA4 IF 0
 51 [05] 05020F           309         BRCLR 2,PORTC,M01     ;TEST PA4 FOR 0, GOTO MASTER IF 0
 54 [06] CD028A           310         JSR HOLD              ;EXECUTE HOLD BRAKE MODE
 57 [06] 81               311         RTS                   ;RETURN TO MAIN PROGRAM
 58 [05] 050204           312  PA4    BRCLR 2,PORTC,M00     ;TEST PA4 FOR 0, GOTO BASIC IF 0
 5B [06] CD023B           313         JSR PRESTP            ;EXECUTE PRE-STOP MODE
 5E [06] 81               314         RTS                   ;RETURN TO MAIN PROGRAM
 5F [06] CD0167           315  M00    JSR BASIC             ;EXECUTE BASIC MODE
 62 [06] 81               316         RTS                   ;RETURN TO MAIN PROGRAM
 63 [06] CD0195           317  M01    JSR MASTER            ;EXECUTE MASTER MODE
 66 [06] 81               318         RTS                   ;RETURN TO MAIN PROGRAM
                          319
                          320  *****************************************************************
                          321  *                    BASIC BRAKE ROUTINE                         *
                          322  *****************************************************************
                          323
 67 [05] 1F00             324  BASIC  BCLR 7,PORTA          ;CLEAR OUTPUT TO RELAY TO TURN M RELAY OFF
 69 [05] 1A03             325         BSET 5,PORTD          ;TURN READY LED OFF
 6B [06] CD074D           326         JSR CESTOP            ;UPDATE E-STOP FLAG
 6E [02] A6FF             327         LDA #$FF
 70 [03] B193             328         CMP ESTOP             ;CHECK FOR E-STOP
 72 [03] 27F3             329         BEQ BASIC             ;WAIT FOR E-STOP TO CLEAR
 74 [05] BD34             330         JSR MRLYON            ;ENABLE MOTOR CONTACTOR
 76 [05] 1B03             331         BCLR 5,PORTD          ;TURN READY LED ON
 78 [06] CD043F           332         JSR SENSE             ;DETECT SENSE
 7B [05] 1F00             333         BCLR 7,PORTA          ;CLEAR OUTPUT TO RELAY TO TURN M RELAY OFF
 7D [06] CD05F5           334         JSR MCLEAR            ;CHECK FOR OPEN MOTOR CONTACTOR
 80 [05] 1A03             335         BSET 5,PORTD          ;TURN READY LED OFF
 82 [06] CD0359           336         JSR BRLYON            ;TURN ON RELAY TO CLOSE BRAKE CONTACTOR
```

```
185 [06] CD04E1    337          JSR FIRE            ;FIRE SCR
188 [06] CD0374    338          JSR BRLYOFF         ;TURN OFF RELAY TO OPEN BRAKE CONTACTOR
                   339 *                            ;AFTER TIMER TIMES OUT
18B [06] CD062D    340          JSR BCLEAR          ;CHECK FOR OPEN BRAKE CONTACTOR
18E [06] CD1FF1    341          JSR COPRST          ;RESET COP
191 [03] CC0167    342          JMP BASIC           ;GO TO BEGINNING OF ROUTINE
194 [06] 81        343          RTS
                   344
                   345 ************************************************************************
                   346 *                    MASTER BRAKE ROUTINE                               *
                   347 ************************************************************************
195 [06] CD074D    349 MASTER   JSR CESTOP          ;UPDATE E-STOP
198 [02] A6FF      350          LDA #$FF
19A [03] B193      351          CMP ESTOP           ;IS E-STOP PRESSED?
19C [03] 2703      352          BEQ ES              ;IF SO, GO TO ES
19E [03] CC01A4    353          JMP SKIP            ;GO TO SKIP
1A1 [03] CC0236    354 ES       JMP ES2             ;GO TO ES2
1A4 [05] 1B03      355 SKIP     BCLR 5,PORTD        ;TURN READY LED ON
1A6 [06] CD06ED    356          JSR CJOG            ;UPDATE JOG FLAG
1A9 [03] B691      357          LDA JOG             ;READ JOG FLAG
1AB [02] A100      358          CMP #$00            ;CHECK FOR JOG COMMAND
1AD [03] 274F      359          BEQ JOGRUN          ;GOTO JOGRUN IF JOG COMMAND IS DETECTED
1AF [06] CD068D    360          JSR CSTART          ;UPDATE START FLAG
1B2 [03] B68F      361          LDA START           ;READ START FLAG
1B4 [02] A100      362          CMP #$00            ;CHECK FOR START COMMAND
1B6 [03] 26DD      363          BNE MASTER          ;IF START NOT FOUND, RECHECK
1B8 [05] 1A03      364          BSET 5,PORTD        ;TURN READY LED OFF
1BA [06] CD068D    365          JSR CSTART          ;UPDATE CONTROL FLAGS
1BD [03] B68F      366          LDA START           ;READ START FLAG
1BF [02] A100      367          CMP #$00            ;CHECK FOR START COMMAND
1C1 [03] 265C      368          BNE CHKSTOP         ;IF NO COMMAND, GOTO CHKSTOP
1C3 [06] CD062D    369 RUN      JSR BCLEAR          ;CHECK FOR OPEN BRAKE CONTACTOR
1C6 [05] BD34      370          JSR MRLYON          ;CLOSE MOTOR RELAY
1C8 [06] CD074D    371 STLOOP   JSR CESTOP          ;UPDATE E-STOP
1CB [02] A6FF      372          LDA #$FF
1CD [03] B193      373          CMP ESTOP           ;IS E-STOP ON?
1CF [03] 2712      374          BEQ ES1             ;IF E-STOP, GO TO ES1
1D1 [06] CD068D    375          JSR CSTART          ;UPDATE START FLAG
1D4 [03] B68F      376          LDA START           ;READ START FLAG
1D6 [02] A100      377          CMP #$00            ;CHECK FOR START COMMAND
1D8 [03] 27EE      378          BEQ STLOOP          ;IF START COMMAND, RECHECK START FLAG
1DA [06] CD06BD    379          JSR CSTOP           ;UPDATE STOP FLAG
1DD [03] B690      380          LDA STOP            ;READ STOP FLAG
1DF [02] A1FF      381          CMP #$FF            ;CHECK FOR STOP COMMAND
1E1 [03] 26E5      382          BNE STLOOP          ;IF NO STOP COMMAND RECHECK START FLAG
1E3 [05] 1F00      383 ES1      BCLR 7,PORTA        ;CLEAR OUTPUT TO RELAY TO TURN M RELAY OFF
1E5 [06] CD05F5    384          JSR MCLEAR          ;CHECK FOR OPEN MOTOR CONTACTOR
1E8 [06] CD0359    385          JSR BRLYON          ;CLOSE BRAKE RELAY
1EB [06] CD052F    386          JSR IFIRE           ;FIRE SCR
1EE [03] B68E      387          LDA STFLAG          ;READ BRAKE INTERRUPT START FLAG
1F0 [02] A1FF      388          CMP #$FF            ;CHECK TO SEE IF SET
1F2 [03] 2737      389          BEQ RESTART         ;IF SET GOTO RESTART
1F4 [06] CD0374    390          JSR BRLYOFF         ;TURN BRAKE RELAY OFF
1F7 [06] CD062D    391          JSR BCLEAR          ;CHECK FOR OPEN BRAKE CONTACTOR
1FA [03] CC0195    392 MRDY     JMP MASTER          ;GO TO BEGINNING OF ROUTINE
1FD [06] 81        393          RTS                 ;END SUBROUTINE
                   394
1FE [05] 1A03      395 JOGRUN   BSET 5,PORTD        ;TURN READY LED OFF
200 [06] CD06ED    396          JSR CJOG            ;UPDATE JOG FLAG
203 [03] B691      397          LDA JOG             ;READ JOG FLAG
205 [02] A100      398          CMP #$00            ;CHECK FOR JOG COMMAND
```

```
:207 [03] 26E1      399            BNE MRDY              ;IF NO JOG COMMAND GOTO MRDY
:209 [06] CD062D    400   JRUN     JSR BCLEAR            ;CHECK FOR OPEN BRAKE CONTACTOR
:20C [05] BD34      401            JSR MRL70N            ;CLOSE MOTOR RELAY
:20E [06] CD06ED    402   JLOOP    JSR CJOG              ;UPDATE JOG FLAG
:211 [03] B691      403            LDA JOG               ;READ JOG FLAG
:213 [02] A1FF      404            CMP #$FF              ;CHECK FOR JOG
:215 [03] 26F7      405            BNE JLOOP             ;IF JOG, CHECK AGAIN
:219 [06] CD05F5    407            JSR MCLEAR            ;CHECK FOR OPEN MOTOR CONTACTOR
:21C [03] CC01FA    408            JMP MRDY              ;GOTO MRDY
 21F [06] CD06BD    409   CHKSTOP  JSR CSTOP             ;UPDATE STOP FLAG
:222 [03] B690      410            LDA STOP              ;READ STOP FLAG
 224 [02] A1FF      411            CMP #$FF              ;CHECK FOR STOP COMMAND
 226 [03] 269B      412            BNE RUN               ;IF NO STOP GOTO RUN
 228 [03] CC01FA    413            JMP MRDY              ;GOTO MRDY
:22B [06] CD0374    414   RESTART  JSR BRLYOFF           ;OPEN BRAKE RELAY
:22E [05] 3F8E      415            CLR STFLAG            ;CLEAR START FLAG
:230 [06] CD1FF1    416            JSR COPRST
:233 [03] CC01C3    417            JMP RUN               ;GOTO RESTART
0236 [05] 1A03      418   RS2      BSET 5,PORTD          ;TURN READY LED OFF
:238 [03] CC0195    419            JMP MASTER            ;GO TO BEGINNING OF RTN
                    420
                    421   **************************************************************
                    422   *              MASTER PRE-STOP SUBROUTINE                     *
                    423   **************************************************************
                    424
:23B [05] 1B03      425   PRESTP   BCLR 5,PORTD          ;TURN READY LED ON
:23D [06] CD068D    426   PSTART   JSR CSTART            ;UPDATE START FLAG
0240 [03] B68F      427            LDA START             ;READ START FLAG
0242 [02] A100      428            CMP #$00              ;CHECK FOR START COMMAND
0244 [03] 26F7      429            BNE PSTART            ;IF START NOT FOUND, RECHECK
0246 [05] 1A03      430   STRT     BSET 5,PORTD          ;TURN READY LED OFF
0248 [06] CD05F5    431            JSR MCLEAR            ;CHECK FOR OPEN MOTOR CONTACTOR
024B [06] CD0359    432            JSR BRLYON            ;TURN BRAKE RELAY ON
024E [06] CD058F    433            JSR PFIRE             ;FIRE SCR
0251 [06] CD0374    434            JSR BRLYOFF           ;TURN BRAKE RELAY OFF
0254 [06] CD062D    435            JSR BCLEAR            ;CHECK FOR OPEN BRAKE CONTACTOR
0257 [06] CD1FF1    436            JSR COPRST            ;RESET COP
025A [05] BD34      437            JSR MRLYON            ;CLOSE MOTOR RELAY
025C [06] CD06BD    438   STPCK    JSR CSTOP             ;UPDATE STOP FLAG
025F [06] CD074D    439            JSR CESTOP            ;UPDATE E-STOP FLAG
0262 [03] B693      440            LDA ESTOP             ;READ E-STOP FLAG
0264 [02] A1FF      441            CMP #$FF              ;COMPARE TO E-STOP COMMAND
0266 [03] 2711      442            BEQ BRKNOW            ;GO TO EMERGENCY STOP
0268 [03] B690      443            LDA STOP              ;READ STOP FLAG
026A [02] A1FF      444            CMP #$FF              ;COMPARE TO STOP COMMAND
026C [03] 26EE      445            BNE STPCK             ;GOTO STPCK IF STOP IS NOT DETECTED
026E [05] 1F00      446   PSTP     BCLR 7,PORTA          ;CLEAR OUTPUT TO RELAY TO TURN M RELAY OFF
0270 [06] CD05F5    447            JSR MCLEAR            ;CHECK FOR OPEN MOTOR CONTACTOR
0273 [05] 1B03      448   IRDY     BCLR 5,PORTD          ;TURN READY LED ON
0275 [03] CC023B    449            JMP PRESTP            ;GO TO BEGINNING OF ROUTINE
0278 [06] 81        450            RTS
                    451
0279 [05] 1F00      452   BRKNOW   BCLR 7,PORTA          ;TURN M RELAY OFF
027B [06] CD05F5    453            JSR MCLEAR            ;CHECK FOR OPEN MOTOR CONTACTOR
027E [06] CD0359    454            JSR BRLYON            ;TURN BRAKE RELAY ON
0281 [06] CD04E1    455            JSR FIRE              ;FIRE SCR
0284 [06] CD0374    456            JSR BRLYOFF           ;OPEN BRAKE RELAY
0287 [03] CC0273    457            JMP IRDY              ;LOOP BACK TO THE BEGINNING
                    458
                    459
```

```
460  ***********************************************************************
461  *                        HOLD BRAKE SUBROUTINE                        *
462  ***********************************************************************
463
028C [06] CD1FF1    465          JSR COPRST             ;RESET COP
028F [06] CD068D    466          JSR CSTART             ;UPDATE START FLAG
0292 [03] B68F      467          LDA START              ;READ START FLAG
0294 [02] A100      468          CMP #$00               ;CHECK FOR START COMMAND
0296 [03] 26F2      469          BNE HOLD               ;IF NO START, CHECK AGAIN
0298 [05] 1A03      470  RSTRT   BSET 5,PORTD           ;TURN READY LED OFF
029A [06] CD062D    471          JSR BCLEAR             ;CHECK FOR OPEN BRAKE CONTACTOR
029D [02] A6F4      472          LDA #$F4               ;DELAY 125ms
029F [04] B786      473          STA COUNT
02A1 [02] A624      474          LDA #$24
02A3 [04] B787      475          STA COUNT+1
02A5 [06] CD086D    476          JSR ALTDLY
02A8 [05] BD34      477          JSR MRLYON             ;CLOSE MOTOR RELAY
02AA [06] CD06BD    478  SCHK    JSR CSTOP              ;UPDATE STOP FLAG
02AD [03] B690      479          LDA STOP               ;READ STOP FLAG
02AF [02] A1FF      480          CMP #$FF               ;CHECK FOR STOP COMMAND
02B1 [03] 26F7      481          BNE SCHK               ;IF NO STOP, CHECK AGAIN
02B3 [05] 1F00      482          BCLR 7,PORTA           ;CLEAR OUTPUT TO RELAY TO TURN M RELAY OFF
02B5 [06] CD05F5    483          JSR MCLEAR             ;CHECK FOR OPEN MOTOR CONTACTOR
02B8 [06] CD0359    484          JSR BRLYON             ;TURN BRAKE RELAY ON
02BB [05] 1B03      485          BCLR 5,PORTD           ;TURN READY LED ON
02BD [06] CD05D9    486          JSR HFIRE              ;FIRE SCR UNTIL START COMMAND
02C0 [06] CD0374    487          JSR BRLYOFF            ;TURN BRAKE RELAY OFF
02C3 [03] CC0298    488          JMP RSTRT              ;GOTO RSTRT
02C6 [06] 81        489          RTS
                    490
                    491  ***********************************************************************
                    492  *                        FIRE PULSE ROUTINE                           *
                    493  ***********************************************************************
                    494
02C7 [05] 1C00      495  FIREPLS BSET 6,PORTA           ;SET FIRE PULSE OUTPUT TO HIGH
02C9 [02] AE00      496          LDX #$00
02CB [04] E620      497          LDA FDLYTAB,X          ;READ TABLE FOR DELAY TIME
02CD [04] B7A1      498          STA DLYTIME
02CF [03] 5C        499          INCX
02D0 [04] E620      500          LDA FDLYTAB,X
02D2 [04] B7A2      501          STA DLYTIME+1
02D4 [06] CD083F    502          JSR DLYTM              ;DELAY
02D7 [05] 1D00      503          BCLR 6,PORTA           ;SET FIRE PULSE OUTPUT TO LOW
02D9 [05] 0A1301    504          BRSET 5,TSR,UPDATE     ;IF TOF IS SET GO TO UPDATE ROUTINE
02DC [06] 81        505  DONE    RTS
                    506
02DD [02] 98        507  UPDATE  CLC
02DE [03] B68B      508          LDA TIMECTL            ;LOAD TIMER COUNTER LOW BYTE
02E0 [02] AB01      509          ADD #$01               ;INCREMENT COUNT
02E2 [04] B78B      510          STA TIMECTL            ;STORE NEW LOW BYTE COUNT IN COUNTER
02E4 [03] B68A      511          LDA TIMECTH            ;READ COUNTER HIGH BYTE
02E6 [02] A900      512          ADC #$00               ;INCREMENT COUNT ON CARRY SET
02E8 [04] B78A      513          STA TIMECTH            ;STORE NEW HIGH BYTE COUNT IN COUNTER
02EA [03] B619      514          LDA TCNT+1             ;LOAD LOW BYTE OF TIMER TO CLEAR TOF
02EC [03] CC02DC    515          JMP DONE               ;GO TO END OF SUBROUTINE
                    516
                    517
                    518  ***********************************************************************
                    519  *                 MAGNITUDE 2 POT READING SUB ROUTINE                 *
                    520  ***********************************************************************
                    521
```

```
2F1 [04] B71E      523           STA ADSCR            ;LOAD BYTE INTO A/D STATUS AND CONTROL REG.
2F3 [05] 0F1EFD    524  CONV2    BRCLR 7,ADSCR,CONV2  ;WAIT UNTIL CCF IS SET (CONVERSION COMPLETE)
2F6 [03] B61D      525           LDA ADDR             ;READ CONVERTED VALUE
2F8 [04] B783      526           STA POT2             ;STORE VALUE FOR POT2
2FA [06] 81        527           RTS
                   528
                   529  ************************************************************************
                   530  *                    TIMER POT READING SUBROUTINE                       *
                   531  ************************************************************************
                   532
2FB [03] B624      533  TPOT     LDA CH2              ;CONFIGURATION BYTE FOR ADC
2FD [04] B71E      534           STA ADSCR            ;LOAD BYTE INTO A/D STATUS AND CONTROL REG.
2FF [05] 0F1EFD    535  CONV0    BRCLR 7,ADSCR,CONV0  ;WAIT UNTIL CCF IS SET (CONVERSION COMPLETE)
302 [03] B61D      536           LDA ADDR             ;READ CONVERTED VALUE
304 [04] B7BE      537           STA TEMPT            ;SAVE POT VALUE IN TEMP REGISTER
306 [02] A6FF      538           LDA #$FF             ;INVERT POT VALUE
308 [03] B0BE      539           SUB TEMPT
30A [02] 98        540           CLC
30B [03] 46        541           RORA                 ;DIVIDE BY 2
30C [04] B781      542           STA POTOL            ;STORE RESULT
30E [02] A600      543           LDA #$00
310 [04] B780      544           STA POTOH
312 [05] 00022B    545           BRSET 0,PORTC,CKT2   ;IF TIME 2 IS HIGH, GO TO CKT2
315 [05] 0F0114    546           BRCLR 7,PORTB,T60    ;IF TIME 1 IS LOW, GO TO T60
318 [02] 98        547           CLC
319 [03] B681      548           LDA POTOL            ;ADD $71 TO POTO (FIXED ADDER OF 15s)
31B [02] AB71      549           ADD #$71
31D [04] B781      550           STA POTOL
31F [03] B680      551           LDA POTOH
321 [02] A900      552           ADC #$00
323 [04] B780      553           STA POTOH
325 [02] A650      554           LDA #$50             ;SET ZERO SPEED SENSE SENSITIVITY
327 [04] B7BD      555           STA MSTOP
329 [03] CC0354    556           JMP T15              ;EXIT RTN
32C [02] 98        557  T60      CLC
32D [03] B681      558           LDA POTOL            ;ADD $153 TO POTO (FIXED ADDER OF 45s)
32F [02] AB53      559           ADD #$53
331 [04] B781      560           STA POTOL
333 [03] B680      561           LDA POTOH
335 [02] A901      562           ADC #$01
337 [04] B780      563           STA POTOH
339 [02] A6A0      564           LDA #$A0             ;SET ZERO SPEED SENSE SENSITIVITY
33B [04] B7BD      565           STA MSTOP
33D [03] CC0354    566           JMP T15              ;EXIT RTN
340 [05] 0E0111    567  CKT2     BRSET 7,PORTB,T15    ;IF TIME 1 IS HIGH, EXIT RTN
343 [02] 98        568           CLC
344 [03] B681      569           LDA POTOL            ;ADD $E2 TO POTO (FIXED ADDER OF 30s)
346 [02] ABE2      570           ADD #$E2
348 [04] B781      571           STA POTOL
34A [03] B680      572           LDA POT9H
34C [02] A900      573           ADC #$00
34E [04] B780      574           STA PCTOH
350 [02] A678      575           LDA #$78             ;SET ZERO SPEED SENSE SENSITIVITY
352 [04] B7BD      576           STA MSTOP
354 [02] A628      577  T15      LDA #$28             ;SET ZERO SPEED SENSE SENSITIVITY
356 [04] B7BD      578           STA MSTOP
358 [06] 81        579           RTS
                   581  ************************************************************************
                   582  *               RELAY SUBROUTINE TO CLOSE BRAKE CONTACTOR               *
                   583  ************************************************************************
                   584
```

```
359 [05] 1F00      585  BRLYON  BCLR 7,PORTA            ;CLEAR OUTPUT TO RELAY TO TURN RELAY OFF
35B [02] A674      586          LDA #$74                ;SET DELAY
35D [04] B786      587          STA COUNT
35F [02] A624      588          LDA #$24
361 [04] B787      589          STA COUNT+1
363 [06] CD086D    590          JSR ALTDLY              ;DELAY
366 [05] 1A00      591          BSET 5,PORTA            ;SET OUTPUT TO RELAY TO TURN RELAY ON
368 [02] A6C3      592          LDA #$C3                ;SET DELAY
36A [04] B786      593          STA COUNT
36C [02] A650      594          LDA #$50
36E [04] B787      595          STA COUNT+1
370 [06] CD086D    596          JSR ALTDLY
373 [06] 81        597          RTS
                   598
                   599  *************************************************************
                   600  *            RELAY SUBROUTINE TO OPEN BRAKE CONTACTOR        *
                   601  *************************************************************
                   602
374 [02] A674      603  BRLYOFF LDA #$74                ;SET DELAY
376 [04] B786      604          STA COUNT
378 [02] A624      605          LDA #$24
37A [04] B787      606          STA COUNT+1
37C [06] CD086D    607          JSR ALTDLY
37F [06] CD1FF1    608          JSR COPRST
382 [05] 1B00      609          BCLR 5,PORTA            ;CLEAR OUTPUT TO RELAY TO TURN RELAY OFF
384 [06] 81        610          RTS
                   611
                   612  *************************************************************
                   613  *                FREQUENCY DETECTION ROUTINE                 *
                   614  *************************************************************
                   615  * 60HZ FORMULA: 8 [$12 + ($01)($00-FF)]
                   616  * 50HZ FORMULA: 8 [$16 + ($01)($00-FF)]
                   617
385 [02] A6FF      618  FREQDET LDA #$FF
387 [03] B1BA      619          CMP FRQFLAG             ;IS DETECTION FLAG SET?
389 [03] 273B      620          BEQ ENDDET              ;IF SO, END RTN
38B [03] B6B5      621          LDA ZCSAVE              ;READ HIGH BYTE OF LAST ZERO CROSS TIME STAMP
38D [02] A100      622          CMP #$00                ;IS IT ZERO?
38F [03] 2606      623          BNE DET                 ;IF NOT, GO TO DET
391 [03] B6B6      624          LDA ZCSAVE+1            ;READ LOW BYTE OF LAST ZERO CROSS TIME STAMP
393 [02] A100      625          CMP #$00                ;IS IT ZERO?
395 [03] 2738      626          BEQ FIFTY               ;IF SO, DEFAULT TO 50HZ
397 [03] B6B3      627  DET     LDA ZCSTAMP             ;READ HIGH BYTE OF TIME STAMP
399 [03] B1B5      628          CMP ZCSAVE              ;COMPARE TO LAST TIME STAMP
39B [03] 222A      629          BHI HIGHER              ;IF TIME STAMP IS GREATER, GO TO HIGHER
39D [03] B6B5      630          LDA ZCSAVE              ;READ LAST TIME STAMP
39F [03] 40        631          NEGA                    ;2'S COMPLEMENT
3A0 [03] BBB3      632          ADD ZCSTAMP             ;ADD TO PREVIOUS (SUBTRACTION)
                   633  *IF 20% OVER 50HZ THEN GO TO ERROR
3A2 [02] A12E      634          CMP #$2E
3A4 [03] 2238      635          BHI FREQERR
                   636  *IF 20% UNDER 60HZ THEN GO TO ERROR
3A6 [02] A11A      637          CMP #$1A
3AA [02] A125      639  COMP    CMP #$25                ;COMPARE DIFFERENCE TO $25
3AC [03] 2221      640          BHI FIFTY               ;IF THE DIFFERENCE IS GREATER THAN $25, THEN
                   641  *                                ;GO TO FIFTY
3AE [02] A601      642  SIXTY   LDA #$01                ;SET THE FREQUENCY PARAMETERS FOR 60HZ.
3B0 [04] B7B9      643          STA FREQMUL
3B2 [02] A600      644          LDA #$00
3B4 [04] B7B7      645          STA FREQFIX
3B6 [02] A63E      646          LDA #$3E                ;$6F
```

```
3B8 [04] B7B8     647           STA FREQFIX+1
3BA [03] B6B3     648  ENDFREQ  LDA ZCSTAMP     ;SAVE TIME STAMP TO LAST TIME STAMP
3BC [04] B7B5     649           STA ZCSAVE
3BE [03] B6B4     650           LDA ZCSTAMP+1
3C0 [04] B7B6     651           STA ZCSAVE+1
3C2 [02] A6FF     652           LDA #$FF
3C4 [04] B7BA     653           STA FRQFLAG     ;SET DETECTION FLAG
3C6 [06] 81       654  ENDDET   RTS
                  655
3C7 [03] B6B3     656  HIGHER   LDA ZCSTAMP     ;READ TIME STAMP
3C9 [03] 40       657           NEGA            ;2'S COMPLEMENT
3CA [03] BBB5     658           ADD ZCSAVE      ;ADD TO PREVIOUS (SUBTRACTION)
3CC [03] CC03AA   659           JMP COMP        ;GO TO COMP
3CF [02] A601     660  FIFTY    LDA #$01        ;SET PARAMETERS FOR 50HZ
3D1 [04] B7B9     661           STA FREQMUL
3D3 [02] A600     662           LDA #$00
3D5 [04] B7B7     663           STA FREQFIX
3D7 [02] A656     664           LDA #$56        ;$9B
3D9 [04] B7B8     665           STA FREQFIX+1
3DB [03] CC03BA   666           JMP ENDFREQ     ;GO TO ENDFREQ
3DE [02] A605     667  FREQERR  LDA #$05
3E0 [04] B79C     668           STA ERRFLAG
3E2 [04] B79B     669           STA INTCNT
3E4 [10] 83       670           SWI
                  671
                  672  ************************************************************
                  673  *           PRE-MAGNITUDE POT DELAY SUBROUTINE              *
                  674  ************************************************************
                  675
3E5 [06] CD074D   676  PREMAG   JSR CKSTOP      ;UPDATE E-STOP FLAG
3E8 [03] B693     677           LDA ESTOP       ;READ EMERGENCY STOP FLAG
3EA [02] A1FF     678           CMP #$FF        ;CHECK FOR EMERGENCY STOP
3EC [03] 2709     679           BEQ EPOT2       ;IF E-STOP GOTO EPOT2
3EE [05] BD27     680  PREST    JSR MPOT        ;UPDATE VALUE OF MAGNITUDE POT
3F0 [03] BEB9     681           LDX FREQMUL     ;LOAD POT TIMING MULTIPLIER
3F2 [03] B682     682           LDA POT1        ;LOAD MAGNITUDE POT VALUE
3F4 [03] CC03FE   683           JMP MULT        ;GOTO MULTIPLY
3F7 [06] CD02EF   684  EPOT2    JSR EPOT        ;UPDATE VALUE OF EMERGENCY MAGNITUDE POT
3FA [03] BEB9     685           LDX FREQMUL     ;LOAD POT TIMING MULTIPLIER
3FC [03] B683     686           LDA POT2        ;READ E-MAG POT
3FE [11] 42       687  MULT     MUL             ;MULTIPLY TO GET POT COUNT
3FF [04] BF88     688           STX PCOUNT      ;STORE HIGH BYTE OF POT COUNT
401 [04] B789     689           STA PCOUNT+1    ;STORE LOW BYTE OF POT COUNT
403 [02] 98       690           CLC
404 [05] 3688     691           ROR PCOUNT      ;DIVIDE BY 2
406 [05] 3689     692           ROR PCOUNT+1
408 [06] 81       693           RTS
                  694
                  695  ************************************************************
                  697  ************************************************************
                  698
409 [02] 98       699  MAG      CLC             ;CLEAR CARRY BIT
40A [03] B689     700           LDA PCOUNT+1    ;LOAD LOW BYTE OF POT COUNT
40C [03] BBB8     701           ADD FREQFIX+1
40E [04] B787     702           STA COUNT+1     ;STORE LOW BYTE OF FINAL COUNT
410 [03] B688     703           LDA PCOUNT      ;LOAD HIGH BYTE OF POT COUNT
412 [03] B9B7     704           ADC FREQFIX
414 [04] B786     705           STA COUNT       ;STORE HIGH BYTE OF FINAL COUNT
416 [06] CD086D   706           JSR ALTDLY      ;DELAY
419 [06] 81       707           RTS
                  708
```

```
                  709 *********************************************************************
                  710 *              HOLD BRAKE MAGNITUDE POT DELAY SUBROUTINE              *
                  711 *********************************************************************
                  712
1A [05] BD27      713 HMAG    JSR MPOT           ;UPDATE VALUE OF MAGNITUDE POT
1C [02] AE04      714         LDX #$04           ;LOAD POT TIMING MULTIPLIER
1E [03] B682      715         LDA POT1           ;LOAD MAGNITUDE POT VALUE
20 [11] 42        716         MUL                ;MULTIPLY TO GET POT COUNT
21 [04] BF88      717         STX PCOUNT         ;STORE HIGH BYTE OF POT COUNT
23 [04] B789      718         STA PCOUNT+1       ;STORE LOW BYTE OF POT COUNT
25 [03] B6B8      719         LDA FREQFIX+1      ;CALCULATE FIRING DELAY
27 [02] AE25      720         LDX #$25           ;
29 [11] 42        721         MUL
2A [04] B787      722         STA COUNT+1        ;SET DELAY
2C [04] BF86      723         STX COUNT
2E [02] 98        724         CLC
2F [03] B689      725         LDA PCOUNT+1
31 [03] BB87      726         ADD COUNT+1
33 [04] B787      727         STA COUNT+1
35 [03] B688      728         LDA PCOUNT
37 [03] B986      729         ADC COUNT
39 [04] B786      730         STA COUNT
3B [06] CD086D    731         JSR ALTDLY
3E [06] 81        732         RTS
                  733
                  734 *********************************************************************
                  735 *                         SENSE ROUTINE                              *
                  736 *********************************************************************
                  737
3F [02] A605      738 SENSE   LDA #$05           ;LOAD A COUNT OF $05 TO CHECK 5 LOWS
41 [04] B78C      739         STA SCNT2          ;STORE COUNT INTO COUNTER
43 [05] 3FBB      740 CLRFG   CLR SFLAG          ;CLEAR SENSE FLAG
                  741
                  742 *   CHECKING FOR THE AC ON STATE
                  743
445 [06] CD1FF1   744 AC      JSR COPRST
448 [02] 98       745         CLC                ;CLEAR THE CARRY
449 [03] B613     746         LDA TSR
44B [03] B619     747         LDA TCNT+1         ;CLEAR TOF
44D [03] B51B     748         LDA ALTCNT+1       ;LOAD TIMER LOW BYTE
44F [02] AB98     749         ADD #$98           ;ADD LOW BYTE OF COUNT TO TIMER LOW
451 [04] B79A     750         STA OC2+1          ;PUT RESULT IN OC2 LOW BYTE
453 [03] B61A     751         LDA ALTCNT         ;LOAD TIMER HIGH BYTE
455 [02] A93A     752         ADC #$3A           ;ADD HIGH BYTE OF COUNT TO TIMER HIGH
457 [04] B799     753         STA OC2            ;STORE RESULT IN OC2 HIGH
                  755 * IF CARRY SETS HERE THEN THE RESULT WILL BE A LOWER NUMBER THAN THE TIMER
                  756 * IS NOW
                  757 * IF THE CARRY IS SET THEN WAIT FOR TIMER OVERFLOW TO OCCUR AND THEN START
                  758 * COMPARING THE TIMER TO OC2
                  759
59 [06] CD1FF1    760 CLOW2   JSR COPRST
5C [05] 0C0104    761         BRSET 6,PORTB,CKOCF ;IF SENSE IS NOT LOW, GO TO CKOCF
5F [02] A6FF      762         LDA #$FF
61 [04] B7BB      763         STA SFLAG          ;SET SENSE FLAG
63 [03] 2403      764 CKOCF   BCC LOOP1          ;TEST CARRY BIT
65 [05] 0B13F1    765 CKTOF   BRCLR 5,TSR,CLOW2  ;TEST BIT 5 OF TSR FOR SET CONDITION
68 [03] B61A      766 LOOP1   LDA ALTCNT         ;READ TIMER HIGH BYTE
6A [03] B199      767         CMP OC2            ;COMPARE TIMER TO OC2
6C [03] 25EB      768         BLO CLOW2          ;IF TIMER IS LOWER, GO TO CKLOW
6E [03] B61B      769         LDA ALTCNT+1       ;READ TIMER LOW BYTE
70 [03] B19A      770         CMP OC2+1          ;COMPARE TO OC2 LOW BYTE
```

```
472 [03] 25E5    771         BLO CLOW2              ;IF TIMER IS LOWER, GO TO CKLOW
474 [02] A6FF    772         LDA #$FF
476 [03] B1BB    773         CMP SFLAG              ;IS SFLAG SET?
478 [03] 26C9    774         BNE CLRFG              ;IF NOT, GO TO CLRFG
47A [05] 3A8C    775         DEC SCNT2              ;DECREMENT COUNT
47C [02] A600    776         LDA #$00
47E [03] B18C    777         CMP SCNT2              ;IS COUNT ZERO?
480 [03] 26C1    778         BNE CLRFG              ;IF NOT, GO TO CLRFG
482 [02] 98      779 RSTTIME CLC                    ;CLEAR THE CARRY
483 [06] CD1FF1  780         JSR COPRST
486 [03] B613    781         LDA TSR
488 [03] B619    782         LDA TCNT+1             ;CLEAR TOF
48A [03] B61B    783         LDA ALTCNT+1           ;LOAD TIMER LOW BYTE
48C [02] AB50    784         ADD #$50               ;ADD LOW BYTE OF COUNT TO TIMER LOW
48E [04] B79A    785         STA OC2+1              ;PUT RESULT IN OC2 LOW BYTE
490 [03] B61A    786         LDA ALTCNT             ;LOAD TIMER HIGH BYTE
492 [02] A9C3    787         ADC #$C3               ;ADD HIGH BYTE OF COUNT TO TIMER HIGH
494 [04] B799    788         STA OC2                ;STORE RESULT IN OC2 HIGH
496 [05] 0D01E9  789 LOW2    BRCLR 6,PORTB,RSTTIME  ;IF SENSE IS LOW, GO TO RESET TIMER
499 [06] CD1FF1  790         JSR COPRST
49C [03] 2403    791         BCC LOOP2              ;TEST CARRY BIT
49E [05] 0B13F5  792         BRCLR 5,TSR,LOW2       ;TEST BIT 5 OF TSR FOR SET CONDITION
4A1 [03] B61A    793 LOOP2   LDA ALTCNT             ;READ TIMER HIGH BYTE
4A3 [03] B199    794         CMP OC2                ;COMPARE TIMER TO OC2
4A5 [03] 25EF    795         BLO LOW2               ;IF TIMER IS LOWER, GO TO CKLOW
4A7 [03] B61B    796         LDA ALTCNT+1           ;READ TIMER LOW BYTE
4A9 [03] B19A    797         CMP OC2+1              ;COMPARE TO OC2 LOW BYTE
4AB [03] 25E9    798         BLO LOW2               ;IF TIMER IS LOWER, GO TO CKLOW
4AD [06] 81      799         RTS
                 800
                 801 ************************************************************
                 802 *              ZERO CROSSING SENSE ROUTINE                  *
                 803 ************************************************************
                 804
4AE [02] A602    805 ZCROSS  LDA #$02               ;SET ERROR FLAG TO 2
4B0 [04] B79C    806         STA ERRFLAG
4B2 [06] CD077D  807         JSR ABTIME             ;START ERROR TIMING
4B5 [05] 0A010C  808 ZC      BRSET 5,PORTB,LOW      ;IS ZERO CROSS LOW?
4B8 [06] CD1FF1  809         JSR COPRST             ;RESET COP
4BB [02] A6FF    810         LDA #$FF
4BD [04] B794    811         STA LFLAG              ;SET LOW FLAG
4C1 [03] CC04B5  813         JMP ZC                 ;CHECK ZCROSS AGAIN
4C4 [06] CD1FF1  814 LOW     JSR COPRST             ;RESET COP
4C7 [02] A6FF    815         LDA #$FF
4C9 [04] B795    816         STA HFLAG              ;SET HIGH FLAG
4CB [02] A6FF    817         LDA #$FF
4CD [03] B194    818         CMP LFLAG              ;IS LOW FLAG SET?
4CF [03] 26E4    819         BNE ZC                 ;CHECK ZCROSS AGAIN
4D1 [05] 3F94    820         CLR LFLAG              ;CLEAR LOW FLAG
4D3 [03] B61A    821         LDA ALTCNT             ;STORE ZERO CROSS TIME STAMP
4D5 [04] B7B3    822         STA ZCSTAMP
4D7 [03] B61B    823         LDA ALTCNT+1
4D9 [04] B7B4    824         STA ZCSTAMP+1
4DB [02] 9B      825         SEI                    ;DISABLE INTERRUPTS
4DC [05] 1D12    826         BCLR 6,TCR             ;DISABLE TIMER INTERRUPT
4DE [05] 3F9B    827         CLR INTCNT             ;CLEAR INTERRUPT COUNT
4E0 [06] 81      828         RTS
                 829
                 830 ************************************************************
                 831 *                     FIRING ROUTINE                        *
                 832 ************************************************************
```

```
                        833
4E1 [06] CD04AE         834  FIRE    JSR ZCROSS              ;DETECT ZERO CROSS
4E4 [06] CD0385         835          JSR FREQDET             ;DETECT FREQUENCY
4E7 [06] CD03E5         836          JSR PREMAG              ;MAGNITUDE DELAY PROCESSING
4EA [06] CD0795         837  SLICE   JSR ZSPEED              ;ZERO SPEED DETECTION PROCESSING
4ED [06] CD0409         838          JSR MAG                 ;DELAY BEFORE FIRING
4F0 [03] B6A0           839          LDA ARRAYI              ;READ ARRAY COUNTER
4F2 [02] A100           840          CMP #$00                ;IS ARRAY COUNTER 0?
4F4 [03] 26F4           841          BNE SLICE               ;IF NOT, LOOP TO SLICE
4F6 [06] CD02C7         842          JSR FIREPLS             ;GENERATE FIRE PULSE
4F9 [06] CD1FF1         843          JSR COPRST              ;RESET COP
4FC [06] CD02FB         844          JSR TPOT                ;READ TIMER POT
4FF [03] B68A           845          LDA TIMECTH             ;LOAD BRAKE TIMER COUNTER
501 [03] B180           846          CMP POTOH               ;COMPARE COUNTER TO POT VALUE
503 [03] 241E           847          BHS CKLOW               ;EXIT LOOP IF COUNTER EQUALS POT VALUE
505 [06] CD071D         848  M1      JSR CZSWIT              ;UPDATE ZSWITCH FLAG
508 [03] B692           849          LDA ZSWITCH             ;READ ZERO SPEED SWITCH FLAG
50A [02] A100           850          CMP #$00                ;CHECK FOR ZERO SPEED SWITCH COMMAND
50C [03] 2709           851          BEQ CLRTIME             ;IF NO COMMAND, GOTO FIRE
50E [05] 0F031B         852          BRCLR 7,PORTD,DIS       ;DISABLE ZERO SPEED SENSE IF LOW
511 [02] A6FF           853          LDA #$FF
513 [03] B19F           854          CMP MATCH               ;IS MATCH SET?
515 [03] 26CA           855          BNE FIRE                ;IF NOT, GO TO BEGINNING OF RTN
517 [05] 3F8A           856  CLRTIME CLR TIMECTH             ;CLEAR BRAKE TIMER COUNTER HIGH BYTE
519 [05] 3F8B           857          CLR TIMECTL             ;CLEAR BRAKE TIMER COUNTER LOW BYTE
51B [05] 3FB5           858          CLR ZCSAVE              ;CLEAR ZERO CROSS TIME STAMP
51D [05] 3FB6           859          CLR ZCSAVE+1
51F [06] CD088B         860          JSR CLRMAT              ;CLEAR MATCH REGISTER
522 [06] 81             861          RTS
                        862
523 [03] B68B           863  CKLOW   LDA TIMECTL             ;READ COUNTER LOW BYTE
525 [03] B181           864          CMP POTOL               ;COMPARE TO POT LOW BYTE
527 [03] 24EE           865          BHS CLRTIME             ;IF HIGHER OR SAME VALUE, GOTO CLRTIME
529 [03] CC0505         866          JMP M1                  ;GOTO M1
                        867
52C [03] CC04E1         868  DIS     JMP FIRE                ;GO TO BEGINNING OF RTN
                        869
                        870  ****************************************************************
                        871  *                INTERUPTIBLE FIRING ROUTINE                    *
                        872  ****************************************************************
                        873
52F [06] CD068D         874  IFIRE   JSR CSTART              ;UPDATE START FLAG
532 [03] B68F           875          LDA START               ;CHECK FOR START COMMAND
534 [02] A100           876          CMP #$00
536 [03] 273B           877          BEQ SETFLAG             ;IF START COMMAND IS DETECTED GOTO SETFLAG
538 [06] CD04AE         878  ECONT   JSR ZCROSS              ;DETECT ZERO CROSS
53B [06] CD0385         879          JSR FREQDET             ;DETECT FREQUENCY
53E [06] CD03E5         880          JSR PREMAG              ;SETUP TIME DELAYS
541 [06] CD0795         881  SLC     JSR ZSPEED              ;LOOK FOR ZERO SPEED
544 [06] CD0409         882          JSR MAG                 ;DELAY BEFORE FIRING
547 [03] B6A0           883          LDA ARRAYI              ;READ ARRAY COUNTER
549 [02] A100           884          CMP #$00                ;IS IT = 0?
54B [03] 26F4           885          BNE SLC                 ;IF NOT, LOOP TO ZERO SPEED SENSE
54D [06] CD02C7         886          JSR FIREPLS             ;GENERATE FIRE PULSE
550 [06] CD1FF1         887          JSR COPRST              ;RESET COP
553 [06] CD02FB         888          JSR TPOT                ;READ TIMER POT
556 [03] B68A           889          LDA TIMECTH             ;LOAD BRAKE TIMER COUNTER
558 [03] B180           890          CMP POTOH               ;COMPARE COUNTER TO POT VALUE
55A [03] 2427           891          BHS CLOW                ;EXIT LOOP IF COUNTER EQUALS POT VALUE
55C [06] CD071D         892  C2      JSR CZSWIT              ;UPDATE ZSWITCH FLAG
55F [03] B692           893          LDA ZSWITCH             ;READ ZERO SPEED SWITCH FLAG
```

```
:561 [02] A100    894           CMP #$00                  ;CHECK FOR ZERO SPEED SWITCH COMMAND
:563 [03] 2709    895           BEQ CLRCNT                ;IF ZERO SPEED IS DETECTED GOTO CLEAR COUNT
:565 [05] 0F0324  896           BRCLR 7,PORTD,DSBL        ;CHECK FOR ZERO SPEED SENSE DISABLE SWITCH
:568 [02] A6FF    897           LDA #$FF                  ;IS MATCH SET?
:56A [03] B19F    898           CMP MATCH
:56C [03] 26C1    899           BNE IFIRE                 ;IF NOT, GOTO TOP OF ROUTINE
:56E [05] 3F8A    900  CLRCNT   CLR TIMECTH               ;CLEAR BRAKE TIMER COUNTER HIGH BYTE
:570 [05] 3F8B    901           CLR TIMECTL               ;CLEAR BRAKE TIMER COUNTER LOW BYTE
:572 [06] 81      902           RTS
                  903
:573 [02] A6FF    904  SETFLAG  LDA #$FF
:575 [04] B78E    905           STA STFLAG                ;SET START FLAG
:577 [06] CD074D  906           JSR CESTOP                ;CHECK FOR E-STOP
:57A [02] A6FF    907           LDA #$FF
:57C [03] B193    908           CMP ESTOP
:57E [03] 27B8    909           BEQ ECONT                 ;IF E-STOP IS TRUE, GOTO ECONT
:580 [03] CC056E  910           JMP CLRCNT                ;GOTO CLEAR BRAKE TIMER COUNTER
                  911
:583 [03] B68B    912  CLOW     LDA TIMECTL               ;READ COUNTER LOW BYTE
:585 [03] B181    913           CMP POTOL                 ;COMPARE TO POT LOW BYTE
:587 [03] 24E5    914           BHS CLRCNT                ;IF HIGHER OR SAME, GOTO CLRCNT
:589 [03] CC055C  915           JMP C2                    ;GOTO C2
                  916
:58C [03] CC052F  917  DSBL     JMP IFIRE                 ;GOTO TOP OF ROUTINE
                  918
                  919  ************************************************************************
                  920  *              PRE-STOP INTERRUPTIBLE FIRING ROUTINE                   *
                  921  ************************************************************************
                  922
:58F [06] CD071D  923  PFIRE    JSR CZSWIT                ;UPDATE ZSWITCH FLAG
:592 [06] CD04AE  924           JSR ZCROSS                ;DETECT ZERO CROSS
:595 [06] CD0385  925           JSR FREQDET               ;DETECT FREQUENCY
:598 [06] CD03E5  926           JSR PREMAG                ;CALCULATE FIRING DELAYS
:59B [06] CD0795  927  SLCE     JSR ZSPEED                ;LOOK FOR ZERO SPEED
:5A1 [03] B6A0    929           LDA ARRAYI                ;READ ARRAY COUNTER
:5A3 [02] A100    930           CMP #$00                  ;IS IT = 0?
:5A5 [03] 26F4    931           BNE SLCE                  ;IF NOT, LOOK FOR ZERO SPEED AGAIN
:5A7 [06] CD02C7  932           JSR FIREPLS               ;GENERATE FIRE PULSE
:5AA [06] CD1FF1  933           JSR COPRST                ;RESET COP
:5AD [06] CD02FB  934           JSR TPOT                  ;READ TIMER POT
:5B0 [03] B68A    935           LDA TIMECTH               ;LOAD BRAKE TIMER COUNTER
:5B2 [03] B180    936           CMP POTOH                 ;COMPARE COUNTER TO POT VALUE
:5B4 [03] 2417    937           BHS CHKLOW                ;EXIT LOOP IF COUNTER EQUALS POT VALUE
:5B6 [06] CD071D  938  C3A      JSR CZSWIT                ;UPDATE CONTROL REGISTER
:5B9 [03] B692    939           LDA ZSWITCH               ;READ ZERO SPEED SWITCH FLAG
:5BB [02] A100    940           CMP #$00                  ;CHECK FOR ZERO SPEED SWITCH COMMAND
:5BD [03] 2709    941           BEQ CLRCT                 ;IF COMMAND IS TRUE, GOTO CLEAR COUNTER
:5BF [05] 0F0314  942           BRCLR 7,PORTD,DISAB       ;CHECK FOR ZERO SPEED DISABLE SWITCH
:5C2 [02] A6FF    943           LDA #$FF                  ;CHECK FOR ZERO SPEED SENSE MATCH
:5C4 [03] B19F    944           CMP MATCH
:5C6 [03] 26C7    945           BNE PFIRE                 ;GOTO IFIRE IF NO Z-SW COMMAND OR ZERO SPEED
:5C8 [05] 3F8A    946  CLRCT    CLR TIMECTH               ;CLEAR BRAKE TIMER COUNTER HIGH BYTE
:5CA [05] 3F8B    947           CLR TIMECTL               ;CLEAR BRAKE TIMER COUNTER LOW BYTE
:5CC [06] 81      948           RTS
                  949
:5CD [03] B68B    950  CHKLOW   LDA TIMECTL               ;READ TIMER COUNTER LOW BYTE
:5CF [03] B181    951           CMP POTOL                 ;COMPARE TO POT LOW BYTE
:5D1 [03] 24F5    952           BHS CLRCT                 ;IF HIGHER OR SAME, GOTO CLRCT
:5D3 [03] CC05B6  953           JMP C3A                   ;GOTO C3
                  954
:5D6 [03] CC058F  955  DISAB    JMP PFIRE                 ;LOOP TO TOP
```

```
                956
                957  ****************************************************************
                958  *              HOLD BRAKE INTERUPTIBLE FIRING ROUTINE           *
                959  ****************************************************************
                960
05D9 [06] CD068D 961  HFIRE  JSR CSTART            ;UPDATE START FLAG
05DC [03] B68F   962         LDA START             ;READ START FLAG
05DE [02] A100   963         CMP #$00              ;CHECK FOR START COMMAND
05E0 [03] 2712   964         BEQ SETFLG            ;IF START COMMAND IS DETECTED GOTO SETFLAG
05E2 [06] CD04AE 965         JSR ZCROSS            ;DETECT ZERO CROSS
05E5 [06] CD0385 966         JSR FREQDET           ;CHECK FREQUENCY
05E8 [06] CD041A 967         JSR HMAG              ;DELAY BEFORE FIRING
05EB [06] CD02C7 968         JSR FIREPLS           ;GENERATE FIRE PULSE
05EE [06] CD1FF1 969         JSR COPRST            ;RESET COP
05F1 [03] CC05D9 970         JMP HFIRE             ;GOTO HFIRE
05F4 [06] 81     971  SETFLG RTS
                972
                973  ****************************************************************
                974  *              CHECK FOR OPEN MOTOR CONTACTOR                   *
                975  ****************************************************************
                976
05F5 [02] A603   977  MCLEAR LDA #$03              ;SET ERROR FLAG TO 3
05F7 [04] B79C   978         STA ERRFLAG
05F9 [06] CD1FF1 979         JSR COPRST            ;RESET COP
05FC [06] CD077D 980         JSR ABTIME            ;START ERROR TIMER
05FF [02] 98     981         CLC                   ;CLEAR THE CARRY
0600 [03] B613   982         LDA TSR
0602 [03] B619   983         LDA TCNT+1            ;CLEAR TOF
0604 [03] B61B   984         LDA ALTCNT+1          ;LOAD TIMER LOW BYTE
0606 [02] AB50   985         ADD #$50              ;ADD LOW BYTE OF COUNT TO TIMER LOW
 0A [03] B61A   987         LDA ALTCNT            ;LOAD TIMER HIGH BYTE
 0C [02] A9C3   988         ADC #$C3              ;ADD HIGH BYTE OF COUNT TO TIMER HIGH
 0E [04] B799   989         STA OC2               ;STORE RESULT IN OC2 HIGH
 10 [05] 0D01E2 990  L      BRCLR 6,PORTB,MCLEAR  ;IF SENSE IS LOW, GO TO RESET TIMER
 13 [06] CD1FF1 991         JSR COPRST            ;RESET COP
 16 [03] 2403   992         BCC L2                ;TEST CARRY BIT
 18 [05] 0B13F5 993         BRCLR 5,TSR,L         ;TEST BIT 5 OF TSR FOR SET CONDITION
 1B [03] B61A   994  L2     LDA ALTCNT            ;READ TIMER HIGH BYTE
 1D [03] B199   995         CMP OC2               ;COMPARE TIMER TO OC2
 1F [03] 25EF   996         BLO L                 ;IF TIMER IS LOWER, GO TO CKLOW
 21 [03] B61B   997         LDA ALTCNT+1          ;READ TIMER LOW BYTE
 23 [03] B19A   998         CMP OC2+1             ;COMPARE TO OC2 LOW BYTE
 25 [03] 25E9   999         BLO L                 ;IF TIMER IS LOWER, GO TO CKLOW
 27 [02] 9B    1000         SEI
 28 [05] 1D12  1001         BCLR 6,TCR            ;DISABLE TIMER INTERRUPT
 2A [05] 3F9B  1002         CLR INTCNT
 2C [06] 81    1003         RTS
               1004
               1005 ****************************************************************
               1006 *              CHECK FOR OPEN BRAKE CONTACTOR                   *
               1007 ****************************************************************
               1008
 2D [02] A604  1009  BCLEAR LDA #$04              ;SET ERROR FLAG TO 4
 2F [04] B79C  1010         STA ERRFLAG
 31 [06] CD1FF1 1011        JSR COPRST            ;RESET COP
 34 [06] CD077D 1012        JSR ABTIME            ;START ERROR TIMEOUT
 37 [02] 98    1013         CLC                   ;CLEAR THE CARRY
 38 [03] B613  1014         LDA TSR
 3A [03] B619  1015         LDA TCNT+1            ;CLEAR TOF
 3C [03] B61B  1016         LDA ALTCNT+1          ;LOAD TIMER LOW BYTE
 3E [02] ABA8  1017         ADD #$A8              ;ADD LOW BYTE OF COUNT TO TIMER LOW
```

```
640 [04] B79A    1018          STA OC2+1            ;PUT RESULT IN OC2 LOW BYTE
642 [03] B61A    1019          LDA ALTCHT           ;LOAD TIMER HIGH BYTE
644 [02] A961    1020          ADC #$61             ;ADD HIGH BYTE OF COUNT TO TIMER HIGH
646 [04] B799    1021          STA OC2              ;STORE RESULT IN OC2 HIGH
648 [05] 0D01E2  1022  L3      BRCLR 6,PORTB,BCLEAR ;IF SENSE IS LOW, GO TO RESET TIMER
64B [06] CD1FF1  1023          JSR COPRST           ;RESET COP
64E [03] 2403    1024          BCC L4               ;TEST CARRY BIT
650 [05] 0B13F5  1025          BRCLR 5,TSR,L3       ;TEST BIT 5 OF TSR FOR SET CONDITION
653 [03] B61A    1026  L4      LDA ALTCHT           ;READ TIMER HIGH BYTE
655 [03] B199    1027          CMP OC2              ;COMPARE TIMER TO OC2
657 [03] 25EF    1028          BLO L3               ;IF TIMER IS LOWER, GO TO L3
659 [03] B61B    1029          LDA ALTCHT+1         ;READ TIMER LOW BYTE
65B [03] B19A    1030          CMP OC2+1            ;COMPARE TO OC2 LOW BYTE
65D [03] 25E9    1031          BLO L3               ;IF TIMER IS LOWER, GO TO L3
                 1032
                 1033
65F [02] 98      1034  ZOFF    CLC                  ;CLEAR THE CARRY
660 [06] CD1FF1  1035          JSR COPRST           ;RESET COP
663 [03] B613    1036          LDA TSR
665 [03] B619    1037          LDA TCHT+1           ;CLEAR TOF
667 [03] B61B    1038          LDA ALTCHT+1         ;LOAD TIMER LOW BYTE
669 [02] ABA8    1039          ADD #$A8             ;ADD LOW BYTE OF COUNT TO TIMER LOW
66B [04] B79A    1040          STA OC2+1            ;PUT RESULT IN OC2 LOW BYTE
66D [03] B61A    1041          LDA ALTCHT           ;LOAD TIMER HIGH BYTE
66F [02] A961    1042          ADC #$61             ;ADD HIGH BYTE OF COUNT TO TIMER HIGH
671 [04] B799    1043          STA OC2              ;STORE RESULT IN OC2 HIGH
673 [06] CD1FF1  1045  L5      JSR COPRST           ;RESET COP
676 [03] 2403    1046          BCC L6               ;TEST CARRY BIT
678 [05] 0B13F8  1047          BRCLR 5,TSR,L5       ;TEST BIT 5 OF TSR FOR SET CONDITION
67B [03] B61A    1048  L6      LDA ALTCHT           ;READ TIMER HIGH BYTE
67D [03] B199    1049          CMP OC2              ;COMPARE TIMER TO OC2
67F [03] 25F2    1050          BLO L5               ;IF TIMER IS LOWER, GO TO L5
681 [03] B61B    1051          LDA ALTCHT+1         ;READ TIMER LOW BYTE
683 [03] B19A    1052          CMP OC2+1            ;COMPARE TO OC2 LOW BYTE
685 [03] 25EC    1053          BLO L5               ;IF TIMER IS LOWER, GO TO L5
687 [02] 9B      1054          SEI
688 [05] 1D12    1055          BCLR 6,TCR           ;DISABLE TIMER INTERRUPT
68A [05] 3F9B    1056          CLR INTCHT
68C [06] 81      1057          RTS
                 1058
                 1059  ***************************************************************
                 1060  *         READ START INPUT AND UPDATE CONTROL BYTE            *
                 1061  ***************************************************************
                 1062
68D [06] CD1FF1  1063  CSTART  JSR COPRST           ;RESET COP
690 [03] BE98    1064          LDX DBNCCT           ;READ DEBOUNCE COUNT
692 [04] BF96    1065          STX TCOUNT           ;SET TRUE COUNT TO DEBOUNCE COUNT
694 [04] BF97    1066          STX FCOUNT           ;SET FALSE COUNT TO DEBOUNCE COUNT
696 [05] 000011  1067  CSTRT   BRSET 0,PORTA,CTRL7C ;CHECK FOR START BUTTON
699 [05] 3A97    1068          DEC FCOUNT           ;DECREMENT FALSE COUNT
69B [03] BE98    1069          LDX DBNCCT           ;READ DEBOUNCE COUNT
69D [04] BF96    1070          STX TCOUNT           ;SET TRUE COUNT TO DEBOUNCE COUNT
69F [02] A600    1071          LDA #$00             ;CHECK TO SEE IF FALSE COUNT IS 0
6A1 [03] B197    1072          CMP FCOUNT
6A3 [03] 26F1    1073          BNE CSTRT            ;READ SWITCH AGAIN IF FALSE COUNT IS <> 0
6A5 [02] A6FF    1074          LDA #$FF
6A7 [04] B78F    1075          STA START            ;SET START TO FALSE
6A9 [06] 81      1076  STRTEND RTS
6AA [05] 3A96    1077  CTRL7C  DEC TCOUNT           ;DECREMENT TRUE COUNT
6AC [03] BE98    1078          LDX DBNCCT           ;READ DEBOUNCE COUNT
6AE [04] BF97    1079          STX FCOUNT           ;SET FALSE COUNT TO DEBOUNCE COUNT
```

```
6B0 [02] A600    1080           LDA #$00            ;CHECK TO SEE IF TRUE COUNT IS 0
6B2 [03] B196    1081           CMP TCOUNT
6B4 [03] 26E0    1082           BNE CSTRT           ;READ SWITCH AGAIN IF TRUE COUNT IS <> 0
6B6 [02] A600    1083           LDA #$00
6B8 [04] B78F    1084           STA START           ;SET START TO TRUE
6BA [03] CC06A9  1085           JMP STRTEND         ;GOTO END
                 1086
                 1087  ****************************************************************
                 1088  *            READ STOP INPUT AND UPDATE CONTROL BYTE           *
                 1089  ****************************************************************
                 1090
6BD [06] CD1FF1  1091  CSTOP    JSR COPRST          ;RESET COP
6C0 [03] BE98    1092           LDX DBNCCT          ;READ DEBOUNCE COUNT
6C2 [04] BF96    1093           STX TCOUNT          ;SET TRUE COUNT TO DEBOUNCE COUNT
6C4 [04] BF97    1094           STX FCOUNT          ;SET FALSE COUNT TO DEBOUNCE COUNT
6C6 [05] 030011  1095  CSTP     BRCLR 1,PORTA,CTRL6S ;CHECK FOR STOP BUTTON
6C9 [05] 3A97    1096           DEC FCOUNT          ;DECREMENT FALSE COUNT
6CB [03] BE98    1097           LDX DBNCCT          ;READ DEBOUNCE COUNT
6CD [04] BF96    1098           STX TCOUNT          ;SET TRUE COUNT TO DEBOUNCE COUNT
6CF [02] A600    1099           LDA #$00            ;CHECK TO SEE IF FALSE COUNT IS 0
6D1 [03] B197    1100           CMP FCOUNT
6D3 [03] 26F1    1101           BNE CSTP            ;READ SWITCH AGAIN IF FALSE COUNT IS <> 0
6D7 [04] B790    1103           STA STOP            ;SET STOP TO FALSE
6D9 [06] 81      1104  STPEND   RTS
6DA [05] 3A96    1105  CTRL6S   DEC TCOUNT          ;DECREMENT TRUE COUNT
6DC [03] BE98    1106           LDX DBNCCT          ;READ DEBOUNCE COUNT
6DE [04] BF97    1107           STX FCOUNT          ;SET FALSE COUNT TO DEBOUNCE COUNT
6E0 [02] A600    1108           LDA #$00            ;CHECK TO SEE IF TRUE COUNT IS 0
6E2 [03] B196    1109           CMP TCOUNT
6E4 [03] 26E0    1110           BNE CSTP            ;READ SWITCH AGAIN IF TRUE COUNT IS <> 0
6E6 [02] A6FF    1111           LDA #$FF
6E8 [04] B790    1112           STA STOP            ;SET STOP TO TRUE
6EA [03] CC06D9  1113           JMP STPEND          ;GOTO END
                 1114
                 1115  ****************************************************************
                 1116  *            READ JOG INPUT AND UPDATE CONTROL BYTE            *
                 1117  ****************************************************************
                 1118
6ED [06] CD1FF1  1119  CJOG     JSR COPRST          ;RESET COP
6F0 [03] BE98    1120           LDX DBNCCT          ;READ DEBOUNCE COUNT
6F2 [04] BF96    1121           STX TCOUNT          ;SET TRUE COUNT TO DEBOUNCE COUNT
6F4 [04] BF97    1122           STX FCOUNT          ;SET FALSE COUNT TO DEBOUNCE COUNT
6F6 [05] 060011  1123  CJG      BRSET 3,PORTA,CTRL5C ;CHECK FOR JOG BUTTON
6F9 [05] 3A97    1124           DEC FCOUNT          ;DECREMENT FALSE COUNT
6FB [03] BE98    1125           LDX DBNCCT          ;READ DEBOUNCE COUNT
6FD [04] BF96    1126           STX TCOUNT          ;SET TRUE COUNT TO DEBOUNCE COUNT
6FF [02] A600    1127           LDA #$00            ;CHECK TO SEE IF FALSE COUNT IS 0
701 [03] B197    1128           CMP FCOUNT
703 [03] 26F1    1129           BNE CJG             ;READ SWITCH AGAIN IF FALSE COUNT IS <> 0
705 [02] A6FF    1130           LDA #$FF
707 [04] B791    1131           STA JOG             ;SET JOG TO FALSE
709 [06] 81      1132  JOGEND   RTS
70A [05] 3A96    1133  CTRL5C   DEC TCOUNT          ;DECREMENT TRUE COUNT
70C [03] BE98    1134           LDX DBNCCT          ;READ DEBOUNCE COUNT
70E [04] BF97    1135           STX FCOUNT          ;SET FALSE COUNT TO DEBOUNCE COUNT
710 [02] A600    1136           LDA #$00            ;CHECK TO SEE IF TRUE COUNT IS 0
712 [03] B196    1137           CMP TCOUNT
714 [03] 26E0    1138           BNE CJG             ;READ SWITCH AGAIN IF TRUE COUNT IS <> 0
716 [02] A600    1139           LDA #$00
718 [04] B791    1140           STA JOG             ;SET JOG TO TRUE
71A [03] CC0709  1141           JMP JOGEND          ;GOTO END
```

```
                1142
                1143 ****************************************************************
                1144 *           READ ZSWITCH INPUT AND UPDATE CONTROL BYTE          *
                1145 ****************************************************************
                1146
71D [06] CD1FF1 1147 CZSWIT JSR COPRST        ;RESET COP
720 [03] BE98   1148        LDX DBNCCT        ;READ DEBOUNCE COUNT
722 [04] BF96   1149        STX TCOUNT        ;SET TRUE COUNT TO DEBOUNCE COUNT
724 [04] BF97   1150        STX FCOUNT        ;SET FALSE COUNT TO DEBOUNCE COUNT
726 [05] 080011 1151 CZS    BRSET 4,PORTA,CTRL4C ;CHECK FOR ZSWITCH BUTTON
729 [05] 3A97   1152        DEC FCOUNT        ;DECREMENT FALSE COUNT
72B [03] BE98   1153        LDX DBNCCT        ;READ DEBOUNCE COUNT
72D [04] BF96   1154        STX TCOUNT        ;SET TRUE COUNT TO DEBOUNCE COUNT
72F [02] A600   1155        LDA #$00          ;CHECK TO SEE IF FALSE COUNT IS 0
731 [03] B197   1156        CMP FCOUNT
733 [03] 26F1   1157        BNE CZS           ;READ SWITCH AGAIN IF FALSE COUNT IS <> 0
735 [02] A6FF   1158        LDA #$FF
737 [04] B792   1159        STA ZSWITCH       ;SET ZSWITCH TO FALSE
73A [05] 3A96   1161 CTRL4C DEC TCOUNT        ;DECREMENT TRUE COUNT
73C [03] BE98   1162        LDX DBNCCT        ;READ DEBOUNCE COUNT
73E [04] BF97   1163        STX FCOUNT        ;SET FALSE COUNT TO DEBOUNCE COUNT
740 [02] A600   1164        LDA #$00          ;CHECK TO SEE IF TRUE COUNT IS 0
742 [03] B196   1165        CMP TCOUNT
744 [03] 26E0   1166        BNE CZS           ;READ SWITCH AGAIN IF TRUE COUNT IS <> 0
746 [02] A600   1167        LDA #$00
748 [04] B792   1168        STA ZSWITCH       ;SET ZSWITCH TO TRUE
74A [03] CC0739 1169        JMP ZSWTEND       ;GOTO END
                1170
                1171 ****************************************************************
                1172 *           READ E-STOP INPUT AND UPDATE CONTROL BYTE           *
                1173 ****************************************************************
                1174
74D [06] CD1FF1 1175 CESTOP JSR COPRST        ;RESET COP
750 [03] BE98   1176        LDX DBNCCT        ;READ DEBOUNCE COUNT
752 [04] BF96   1177        STX TCOUNT        ;SET TRUE COUNT TO DEBOUNCE COUNT
754 [04] BF97   1178        STX FCOUNT        ;SET FALSE COUNT TO DEBOUNCE COUNT
756 [05] 050011 1179 CESTP  BRCLR 2,PORTA,CTRL3S ;CHECK FOR ESTOP BUTTON
759 [05] 3A97   1180        DEC FCOUNT        ;DECREMENT FALSE COUNT
75B [03] BE98   1181        LDX DBNCCT        ;READ DEBOUNCE COUNT
75D [04] BF96   1182        STX TCOUNT        ;SET TRUE COUNT TO DEBOUNCE COUNT
75F [02] A600   1183        LDA #$00          ;CHECK TO SEE IF FALSE COUNT IS 0
761 [03] B197   1184        CMP FCOUNT
763 [03] 26F1   1185        BNE CESTP         ;READ SWITCH AGAIN IF FALSE COUNT IS <> 0
765 [02] A600   1186        LDA #$00
767 [04] B793   1187        STA ESTOP         ;SET ESTOP TO FALSE
769 [06] 81     1188 ESTPEND RTS
76A [05] 3A96   1189 CTRL3S DEC TCOUNT        ;DECREMENT TRUE COUNT
76C [03] BE98   1190        LDX DBNCCT        ;READ DEBOUNCE COUNT
76E [04] BF97   1191        STX FCOUNT        ;SET FALSE COUNT TO DEBOUNCE COUNT
770 [02] A600   1192        LDA #$00          ;CHECK TO SEE IF TRUE COUNT IS 0
772 [03] B196   1193        CMP TCOUNT
774 [03] 26E0   1194        BNE CESTP         ;READ SWITCH AGAIN IF TRUE COUNT IS <> 0
776 [02] A6FF   1195        LDA #$FF
778 [04] B793   1196        STA ESTOP         ;SET ESTOP TO TRUE
77A [03] CC0769 1197        JMP ESTPEND       ;GOTO END
                1198
                1199 ****************************************************************
                1200 *                    ABORT TIMER ROUTINE                       *
                1201 *                                                              *
                1202 * TIMES FOR 131ms THEN INTERRUPTS IF INTERRUPT IS NOT DISABLED IN TIME. THIS *
```

```
1203 * AVOIDS THE PROBLEM OF BEING CAUGHT IN A LOOP WAITING FOR AN EVENT TO HAPPEN *
1204 ***************************************************************************
1205
077D [02] 9B      1206 ABTIME  SEI                      ;DISABLE INTERRUPTS
077E [02] 98      1207         CLC                      ;CLEAR THE CARRY
077F [03] B61B    1208         LDA ALTCNT+1             ;LOAD TIMER LOW BYTE
0781 [02] ABFF    1209         ADD #$FF                 ;ADD LOW BYTE OF COUNT TO OCR LOW
0783 [04] B784    1210         STA TEMPA                ;PUT RESULT IN TEMP STORAGE
0785 [03] B61A    1211         LDA ALTCNT               ;LOAD TIMER HIGH BYTE
0787 [02] A9FF    1212         ADC #$FF                 ;ADD HIGH BYTE OF COUNT TO OCR HIGH
0789 [04] B716    1213         STA OCR                  ;STORE RESULT IN OCR HIGH
078B [03] B613    1214         LDA TSR                  ;CLEAR OCF
078D [03] B684    1215         LDA TEMPA                ;LOAD LOW BYTE RESULT
078F [04] B717    1216         STA OCR+1                ;STORE IN OCR LOW
0791 [05] 1C12    1217         BSET 6,TCR               ;ENABLE INTERRUPT ON OC
0794 [06] 81      1219         RTS
                  1220
                  1221 ***************************************************************************
                  1222 *                    ZERO SPEED SENSING ROUTINE                           *
                  1223 ***************************************************************************
                  1224 * ZERO SPEED IS DETECTED BY TAKING AN AVERAGE OF AN AREA OF THE WAVEFORM AND *
                  1225 *COMPARING IT TO A PREVIOUS REFERENCE. A EIGHT DIFFERENT WAVEFORM LOCATIONS *
                  1226 *ARE SAMPLED IN EACH CYCLE. THESE SAMPLES ARE COMPARED TO THEIR RESPECTIVE  *
                  1227 *REFERENCES. WHEN A SAMPLE MATCHES THE REFERENCE THE REFERENCE IS NOT CHANGED*
                  1228 *AND A COUNTER IS INCREMENTED. IF THE SAMPLE DOES NOT MATCH THE REFERENCE,  *
                  1229 *THE REFERENCE IS SET TO THE NEW SAMPLE VALUE. WHEN A COUNTER REACHES A SET *
                  1230 *LEVEL A BIT IS SET IN A REGISTER. WHEN ALL EIGHT BITS IN THE REGISTER ARE  *
                  1231 *SET, ZERO SPEED HAS BEEN DETECTED. IF A SAMPLE DOES NOT MATCH ITS REFERENCE*
                  1232 *THE MATCH REGISTER IS CLEARED. THEREFORE IN ORDER TO SIGNAL THE DETECTION  *
                  1233 *OF ZERO SPEED, ALL EIGHT POSITIONS ON THE WAVEFORM MUST HOLD STEADY FOR THE *
                  1234 *SET NUMBER OF PASSES.                                                      *
                  1235 ***************************************************************************
                  1236
0795 [02] AE04    1237 ZSPEED  LDX #$04                 ;INIT COUNTER FOR 4 SAMPLES
0797 [05] 3F9D    1238         CLR ZSPD                 ;INIT SAMPLE ACCUMULATION REGISTER
0799 [05] 3F9E    1239         CLR ZSPD+1
079B [03] B625    1240 ZS      LDA CH3                  ;CONFIGURATION BYTE FOR ADC
079D [04] B71E    1241         STA ADSCR                ;LOAD BYTE INTO A/D STATUS AND CONTROL REG.
079F [05] 0F1EFD  1242 CONV9   BRCLR 7,ADSCR,CONV9      ;WAIT UNTIL CCF IS SET (CONVERSION COMPLETE)
07A2 [03] B61D    1243         LDA ADDR                 ;READ CONVERTED VALUE
                  1244 *AVERAGE OF 4 SAMPLES
                  1245 *SUM 4 SAMPLES
07A4 [03] BB9E    1246         ADD ZSPD+1               ;SUM SAMPLES TOGETHER
07A6 [04] B79E    1247         STA ZSPD+1
07A8 [02] A600    1248         LDA #$00
07AA [03] B99D    1249         ADC ZSPD
07AC [04] B79D    1250         STA ZSPD
07AE [03] 5A      1251         DECX                     ;DECREMENT THE COUNTER
07AF [02] A300    1252         CPI #$00                 ;IS COUNTER ZERO?
07B1 [03] 26E8    1253         BNE ZS                   ;IF NOT, SAMPLE AGAIN
                  1254 *DIVIDE BY 4 NOW
07B3 [02] AE02    1255         LDX #$02                 ;SET UP COUNT FOR DIVISION (2^n ; n= COUNT)
07B5 [05] 379D    1256 DIV     ASR ZSPD                 ;DIVIDE BY 2
07B7 [05] 369E    1257         ROR ZSPD+1
07B9 [03] 5A      1258         DECX                     ;DECREMENT THE COUNTER
07BA [02] A300    1259         CPI #$00                 ;IS COUNT ZERO?
07BC [03] 26F7    1260         BNE DIV                  ;IF NOT, DIVIDE AGAIN
07BE [03] BEA0    1261         LDX ARRAYX               ;READ ARRAY COUNT INTO X REGISTER
07C0 [03] B69E    1262         LDA ZSPD+1               ;COMPARE NEW SAMPLE AVG. WITH PREVIOUS
07C2 [04] E1AB    1263         CMP REF,X                ;COMPARE TO REFERENCE VALUE
07C4 [03] 225F    1264         BHI COMPR2               ;IF REF IS LARGER, THEN GO TO COMPR2
```

| | | | | | |
|---|---|---|---|---|---|
| 07C6 [03] B69E | 1265 | | LDA ZSPD+1 | | |
| 07C8 [03] 40 | 1266 | | NEGA | ;2'S COMPLEMENT | |
| 07C9 [04] EBAB | 1267 | | ADD REF,X | ;ADD TO PREVIOUS (SUBTRACTION) | |
| 07CB [03] B126 | 1268 | WIND | CMP WINDOW | ;IS DIFFERENCE LARGER THAN WINDOW? | |
| 07CD [03] 2265 | 1269 | | BHI NEWREF | ;IF SO, GO SETUP NEW REFERENCE | |
| 07CF [06] 6CA3 | 1270 | | INC MATCHCT,X | ;INCREMENT THE MATCH COUNT | |
| 07D1 [03] B6BD | 1271 | | LDA MSTOP | ;IS MATCH COUNT = MSTOP? | |
| 07D3 [04] E1A3 | 1272 | | CMP MATCHCT,X | | |
| 07D5 [03] 2245 | 1273 | | BHI CKARRAY | ;IF HIGHER GO TO CKARRAY | |
| | 1274 | *SET PROPER BIT IN MATCH REGISTER | | | |
| 07D7 [02] A300 | 1275 | | CPX #$00 | ;IS X 0? | |
| 07DB [05] 109F | 1277 | | BSET 0,MATCH | ;SET BIT 0 IN MATCH REGISTER | |
| 07DD [03] CC081C | 1278 | | JMP CKARRAY | ;GO TO CKARRAY | |
| 07E0 [02] A301 | 1279 | MATCH1 | CPX #$01 | ;IS X 1? | |
| 07E2 [03] 2605 | 1280 | | BNE MATCH2 | ;IF NOT, GO TO MATCH2 | |
| 07E4 [05] 129F | 1281 | | BSET 1,MATCH | ;SET BIT 1 IN MATCH REGISTER | |
| 07E6 [03] CC081C | 1282 | | JMP CKARRAY | ;GO TO CKARRAY | |
| 07E9 [02] A302 | 1283 | MATCH2 | CPX #$02 | ;IS X 2? | |
| 07EB [03] 2605 | 1284 | | BNE MATCH3 | ;IF NOT, GO TO MATCH 3 | |
| 07ED [05] 149F | 1285 | | BSET 2,MATCH | ;SET BIT 2 IN MATCH REGISTER | |
| 07EF [03] CC081C | 1286 | | JMP CKARRAY | ;GO TO CKARRAY | |
| 07F2 [02] A303 | 1287 | MATCH3 | CPX #$03 | ;IS X 3? | |
| 07F4 [03] 2605 | 1288 | | BNE MATCH4 | ;IF NOT, GO TO MATCH4 | |
| 07F6 [05] 169F | 1289 | | BSET 3,MATCH | ;SET BIT 3 IN MATCH REGISTER | |
| 07F8 [03] CC081C | 1290 | | JMP CKARRAY | ;GO TO CKARRAY | |
| 07FB [02] A304 | 1291 | MATCH4 | CPX #$04 | ;IS X 4? | |
| 07FD [03] 2605 | 1292 | | BNE MATCH5 | ;IF NOT, GO TO MATCH5 | |
| 07FF [05] 189F | 1293 | | BSET 4,MATCH | ;SET BIT 4 IN MATCH REGISTER | |
| 0801 [03] CC081C | 1294 | | JMP CKARRAY | ;GO TO CKARRAY | |
| 0804 [02] A305 | 1295 | MATCH5 | CPX #$05 | ;IS X 5? | |
| 0806 [03] 2605 | 1296 | | BNE MATCH6 | ;IF NOT, GO TO MATCH6 | |
| 0808 [05] 1A9F | 1297 | | BSET 5,MATCH | ;SET BIT 5 IN MATCH REGISTER | |
| 080A [03] CC081C | 1298 | | JMP CKARRAY | ;GO TO CKARRAY | |
| 080D [02] A306 | 1299 | MATCH6 | CPX #$06 | ;IS X 6? | |
| 080F [03] 2605 | 1300 | | BNE MATCH7 | ;IF NOT, GO TO MATCH7 | |
| 0811 [05] 1C9F | 1301 | | BSET 6,MATCH | ;SET BIT 6 IN MATCH REGISTER | |
| 0813 [03] CC081C | 1302 | | JMP CKARRAY | ;GO TO CKARRAY | |
| 0816 [02] A307 | 1303 | MATCH7 | CPX #$07 | ;IS X 7? | |
| 0818 [03] 2602 | 1304 | | BNE CKARRAY | ;IF NOT GO TO CKARRAY | |
| 081A [05] 1E9F | 1305 | | BSET 7,MATCH | ;SET BIT 7 IN MATCH REGISTER | |
| | 1306 | *TEST ARRAY COUNTER | | | |
| 081C [02] A600 | 1307 | CKARRAY | LDA #$00 | | |
| 081E [03] B1A0 | 1308 | | CMP ARRAYX | ;IS ARRAY COUNT 0? | |
| 0820 [03] 270B | 1309 | | BEQ RSTAX | ;IF SO, RESET ARRAY COUNT | |
| 0822 [05] 3AA0 | 1310 | | DEC ARRAYX | ;DECREMENT ARRAY COUNT | |
| 0824 [06] 81 | 1311 | THRU | RTS | | |
| | 1312 | | | | |
| 0825 [04] E6AB | 1313 | COMPR2 | LDA REF,X | | |
| 0827 [03] 40 | 1314 | | NEGA | ;2'S COMPLEMENT PREVIOUS SAMPLE AVG. | |
| 0828 [03] BB9E | 1315 | | ADD ZSPD+1 | ;ADD NEW SAMPLE AVG (SUBTRACT) | |
| 082A [03] CC07CB | 1316 | | JMP WIND | ;GO TO WIND | |
| | 1317 | | | | |
| 082D [02] A607 | 1318 | RSTAX | LDA #$07 | ;RESET ARRAY COUNT | |
| 082F [04] B7A0 | 1319 | | STA ARRAYX | | |
| 0831 [03] CC0824 | 1320 | | JMP THRU | ;GO TO THRU | |
| | 1321 | | | | |
| 0834 [03] B69E | 1322 | NEWREF | LDA ZSPD+1 | ;READ SAMPLE | |
| 0836 [05] E7AB | 1323 | | STA REF,X | ;STORE IT AS A NEW REFERENCE | |
| 0838 [05] 3F9F | 1324 | | CLR MATCH | ;CLEAR MATCH REGISTER | |
| 083A [06] 6FA3 | 1325 | | CLR MATCHCT,X | ;CLEAR MATCH COUNT | |
| 083C [03] CC081C | 1326 | | JMP CKARRAY | ;GO TO CKARRAY | |

```
                1327
                1328  **********************************************************************
                1329  *                      ADJUSTABLE DELAY ROUTINE                      *
                1330  *                   DELAY FROM LAST OUTPUT COMPARE                   *
                1331  **********************************************************************
                1332
083F [03] B617  1333  DLYTM   LDA OC2+1           ;LOAD OCR LOW
0843 [04] B784  1335          STA TEMPA           ;PUT RESULT IN TEMP STORAGE
0845 [03] B616  1336          LDA OCR             ;LOAD OCR HIGH
0847 [03] B9A1  1337          ADC DLYTIME         ;ADD HIGH BYTE OF COUNT TO OCR HIGH
0849 [04] B716  1338          STA OCR             ;STORE RESULT IN OCR HIGH
084B [03] B684  1339          LDA TEMPA           ;LOAD LOW BYTE RESULT
084D [04] B717  1340          STA OCR+1           ;STORE IN OCR LOW
084F [06] CD1FF1 1341 LOOP8   JSR COPRST          ;RESET COP
0852 [05] 0D13FA 1342          BRCLR 6,TSR,LOOP8  ;WAIT UNTIL OCF IS SET
0855 [06] 81    1343          RTS
                1344
                1345  **********************************************************************
                1346  *                      ADJUSTABLE DELAY ROUTINE                      *
                1347  *                   DELAY FROM CURRENT TIMER COUNT                   *
                1348  **********************************************************************
                1349
0856 [03] B61B  1350  ADLYTM  LDA ALTCNT+1        ;LOAD ALTCNT LOW
0858 [03] BBA2  1351          ADD DLYTIME+1       ;ADD LOW BYTE OF COUNT TO ALTCNT LOW
085A [04] B784  1352          STA TEMPA           ;PUT RESULT IN TEMP STORAGE
085C [03] B61A  1353          LDA ALTCNT          ;LOAD ALTCNT HIGH
085E [03] B9A1  1354          ADC DLYTIME         ;ADD HIGH BYTE OF COUNT TO ALTCNT HIGH
0860 [04] B716  1355          STA OCR             ;STORE RESULT IN OCR HIGH
0862 [03] B684  1356          LDA TEMPA           ;LOAD LOW BYTE RESULT
0864 [04] B717  1357          STA OCR+1           ;STORE IN OCR LOW
0866 [06] CD1FF1 1358 LOOP5   JSR COPRST          ;RESET COP
0869 [05] 0D13FA 1359          BRCLR 6,TSR,LOOP5  ;WAIT UNTIL OCF IS SET
086C [06] 81    1360          RTS
                1361
                1362  **********************************************************************
                1363  *                      ADJUSTABLE DELAY ROUTINE                      *
                1364  *                   DELAY FROM CURRENT TIMER READING                 *
                1365  **********************************************************************
                1366
086D [02] 98    1367  ALTDLY  CLC                 ;CLEAR CARRY BIT
086E [03] B61A  1368          LDA ALTCNT          ;READ TIMER HIGH BYTE
0870 [04] B78D  1369          STA TEMPB           ;STORE IN TEMP STORAGE TO AVOID WRAP ERROR
0872 [03] B61B  1370          LDA ALTCNT+1        ;LOAD TIMER LOW BYTE
0874 [03] BB87  1371          ADD COUNT+1         ;ADD LOW BYTE OF COUNT TO OCR LOW
0876 [04] B784  1372          STA TEMPA           ;PUT RESULT IN TEMP STORAGE
0878 [03] B68D  1373          LDA TEMPB           ;LOAD TIMER HIGH BYTE
087A [03] B986  1374          ADC COUNT           ;ADD HIGH BYTE OF COUNT TO OCR HIGH
087C [04] B716  1375          STA OCR             ;STORE RESULT IN OCR HIGH
087E [03] B684  1376          LDA TEMPA           ;LOAD LOW BYTE RESULT
0880 [04] B717  1377          STA OCR+1           ;STORE IN OCR LOW
0882 [06] CD1FF1 1378 LOOP3   JSR COPRST          ;RESET COP
0885 [05] 0D13FA 1379          BRCLR 6,TSR,LOOP3  ;WAIT UNTIL OCF IS SET
0888 [03] B617  1380          LDA OCR+1           ;CLEAR OCF
088A [06] 81    1381          RTS
                1382
                1383  **********************************************************************
                1384  *                   CLEAR MATCH REGISTER AND COUNTERS                *
                1385  **********************************************************************
                1386
088B [05] 3F9F  1387  CLRMAT  CLR MATCH           ;CLEAR MATCH REGISTER
088D [02] AE08  1388          LDX #$08            ;SET COUNT TO 8
088F [03] 5A    1389  MLOOP   DECX                ;DECREMENT COUNT
0890 [06] 6FA3  1390          CLR MATCHCT,X       ;CLEAR MATCH COUNT REGISTERS
0892 [02] A300  1391          CPX #$00            ;IS COUNTER = 0?
```

```
896 [06] 81        1393           RTS
                   1394
                   1395  **********************************************************************
                   1396  *              ERROR HANDLING INTERRUPT SERVICE ROUTINE               *
                   1397  **********************************************************************
                   1398
                   1399  **********************************************************************
                   1400  *              LONG TERM DELAY ROUTINE              DLY1.ASM          *
                   1401  **********************************************************************
                   1402  *      19-NOV-92   KEN H.                                             *  *
                   1403  *      02-DEC-92   KEN H.       ADD COP RESET                        *
                   1404  **********************************************************************
                   1405
897 [06] CD1FF1    1406  DLY1   JSR COPRST              ;RESET COP
89A [05] 0D13FA    1407         BRCLR 6,TSR,DLY1        ;WAIT FOR OUTPUT COMPARE
89D [03] B617      1408         LDA OCR+1               ;READ LOW BYTE OF OCR
89F [02] AB4E      1409         ADD #$4E                ;ADD $4E
8A1 [04] B784      1410         STA TEMPA               ;SAVE IN TEMPORARY LOCATION
8A3 [03] B616      1411         LDA OCR                 ;READ HIGH BYTE OF OCR
8A5 [02] A912      1412         ADC #$12                ;ADD $12
8A7 [04] B716      1413         STA OCR                 ;STORE NEW HIGH BYTE IN OCR
8A9 [03] B684      1414         LDA TEMPA               ;READ TEMP LOCATION
8AB [04] B717      1415         STA OCR+1               ;STORE NEW LOW BYTE IN OCR
8AD [03] B685      1416         LDA TLC                 ;LOAD TIMER LOOP COUNTER
8AF [03] 4C        1417         INCA                    ;INCREMENT COUNT
8B0 [04] B785      1418         STA TLC
8B2 [02] A110      1419         CMP #10                 ;IS COUNT = 10?
8B4 [03] 25E1      1420         BLO DLY1                ;IF NOT, GOTO TOP OF LOOP
8B6 [05] 3F85      1421         CLR TLC                 ;CLEAR TIMER LOOP COUNT
8B8 [06] 81        1422         RTS
                   1423
                   1424  **********************************************************************
                   1425  *              BALDOR MOTORS AND DRIVES             EBLINK.ASM        *
                   1426  *              ERROR CODE DISPLAY SEQUENCE TIMING                     *
                   1427  **********************************************************************
                   1428  *      24-NOV-92   KEN H.                                             *
                   1429  **********************************************************************
                   1430
8B9 [05] 1B03      1431  EBLINK BCLR 5,PORTD             ;TURN READY LED ON
8BB [06] CD0897    1432         JSR DLY1                 ;DELAY
8BE [05] 1A03      1433         BSET 5,PORTD             ;TURN READY LED OFF
8C0 [06] CD0897    1434         JSR DLY1                 ;DELAY
8C3 [06] 81        1435         RTS
                   1436
                   1437  **********************************************************************
                   1438  *              BALDOR MOTORS AND DRIVES             B2ISR.ASM         *
                   1439  *              BRAKE2 INTERRUPT SERVICE ROUTINE                       *
                   1440  **********************************************************************
                   1441  *      19-NOV-92   KEN H.                                             *
                   1442  *      24-NOV-92   KEN H.       CHANGE ERROR DISPLAY                  *
                   1443  *      30-NOV-92   KEN H.       CHANGE TIMER COUNT TO 8               *
                   1444  *      02-DEC-92   KEN H.       ADD COP RESET                        *
                   1445  *      14-DEC-92   KEN H.       CHANGE TIMER COUNT TO 24              *
                   1446  *      26-JAN-93   KEN H.       OPEN CONTACTORS ON ERROR              *
                   1447  **********************************************************************
                   1448
08D2               1449         ORG $8D2
 D2 [02] 9B        1451  ISR    SEI
 D3 [06] CD1FF1    1452         JSR COPRST              ;RESET COP
 D6 [05] 1D12      1453         BCLR 6,TCR              ;DISABLE TIMER INTERRUPT
 D8 [03] B69B      1454         LDA INTCNT              ;READ ERROR TIMER COUNT
```

```
DA [02] A118    1455           CMP #$18           ;IS IT = $18?
DC [03] 270A    1456           BEQ ERROR          ;IF SO, GOTO ERROR PROCESSING
DE [03] 4C      1457           INCA               ;INCREMENT ERROR TIMER COUNT
DF [04] B79B    1458           STA INTCNT
E1 [06] CD077D  1459           JSR ABTIME         ;START ERROR TIMER
E4 [06] CD1FF1  1460           JSR COPRST         ;RESET COP
E7 [09] 80      1461           RTI
                1462
E8 [06] CD0374  1463  ERROR    JSR BRLYOFF        ;TURN BRAKE RELAY OFF
EB [05] 1F00    1464           BCLR 7,PORTA       ;CLEAR OUTPUT TO RELAY TO TURN H RELAY OFF
ED [03] BE9C    1465  ER       LDX ERRFLAG        ;READ ERROR FLAG
EF [06] CD08B9  1466  BLINK    JSR EBLINK         ;ERROR BLINK ROUTINE
F2 [03] 5A      1467           DECX               ;DECREMENT COUNT
F3 [02] A300    1468           CPX #$00           ;IS IT = 0?
F5 [03] 26F8    1469           BNE BLINK          ;IF NOT, GOTO ERROR BLINK ROUTINE
F7 [06] CD0897  1470           JSR DLY1           ;DELAY
FA [06] CD0897  1471           JSR DLY1           ;DELAY
FD [03] CC08ED  1472           JMP ER             ;GOTO READ ERROR FLAG
                1473
                1474  ************************************************************
                1475  *                   COP RESET ROUTINE                       *
                1476  ************************************************************
                1477
F1              1478           ORG $1FF1
F1 [02] A600    1479  COPRST   LDA #$00
F3 [05] C71FF0  1480           STA COP            ;CLEAR COP
F6 [06] 81      1481           RTS
                1482
                1483  ************************************************************
                1484
F7      02      1485           FCB $02            ;VERSION CODE
                1486
                1487  ************************************************************
                1488  *                 DEFINE VECTOR ADDRESSES                   *
                1489  ************************************************************
                1490
F8              1491           ORG $1FF8
F8      08D2    1492           FDB ISR
FA      0100    1493           FDB MAIN
FC      08D2    1494           FDB ISR
FE      0100    1495           FDB MAIN
                1496
                1497
                1498
                1499 mbol Table

IME        077D
           0445
JR         001D
JYTM       0856
SCR        001E
DLY        086D
AYX        00A0
IC         0167
EAR        062D
NK         08EF
NOW        0279
YOFF       0374
YON        0359
```

|  |  |
|---|---|
|  | 055C |
|  | 05B6 |
| TOP | 074D |
| TP | 0756 |
|  | 0022 |
|  | 0023 |
|  | 0024 |
|  | 0025 |
| LOW | 05CD |
| STOP | 021F |
|  | 06F6 |
| G | 06BD |
| RRAY | 081C |
| OW | 0523 |
| CF | 0463 |
| 2 | 0340 |
| OF | 0465 |
| OP | 010D |
| W | 0583 |
| W2 | 0459 |
| CNT | 056E |
| CT | 05C8 |
| FG | 0443 |
| MAT | 088B |
| TIME | 0517 |
| P | 03AA |
| PR2 | 0825 |
| V0 | 02FF |
| V1 | 002B |
| V2 | 02F3 |
| V9 | 079F |
|  | 1FF0 |
| RST | 1FF1 |
| NT | 0086 |
| ART | 068D |
| OP | 06BD |
| P | 06C6 |
| RT | 0696 |
| L3S | 076A |
| L4C | 073A |
| L5C | 070A |
| L6S | 06DA |
| L7C | 06AA |
|  | 0726 |
| WIT | 071D |
| CCT | 0098 |
| A | 0004 |
| B | 0005 |
| C | 0006 |
|  | 0397 |
|  | 052C |
| AB | 05D6 |
|  | 07B5 |
| 1 | 0897 |
| TIME | 00A1 |
| TM | 083F |
| E | 02DC |
| L | 058C |
| INK | 08B9 |
| NT | 0538 |
| DDET | 03C6 |

| | |
|---|---|
| DFREQ | 03BA |
| DT | 02EF |
| DT2 | 03F7 |
| ROM | 0100 |
| ROM0 | 0020 |
| | 08ED |
| FLAG | 009C |
| OR | 08E8 |
| VAR | 00BC |
| | 01A1 |
| | 01E3 |
| | 0236 |
| OP | 0093 |
| PEND | 0769 |
| OUNT | 0097 |
| YTAB | 0020 |
| TY | 03CF |
| E | 04E1 |
| EPLS | 02C7 |
| QDET | 0385 |
| QERR | 03DE |
| QFIX | 00B7 |
| QMUL | 00B9 |
| QFLAG | 00BA |
| RE | 05D9 |
| AG | 0095 |
| HER | 03C7 |
| AG | 041A |
| LD | 028A |
| R | 0014 |
| IRE | 052F |
| IT | 010A |
| CNT | 009B |
| E | 08D2 |
| OOP | 020E |
| G | 0091 |
| GEND | 0709 |
| GRUN | 01FE |
| JN | 0209 |
| | 0610 |
| | 061B |
| | 0648 |
| | 0653 |
| | 0673 |
| | 067B |
| OP1 | 0468 |
| OP2 | 04A1 |
| OP3 | 0882 |
| OP5 | 0866 |
| OP8 | 084F |
| W | 04C4 |
| W2 | 0496 |
| 0 | 015F |
| 1 | 0163 |
| | 0505 |
| G | 0409 |
| IN | 0100 |
| STER | 0195 |
| TCH | 009F |
| TCH1 | 07E0 |
| TCH2 | 07E9 |

| | |
|---|---|
| TCH3 | 07F2 |
| TCH4 | 07FB |
| TCH5 | 0804 |
| TCH6 | 080D |
| TCH7 | 0816 |
| TCHCT | 00A3 |
| LEAR | 05F5 |
| NU | 0103 |
| OOP | 088F |
| DE | 014E |
| R | 0901 |
| OT | 0027 |
| DY | 01FA |
| LYON | 0034 |
| TOP | 00BD |
| LT | 03FE |
| WREF | 0834 |
| 2 | 0099 |
| R | 0016 |
| 4 | 0158 |
| COUNT | 0088 |
| IRE | 058F |
| RTA | 0000 |
| RTB | 0001 |
| RTC | 0002 |
| RTD | 0003 |
| TOH | 0080 |
| TOL | 0081 |
| T1 | 0082 |
| T2 | 0083 |
| EMAG | 03E5 |
| EST | 03EE |
| ESTP | 023B |
| START | 023D |
| TP | 026E |
| N | 0080 |
| F | 00AB |
| SSTART | 022B |
| STAX | 082D |
| STRT | 0298 |
| STTIME | 0482 |
| K | 02AA |
| T2 | 008C |
| | 000A |
| | 000C |
| SE | 043F |
| FLAG | 0573 |
| FLG | 05F4 |
| AG | 00BB |
| TY | 03AE |
| P | 01A4 |
| | 0541 |
| R | 059B |
| CK | 04EA |
| | 000B |
| RT | 008F |
| LAG | 008E |
| OOP | 01C8 |
| P | 0090 |
| CK | 025C |
| END | 06D9 |

| | |
|---|---|
| ιT | 0246 |
| ?TEND | 06A9 |
| S | 0354 |
| ) | 032C |
| iT | 0018 |
| )UNT | 0096 |
| ? | 0012 |
| !PA | 0084 |
| iPB | 008D |
| iPT | 00BE |
| ¿U | 0824 |
| iECTH | 008A |
| iECTL | 008B |
| ? | 0085 |
| ?T | 02FB |
| . | 0013 |
| )ATE | 02DD |
| iD | 07CB |
| iDOW | 0026 |
| )Y | 0273 |
| | 04B5 |
| ROSS | 04AE |
| SAVE | 00B5 |
| STAMP | 00B3 |
| 'F | 065F |
| | 079B |
| ?D | 009D |
| ?EED | 0795 |
| IITCH | 0092 |
| ITEND | 0739 |

We claim as our invention:

1. A method for dynamically braking a motor, the motor having a plurality of terminals connected to a controller that receives an input alternating current voltage waveform, the method comprising the steps of:
   (a) detecting a zero crossing of the input alternating current voltage waveform;
   (b) in response to the detection of a zero crossing of the input alternating current voltage waveform sampling the voltage at one terminal of the alternating current motor during a first time period and developing a first sampled value;
   (c) comparing the first sampled value to a first reference value and setting a first flag if the first sampled value matches the first reference value;
   (d) introducing a first delay period;
   (e) at the conclusion of the first delay period sampling the voltage at the one terminal of the alternating current motor during a second time period and developing a second sampled value;
   (f) comparing the second sampled value to a second reference value and setting a second flag if the second sampled value matches the second reference value;
   (g) introducing a second delay period;
   (h) at the conclusion of the second delay period generating a gating pulse to fire a silicon controlled rectifier to provide a pulse of braking current to the alternating current motor;
   (i) halting the braking of the alternating current motor if both the first and second flags are set; or
   (j) clearing the first and second flags and repeating steps (a)-(i) if both the first and second flags are not set.

2. The method of claim 1 further including the step of replacing the first reference value with the first sampled value and replacing the second reference value with the second sampled value if both the first and second flags are not set.

3. The method of claim 1 wherein the first and second delay periods define the magnitude of the firing angle of the silicon controlled rectifier.

4. The method of claim 1 wherein the first sampled value matches the first reference value whenever the absolute value of the difference between the first sampled value and the first reference value is below a predetermined level.

5. The method of claim 1 wherein the sampled value for a position matches the reference value for that position whenever the absolute value of the difference between the sampled value and the reference value is below a predetermined level.

6. A method for dynamically braking a motor, the motor having a plurality of terminals connected to a controller that receives an input alternating current voltage waveform, the method comprising the steps of:
   (a) detecting a zero crossing of the input alternating current voltage waveform;
   (b) in response to the detection of a zero crossing of the input alternating current waveform for a particular position of the input alternating current waveform:
      sampling the voltage at a terminal of the motor to develop a sampled value for the position,
      comparing the sampled value for the position to a reference value for the position and setting a flag if the reference value for the position matches the sampled value for the position, introducing a delay period;

(c) repeating step (b) for a plurality of positions;

(d) generating a gating pulse to fire a silicon controlled rectifier to provide a pulse of braking current to the alternating current motor; and (e) halting the braking of the motor if the flags for each of the plurality of positions are set.

7. The method of claim 6 wherein step (b) is repeated eight times for each firing of the silicon controller rectifier.

8. The method of claim 6 further including the step of clearing any set flags and repeating steps (a)–(i) if the flags for each of the plurality of positions are not set.

9. The method of claim 6 further including the step of replacing the reference value for each position with the sampled value for the position prior to repeating steps (a)–(i).

10. The method of claim 6 wherein the delay period introduced in step (b) controls the magnitude of the pulse of braking current applied to the motor.

11. An electronic dynamic brake assembly for use with a motor, the brake assembly comprising:

a master control unit;

status control switches coupled to the master control unit for providing signals representative of an operating mode selected from a group consisting of: SLAVE mode, PRE-STOP mode, HOLDING mode and MASTER mode;

control logic means operable with the master control unit for causing the dynamic brake assembly to operate as a SLAVE brake, a PRE-STOP brake, or a HOLDING brake in response to the signals from the status control switches.

12. The electronic dynamic brake assembly of claim 11 wherein the master control unit is a microprocessor and the control logic means includes a program routine for the microprocessor.

13. An electronic dynamic brake assembly for use with a motor, the brake assembly comprising:

a master control unit;

status control switches coupled to the master control unit for providing signals representative of a first operating mode and a second operating mode;

control logic means operable with the master control unit for causing the dynamic brake assembly to operate in the first operating mode or the second operating mode in response to the signals from the status control switches.

14. The electronic dynamic brake assembly of claim 13 wherein the master control unit is a microprocessor and the control logic means includes a program routine for the microprocessor.

15. The electronic dynamic brake assembly of claim 13 wherein the first operating mode is selected from the group consisting of: SLAVE mode, PRE-STOP mode, HOLDING mode and MASTER mode.

16. The electronic dynamic brake assembly of claim 13 wherein the second operating mode is selected from the group consisting of: SLAVE mode, PRE-STOP mode, HOLDING mode and MASTER mode.

* * * * *